United States Patent
Sugimoto et al.

(10) Patent No.: US 7,596,279 B2
(45) Date of Patent: Sep. 29, 2009

(54) IMAGE ENCODING DEVICE, IMAGE DECODING DEVICE, IMAGE ENCODING METHOD, IMAGE DECODING METHOD, IMAGE ENCODING PROGRAM, AND IMAGE DECODING PROGRAM

(75) Inventors: Kazuo Sugimoto, Kanagawa (JP); Satoru Adachi, Kanagawa (JP); Sadaatsu Kato, Kanagawa (JP); Minoru Etoh, Kanagawa (JP); Mitsuru Kobayashi, Kanagawa (JP); Hiroyuki Yamaguchi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 952 days.

(21) Appl. No.: 10/487,048

(22) PCT Filed: Apr. 25, 2003

(86) PCT No.: PCT/JP03/05388

§ 371 (c)(1),
(2), (4) Date: Feb. 18, 2004

(87) PCT Pub. No.: WO2004/039083

PCT Pub. Date: May 6, 2004

(65) Prior Publication Data

US 2004/0234144 A1 Nov. 25, 2004

(30) Foreign Application Priority Data

| Apr. 26, 2002 | (JP) | ............... 2002-127471 |
| Apr. 26, 2002 | (JP) | ............... 2002-127485 |
| Jul. 3, 2002 | (JP) | ............... 2002-195158 |
| Jul. 3, 2002 | (JP) | ............... 2002-195162 |

(51) Int. Cl.
*G06K 9/36* (2006.01)
*G06K 9/46* (2006.01)
*H04N 7/12* (2006.01)
*H04N 11/02* (2006.01)
*H04N 11/04* (2006.01)
*H03M 7/40* (2006.01)

(52) U.S. Cl. .................. 382/238; 375/240.01; 348/500; 341/67

(58) Field of Classification Search ................. 382/238; 375/240.1; 348/500, 395.1; 341/67
See application file for complete search history.

(56) References Cited

U.S. PATENT DOCUMENTS 4,097,903 A * 6/1978 Nakagome et al. ..... 358/426.09

(Continued)

FOREIGN PATENT DOCUMENTS

EP   0 542 474 A2   5/1993

(Continued)

*Primary Examiner*—John B Strege
(74) *Attorney, Agent, or Firm*—Oblon, Spivak, McClelland, Maier & Neustadt, L.L.P.

(57) ABSTRACT

Variable-length encoder 16 feeds a CBP as an input symbol H1 to variable-length code output part 30. Coded symbol memory 31 supplies CBPs in neighboring blocks as coding map table reference information H2 to coding map table provider 32. Coding map table provider 32 determines a coding map table used in coding of the CBP, based on these CBPs in the neighboring blocks, and provides a coding map table H4 to variable-length code output part 30. Variable-length coding table provider 33 feeds a variable-length coding table H5 to variable-length code output part 30. Then the coding target CBP is subjected to variable-length coding, and the resultant is outputted as coded data D9. This allows information source coding of coding symbols to be performed efficiently according to the coding condition and the property of image.

11 Claims, 38 Drawing Sheets

U.S. PATENT DOCUMENTS

| | | | |
|---|---|---|---|
| 5,116,684 A * | 5/1992 | Fretz et al. | 428/417 |
| 5,122,875 A | 6/1992 | Raychaudhuri et al. | |
| 5,166,684 A * | 11/1992 | Juri et al. | 341/67 |
| 5,510,785 A * | 4/1996 | Segawa et al. | 341/67 |
| 5,875,266 A * | 2/1999 | Fukuda et al. | 382/251 |
| 6,101,276 A | 8/2000 | Adiletta et al. | |
| 6,462,791 B1 * | 10/2002 | Zhu | 375/240.27 |
| 6,754,269 B1 * | 6/2004 | Yamaguchi et al. | 375/240.1 |
| 6,928,115 B2 * | 8/2005 | Uetani | 375/240.12 |
| 2001/0048769 A1 * | 12/2001 | Kajiki et al. | 382/239 |

FOREIGN PATENT DOCUMENTS

| | | |
|---|---|---|
| EP | 0 876 058 A1 | 11/1998 |
| EP | 0 905 987 A2 | 3/1999 |
| GB | 2 363 274 A | 12/2001 |
| JP | 1-179584 | 7/1989 |
| JP | 8-205140 | 8/1996 |
| JP | 8-214310 | 8/1996 |
| JP | 10-191324 | 7/1998 |
| JP | 10-327411 | 12/1998 |
| JP | 11-69358 | 3/1999 |
| JP | 2001-320715 | 11/2001 |
| KR | 10-0113351-0000 | 3/1997 |

* cited by examiner

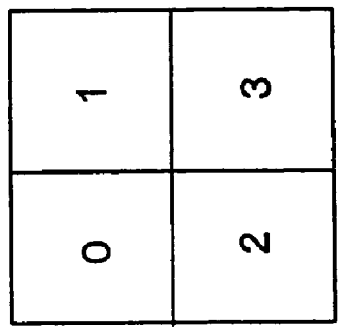
Fig.3C  INTRA CODING MODE 2
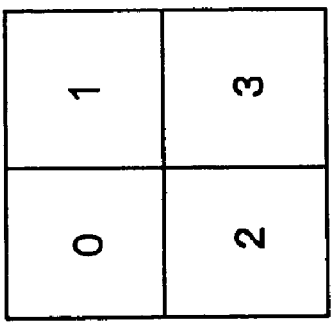
Fig.3B  INTER CODING MODE 1
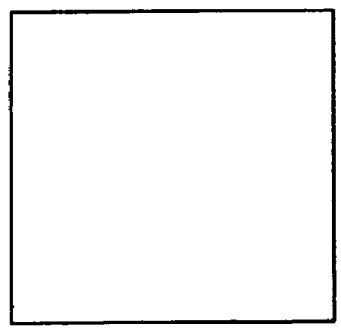
Fig.3A  INTER CODING MODE 0

Fig.4A

HORIZONTAL COORDINATES →

VERTICAL COORDINATES ↓

| $a_{11}$ | $a_{12}$ | $a_{13}$ | $a_{14}$ | $a_{15}$ | $a_{16}$ | $a_{17}$ | $a_{18}$ |
|---|---|---|---|---|---|---|---|
| $a_{21}$ | $a_{22}$ | $a_{23}$ | $a_{24}$ | $a_{25}$ | $a_{26}$ | $a_{27}$ | $a_{28}$ |
| $a_{31}$ | $a_{32}$ | $a_{33}$ | $a_{34}$ | $a_{35}$ | $a_{36}$ | $a_{37}$ | $a_{38}$ |
| $a_{41}$ | $a_{42}$ | $a_{43}$ | $a_{44}$ | $a_{45}$ | $a_{46}$ | $a_{47}$ | $a_{48}$ |
| $a_{51}$ | $a_{52}$ | $a_{53}$ | $a_{54}$ | $a_{55}$ | $a_{56}$ | $a_{57}$ | $a_{58}$ |
| $a_{61}$ | $a_{62}$ | $a_{63}$ | $a_{64}$ | $a_{65}$ | $a_{66}$ | $a_{67}$ | $a_{68}$ |
| $a_{71}$ | $a_{72}$ | $a_{73}$ | $a_{74}$ | $a_{75}$ | $a_{76}$ | $a_{77}$ | $a_{78}$ |
| $a_{81}$ | $a_{82}$ | $a_{83}$ | $a_{84}$ | $a_{85}$ | $a_{86}$ | $a_{87}$ | $a_{88}$ |

Fig.4B

HORIZONTAL FREQUENCIES →

VERTICAL FREQUENCIES ↓

| $f_{11}$ | $f_{12}$ | $f_{13}$ | $f_{14}$ | $f_{15}$ | $f_{16}$ | $f_{17}$ | $f_{18}$ |
|---|---|---|---|---|---|---|---|
| $f_{21}$ | $f_{22}$ | $f_{23}$ | $f_{24}$ | $f_{25}$ | $f_{26}$ | $f_{27}$ | $f_{28}$ |
| $f_{31}$ | $f_{32}$ | $f_{33}$ | $f_{34}$ | $f_{35}$ | $f_{36}$ | $f_{37}$ | $f_{38}$ |
| $f_{41}$ | $f_{42}$ | $f_{43}$ | $f_{44}$ | $f_{45}$ | $f_{46}$ | $f_{47}$ | $f_{48}$ |
| $f_{51}$ | $f_{52}$ | $f_{53}$ | $f_{54}$ | $f_{55}$ | $f_{56}$ | $f_{57}$ | $f_{58}$ |
| $f_{61}$ | $f_{62}$ | $f_{63}$ | $f_{64}$ | $f_{65}$ | $f_{66}$ | $f_{67}$ | $f_{68}$ |
| $f_{71}$ | $f_{72}$ | $f_{73}$ | $f_{74}$ | $f_{75}$ | $f_{76}$ | $f_{77}$ | $f_{78}$ |
| $f_{81}$ | $f_{82}$ | $f_{83}$ | $f_{84}$ | $f_{85}$ | $f_{86}$ | $f_{87}$ | $f_{88}$ |

IMAGE EXAMPLE
(FIGURE MOVING IN STATIONARY BACKGROUND)

EXAMPLE OF DISTRIBUTION OF
BLOCKS WITH NONZERO COEFFICIENTS

Fig.9A

| CBPY | INDEX VALUE |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

Fig.9B

| INDEX VALUE | VARIABLE-LENGTH CODE | CODE LENGTH |
|---|---|---|
| 0 | 1 | 1 |
| 1 | 010 | 3 |
| 2 | 011 | 3 |
| 3 | 00100 | 5 |
| 4 | 00101 | 5 |
| 5 | 00110 | 5 |
| 6 | 00111 | 5 |
| 7 | 0001000 | 7 |
| 8 | 0001001 | 7 |
| 9 | 0001010 | 7 |
| 10 | 0001011 | 7 |
| 11 | 0001100 | 7 |
| 12 | 0001101 | 7 |
| 13 | 0001110 | 7 |
| 14 | 0001111 | 7 |
| 15 | 000010000 | 9 |

Fig.10A

| CBPY | P(CBPY) | INDEX VALUE |
|------|---------|-------------|
| 0000 | 9       | 4           |
| 0001 | 9       | 5           |
| 0010 | 3       | 12          |
| 0011 | 3       | 13          |
| 0100 | 15      | 0           |
| 0101 | 15      | 1           |
| 0110 | 9       | 6           |
| 0111 | 9       | 7           |
| 1000 | 9       | 8           |
| 1001 | 9       | 9           |
| 1010 | 3       | 14          |
| 1011 | 3       | 15          |
| 1100 | 15      | 2           |
| 1101 | 15      | 3           |
| 1110 | 9       | 10          |
| 1111 | 9       | 11          |

MAP TABLE OF CBPY FOR (E, F, G, H) = (1, 1, 0, 0)

Fig.10B

| CBPY | P(CBPY) | INDEX VALUE |
|------|---------|-------------|
| 0000 | 9       | 4           |
| 0001 | 9       | 5           |
| 0010 | 7       | 12          |
| 0011 | 7       | 13          |
| 0100 | 11      | 0           |
| 0101 | 11      | 1           |
| 0110 | 9       | 6           |
| 0111 | 9       | 7           |
| 1000 | 9       | 8           |
| 1001 | 9       | 9           |
| 1010 | 7       | 14          |
| 1011 | 7       | 15          |
| 1100 | 11      | 2           |
| 1101 | 11      | 3           |
| 1110 | 9       | 10          |
| 1111 | 9       | 11          |

MAP TABLE OF CBPY FOR (E, F, G, H) = (0, 1, 1, 0)

Fig.11A

| CBPC | INDEX VALUE |
|------|-------------|
| 00   | 0           |
| 01   | 1           |
| 10   | 2           |
| 11   | 3           |

DEFAULT MAP TABLE OF CBPC

Fig.11B

| INDEX VALUE | VARIABLE-LENGTH CODE | CODE LENGTH |
|-------------|----------------------|-------------|
| 0           | 0                    | 1           |
| 1           | 010                  | 3           |
| 2           | 011                  | 3           |
| 3           | 00100                | 5           |

VARIABLE-LENGTH CODING TABLE OF CBPC

Fig.12B

| CBPC | P(CBPC) | INDEX VALUE |
|---|---|---|
| 00 | 2 | 1 |
| 01 | 4 | 0 |
| 10 | 0 | 3 |
| 11 | 2 | 2 |

MAP TABLE OF CBPC FOR (J, K, M, N) = (0, 0, 1, 1)

Fig.12A

| CBPC | P(CBPC) | INDEX VALUE |
|---|---|---|
| 00 | 3 | 0 |
| 01 | 1 | 2 |
| 10 | 3 | 1 |
| 11 | 1 | 3 |

MAP TABLE OF CBPC FOR (J, K, M, N) = (0, 1, 0, 0)

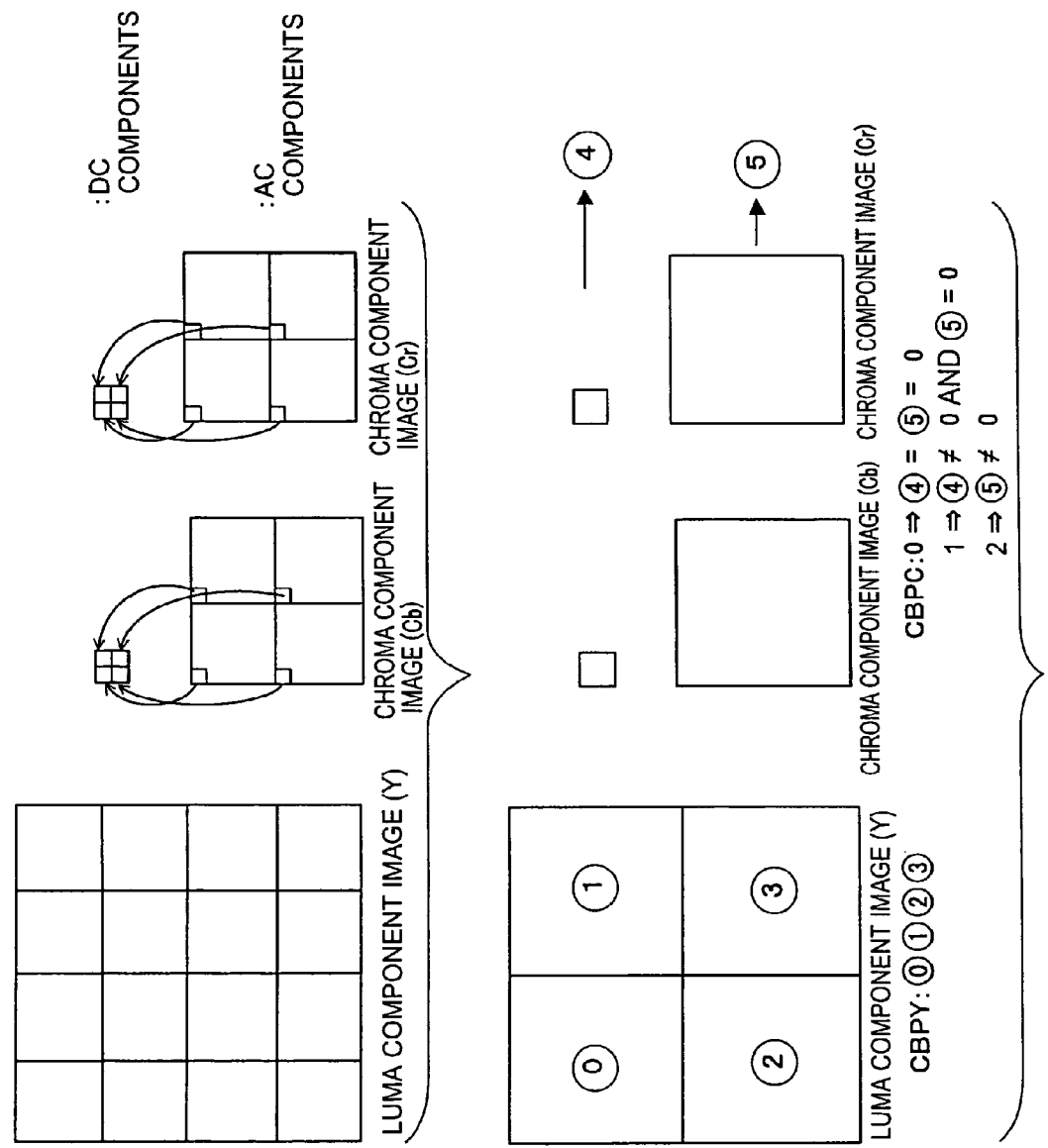

MACROBLOCKS AND CONTEXT BLOCKS
IN CBPC IN INTRA 16 × 16 CODING MODE

MACROBLOCKS AND CONTEXT BLOCKS
IN CBPY IN INTRA 16 × 16 CODING MODE

Fig.18A

| CBPY | INDEX VALUE |
|------|-------------|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

Fig.18B

| INDEX VALUE | VARIABLE-LENGTH CODE | CODE LENGTH |
|-------------|----------------------|-------------|
| 0 | 1 | 1 |
| 1 | 010 | 3 |
| 2 | 011 | 3 |
| 3 | 00100 | 5 |
| 4 | 00101 | 5 |
| 5 | 00110 | 5 |
| 6 | 00111 | 5 |
| 7 | 0001000 | 7 |
| 8 | 0001001 | 7 |
| 9 | 0001010 | 7 |
| 10 | 0001011 | 7 |
| 11 | 0001100 | 7 |
| 12 | 0001101 | 7 |
| 13 | 0001110 | 7 |
| 14 | 0001111 | 7 |
| 15 | 000010000 | 9 |

Fig.18C

| CBPC | INDEX VALUE |
|------|-------------|
| 0 | 0 |
| 1 | 1 |
| 2 | 2 |

Fig.18D

| INDEX VALUE | VARIABLE-LENGTH CODE | CODE LENGTH |
|-------------|----------------------|-------------|
| 0 | 0 | 1 |
| 1 | 010 | 3 |
| 2 | 011 | 3 |

*Fig.19*

| CBPC | DIFFERENCE FROM P(CBPC) | INDEX VALUE |
|---|---|---|
| 0 | 2 | 2 |
| 1 | 1 | 1 |
| 2 | 0 | 0 |

Fig.20A

| INDEX VALUE | FREQUENCY OF OCCURRENCE (%) |
|---|---|
| 0 | 41 |
| 1 | 20 |
| 2 | 10 |
| 3 | 5 |
| 4 | 4 |
| 5 | 3 |
| 6 | 3 |
| 7 | 2 |
| 8 | 2 |
| 9 | 2 |
| 10 | 2 |
| 11 | 2 |
| 12 | 2 |
| 13 | 2 |
| 14 | 2 |
| 15 | 2 |

Fig.20B

| INDEX VALUE | FREQUENCY OF OCCURRENCE (%) |
|---|---|
| 0 | 15 |
| 1 | 13 |
| 2 | 12 |
| 3 | 10 |
| 4 | 8 |
| 5 | 6 |
| 6 | 5 |
| 7 | 5 |
| 8 | 5 |
| 9 | 4 |
| 10 | 4 |
| 11 | 4 |
| 12 | 3 |
| 13 | 3 |
| 14 | 2 |
| 15 | 1 |

Fig.21A

| INDEX VALUE | VARIABLE-LENGTH CODE | CODE LENGTH |
|---|---|---|
| 0 | 1 | 1 |
| 1 | 01 0 | 3 |
| 2 | 01 1 | 3 |
| 3 | 001 00 | 5 |
| 4 | 001 01 | 5 |
| 5 | 001 10 | 5 |
| 6 | 001 11 | 5 |
| 7 | 0001 000 | 7 |
| 8 | 0001 001 | 7 |
| 9 | 0001 010 | 7 |
| 10 | 0001 011 | 7 |
| 11 | 0001 100 | 7 |
| 12 | 0001 101 | 7 |
| 13 | 0001 110 | 7 |
| 14 | 0001 111 | 7 |
| 15 | 00001 0000 | 9 |

Fig.21B

| INDEX VALUE | VARIABLE-LENGTH CODE | CODE LENGTH |
|---|---|---|
| 0 | 1 0 | 2 |
| 1 | 1 1 | 2 |
| 2 | 01 00 | 4 |
| 3 | 01 01 | 4 |
| 4 | 01 10 | 4 |
| 5 | 01 11 | 4 |
| 6 | 001 000 | 6 |
| 7 | 001 001 | 6 |
| 8 | 001 010 | 6 |
| 9 | 001 011 | 6 |
| 10 | 001 100 | 6 |
| 11 | 001 101 | 6 |
| 12 | 001 110 | 6 |
| 13 | 001 111 | 6 |
| 14 | 0001 0000 | 8 |
| 15 | 0001 0001 | 8 |

Fig.21C

| INDEX VALUE | VARIABLE-LENGTH CODE | CODE LENGTH |
|---|---|---|
| 0 | 1 00 | 3 |
| 1 | 1 01 | 3 |
| 2 | 1 10 | 3 |
| 3 | 1 11 | 3 |
| 4 | 01 000 | 5 |
| 5 | 01 001 | 5 |
| 6 | 01 010 | 5 |
| 7 | 01 011 | 5 |
| 8 | 01 100 | 5 |
| 9 | 01 101 | 5 |
| 10 | 01 110 | 5 |
| 11 | 01 111 | 5 |
| 12 | 001 0000 | 7 |
| 13 | 001 0001 | 7 |
| 14 | 001 0010 | 7 |
| 15 | 001 0011 | 7 |

HORIZONTAL FREQUENCIES →

VERTICAL FREQUENCIES ↓

| 10 | 0  | 2 | 0 | 1 | 0 | 0 | 0 |
|----|----|---|---|---|---|---|---|
| -2 | 0  | 0 | 0 | 0 | 0 | 0 | 0 |
| 0  | -1 | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |

| $q_{11}$ | $q_{12}$ | $q_{21}$ | $q_{31}$ | $q_{22}$ | $q_{13}$ | $q_{14}$ | $q_{23}$ | $q_{32}$ | $q_{41}$ | $q_{51}$ | $q_{42}$ | $q_{33}$ | $q_{24}$ | $q_{15}$ | $q_{16}$ | $q_{17}$ | .. |
|----|---|----|---|---|---|---|---|---|---|---|---|---|---|---|---|---|----|
| 10 | 0 | -2 | 0 | 0 | 2 | 0 | 0 | -1 | 0 | 0 | 0 | 0 | 0 | 1 | 0 | 0 | .. |

$S_1$  $S_2$  $S_3$  $S_4$  $S_5$  $S_6$

| COEFFICIENT STRING | LEVEL | RUN |
|---|---|---|
| $S_1$ | 10 | 0 |
| $S_2$ | -2 | 1 |
| $S_3$ | 2 | 2 |
| $S_4$ | -1 | 2 |
| $S_5$ | 1 | 5 |
| $S_6$ | 0 | — |

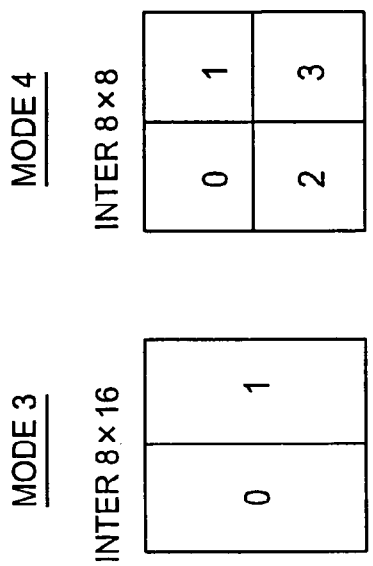
Fig.24A MODE 0 SKIP
Fig.24B MODE 1 INTER 16×16
Fig.24C MODE 2 INTER 16×8
Fig.24D MODE 3 INTER 8×16
Fig.24E MODE 4 INTER 8×8
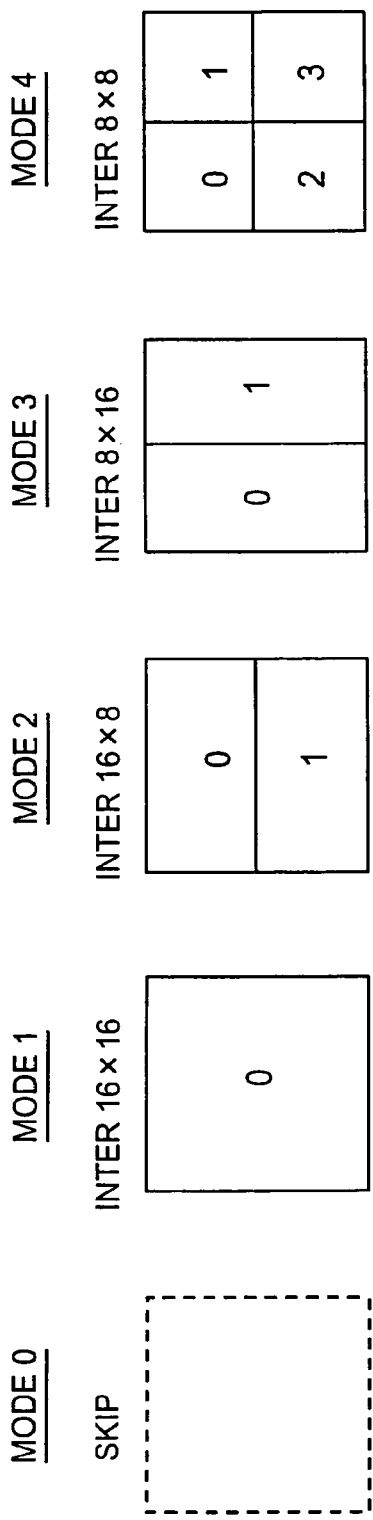
Fig.24F MODE 5 INTER 8×4
Fig.24G MODE 6 INTER 4×8
Fig.24H MODE 7 INTER 4×4
Fig.24I MODE 8 INTRA 4×4
Fig.24J MODE 9 INTRA 16×16

*Fig.25*

| CODING MODE | POINT |
|---|---|
| INTER CODING MODE 0 | 0 |
| INTER CODING MODE 1 | 2 |
| INTRA CODING MODE (WITH AC COEFFICIENTS) | 3 |
| INTRA CODING MODE (WITHOUT AC COEFFICIENTS) | 1 |

Fig.26A

| CODING MODE | INDEX VALUE |
|---|---|
| INTER CODING MODE 0 | 0 |
| INTER CODING MODE 1 | 1 |
| INTRA CODING MODE | 2 |

Fig.26B

| INDEX VALUE | VARIABLE-LENGTH CODE | CODE LENGTH |
|---|---|---|
| 0 | 1 | 1 |
| 1 | 010 | 3 |
| 2 | 011 | 3 |

Fig.27

| CODING MODE | POINT |
|---|---|
| MODE 0 (SKIP) | 0 |
| MODE 1 (INTER 16 × 16) | 2 |
| MODE 2 (INTER 16 × 8) | 3 |
| MODE 3 (INTER 8 × 16) | 3 |
| MODE 4 (INTER 8 × 8) | 4 |
| MODE 5 (INTER 8 × 4) | 5 |
| MODE 6 (INTER 4 × 8) | 5 |
| MODE 7 (INTER 4 × 4) | 6 |
| MODE 8 (INTRA 4 × 4) | 7 |
| MODE 9 (INTRA 16 × 16) | 1 |

Fig.28A

| CODING MODE | INDEX VALUE |
|---|---|
| MODE 0 | 0 |
| MODE 1 | 1 |
| MODE 2 | 2 |
| MODE 3 | 3 |
| MODE 4 | 4 |
| MODE 5 | 5 |
| MODE 6 | 6 |
| MODE 7 | 7 |
| MODE 8 | 8 |
| MODE 9 | 9 |

Fig.28B

| INDEX VALUE | VARIABLE-LENGTH CODE | CODE LENGTH |
|---|---|---|
| 0 | 1 | 1 |
| 1 | 010 | 3 |
| 2 | 011 | 3 |
| 3 | 00100 | 5 |
| 4 | 00101 | 5 |
| 5 | 00110 | 5 |
| 6 | 00111 | 5 |
| 7 | 0001000 | 7 |
| 8 | 0001001 | 7 |
| 9 | 0001010 | 7 |

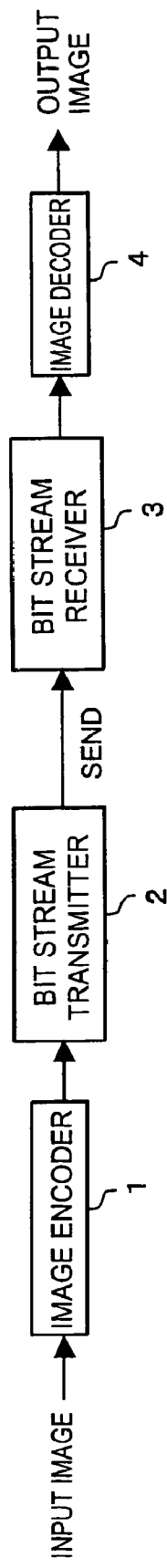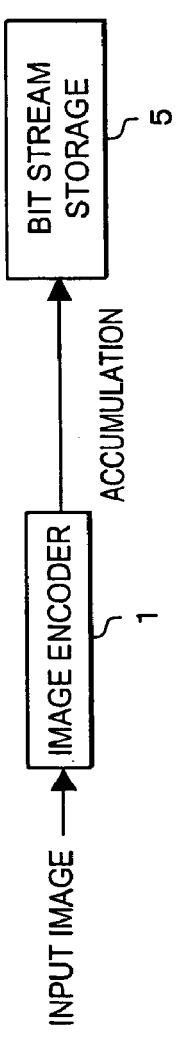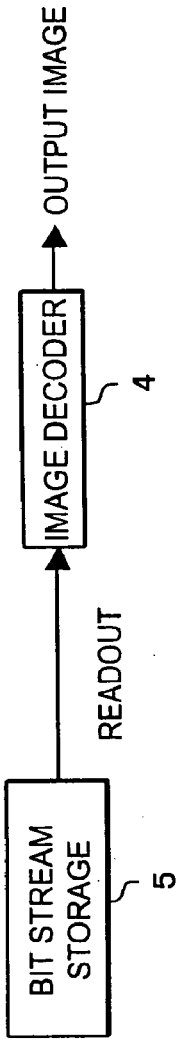
Fig.29A
Fig.29B
Fig.29C

Fig.31

| CODING MODE | POINT | MT(0) | MT(1) | MT(2) | MT(3) | MT(4) | MT(5) | MT(6) | MT(7) |
|---|---|---|---|---|---|---|---|---|---|
| MODE 0 (SKIP) | 0 | 0 | 1 | 4 | 7 | 8 | 9 | 9 | 9 |
| MODE 1 (INTER 16×16) | 2 | 2 | 2 | 0 | 2 | 5 | 7 | 7 | 7 |
| MODE 2 (INTER 16×8) | 3 | 3 | 4 | 1 | 0 | 1 | 4 | 5 | 5 |
| MODE 3 (INTER 8×16) | 3 | 4 | 5 | 2 | 1 | 2 | 5 | 6 | 6 |
| MODE 4 (INTER 8×8) | 4 | 5 | 6 | 5 | 3 | 0 | 2 | 4 | 4 |
| MODE 5 (INTER 8×4) | 5 | 6 | 7 | 7 | 4 | 3 | 0 | 1 | 2 |
| MODE 6 (INTER 4×8) | 5 | 7 | 8 | 8 | 5 | 4 | 1 | 2 | 3 |
| MODE 7 (INTER 4×4) | 6 | 8 | 9 | 9 | 8 | 6 | 3 | 0 | 1 |
| MODE 8 (INTER 4×4) | 7 | 9 | 0 | 3 | 9 | 7 | 6 | 3 | 0 |
| MODE 9 (INTER 16×16) | 1 | 1 | 3 | 6 | 6 | 9 | 8 | 8 | 8 |

Fig.34A

| LEVEL | INDEX VALUE |
|---|---|
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |
| 13 | 12 |
| 14 | 13 |
| 15 | 14 |
| 16 | 15 |
| ... | ... |

Fig.34B

| INDEX VALUE | VARIABLE-LENGTH CODE | CODE LENGTH |
|---|---|---|
| 0 | 1 | 1 |
| 1 | 010 | 3 |
| 2 | 011 | 3 |
| 3 | 00100 | 5 |
| 4 | 00101 | 5 |
| 5 | 00110 | 5 |
| 6 | 00111 | 5 |
| 7 | 0001000 | 7 |
| 8 | 0001001 | 7 |
| 9 | 0001010 | 7 |
| 10 | 0001011 | 7 |
| 11 | 0001100 | 7 |
| 12 | 0001101 | 7 |
| 13 | 0001110 | 7 |
| 14 | 0001111 | 7 |
| 15 | 000010000 | 9 |

Fig.35B

<CODE EXAMPLE BY CONVENTIONAL TECHNIQUE>
10,11,0100,0101,00010100

<CODE EXAMPLE BY PRESENT INVENTION>
10,11,0100,11,00010100

Fig.35A

| LEVEL | DIFFERENCE FROM $|Li+1|$ | INDEX VALUE |
|---|---|---|
| 1 | 1 | 1 |
| 2 | 0 | 0 |
| 3 | 1 | 2 |
| 4 | 2 | 3 |
| 5 | 3 | 4 |
| 6 | 4 | 5 |
| 7 | 5 | 6 |
| 8 | 6 | 7 |
| 9 | 7 | 8 |
| 10 | 8 | 9 |
| 11 | 9 | 10 |
| 12 | 10 | 11 |
| 13 | 11 | 12 |
| 14 | 12 | 13 |
| 15 | 13 | 14 |
| 16 | 14 | 15 |
| ... | ... | ... |

MAP TABLE FOR $|Li+1| = 2$

Fig.36

| LEVEL | INDEX VALUE |
|---|---|
| 1 | 0 |
| TWO CONSECUTIVE 1'S | 1 |
| THREE CONSECUTIVE 1'S | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |
| 16 | 17 |
| 17 | 18 |
| : | : |

Fig.37A

| INDEX VALUE | VARIABLE-LENGTH CODE | CODE LENGTH |
|---|---|---|
| 0 | 1 | 1 |
| 1 | 01 0 | 3 |
| 2 | 01 1 | 3 |
| 3 | 001 00 | 5 |
| 4 | 001 01 | 5 |
| 5 | 001 10 | 5 |
| 6 | 001 11 | 5 |
| 7 | 0001 000 | 7 |
| 8 | 0001 001 | 7 |
| 9 | 0001 010 | 7 |
| 10 | 0001 011 | 7 |
| 11 | 0001 100 | 7 |
| 12 | 0001 101 | 7 |
| 13 | 0001 110 | 7 |
| 14 | 0001 111 | 7 |
| 15 | 00001 0000 | 9 |

Fig.37B

| INDEX VALUE | VARIABLE-LENGTH CODE | CODE LENGTH |
|---|---|---|
| 0 | 1 | 1 |
| 1 | 01 | 2 |
| 2 | 001 0 | 4 |
| 3 | 001 1 | 4 |
| 4 | 0001 00 | 6 |
| 5 | 0001 01 | 6 |
| 6 | 0001 10 | 6 |
| 7 | 0001 11 | 6 |
| 8 | 00001 000 | 8 |
| 9 | 00001 001 | 8 |
| 10 | 00001 010 | 8 |
| 11 | 00001 011 | 8 |
| 12 | 00001 100 | 8 |
| 13 | 00001 101 | 8 |
| 14 | 00001 110 | 8 |
| 15 | 00001 111 | 8 |

Fig.37C

| INDEX VALUE | VARIABLE-LENGTH CODE | CODE LENGTH |
|---|---|---|
| 0 | 1 | 1 |
| 1 | 01 | 2 |
| 2 | 001 | 3 |
| 3 | 0001 0 | 5 |
| 4 | 0001 1 | 5 |
| 5 | 00001 00 | 7 |
| 6 | 00001 01 | 7 |
| 7 | 00001 10 | 7 |
| 8 | 00001 11 | 7 |
| 9 | 000001 000 | 9 |
| 10 | 000001 001 | 9 |
| 11 | 000001 010 | 9 |
| 12 | 000001 011 | 9 |
| 13 | 000001 100 | 9 |
| 14 | 000001 101 | 9 |
| 15 | 000001 110 | 9 |

Fig.38A

| INDEX VALUE | VARIABLE-LENGTH CODE | PROBABILITY TABLE |
|---|---|---|
| 0 | 1 | 0.5000000 |
| 1 | 01 0 | 0.1250000 |
| 2 | 01 1 | 0.1250000 |
| 3 | 001 00 | 0.0312500 |
| 4 | 001 01 | 0.0312500 |
| 5 | 001 10 | 0.0312500 |
| 6 | 001 11 | 0.0312500 |
| 7 | 0001 000 | 0.0078125 |
| 8 | 0001 001 | 0.0078125 |
| 9 | 0001 010 | 0.0078125 |
| 10 | 0001 011 | 0.0078125 |
| 11 | 0001 100 | 0.0078125 |
| 12 | 0001 101 | 0.0078125 |
| 13 | 0001 110 | 0.0078125 |
| 14 | 0001 111 | 0.0078125 |
| 15 | 00001 0000 | 0.0019531 |
| · · |   |   |

Fig.38B

| INDEX VALUE | VARIABLE-LENGTH CODE | PROBABILITY TABLE |
|---|---|---|
| 0 | 1 0 | 0.2500000 |
| 1 | 1 1 | 0.2500000 |
| 2 | 01 00 | 0.0625000 |
| 3 | 01 01 | 0.0625000 |
| 4 | 01 10 | 0.0625000 |
| 5 | 01 11 | 0.0625000 |
| 6 | 001 000 | 0.0156250 |
| 7 | 001 001 | 0.0156250 |
| 8 | 001 010 | 0.0156250 |
| 9 | 001 011 | 0.0156250 |
| 10 | 001 100 | 0.0156250 |
| 11 | 001 101 | 0.0156250 |
| 12 | 001 110 | 0.0156250 |
| 13 | 001 111 | 0.0156250 |
| 14 | 0001 0000 | 0.0156250 |
| 15 | 0001 0001 | 0.0078125 |
| · · |   |   |

Fig.38C

| INDEX VALUE | VARIABLE-LENGTH CODE | PROBABILITY TABLE |
|---|---|---|
| 0 | 1 00 | 0.1250000 |
| 1 | 1 01 | 0.1250000 |
| 2 | 1 10 | 0.1250000 |
| 3 | 1 11 | 0.1250000 |
| 4 | 01 000 | 0.0312500 |
| 5 | 01 001 | 0.0312500 |
| 6 | 01 010 | 0.0312500 |
| 7 | 01 011 | 0.0312500 |
| 8 | 01 100 | 0.0312500 |
| 9 | 01 101 | 0.0312500 |
| 10 | 01 110 | 0.0312500 |
| 11 | 01 111 | 0.0312500 |
| 12 | 001 0000 | 0.0078125 |
| 13 | 001 0001 | 0.0078125 |
| 14 | 001 0010 | 0.0078125 |
| 15 | 001 0011 | 0.0078125 |
| · · |   |   |

IMAGE ENCODING DEVICE, IMAGE DECODING DEVICE, IMAGE ENCODING METHOD, IMAGE DECODING METHOD, IMAGE ENCODING PROGRAM, AND IMAGE DECODING PROGRAM

TECHNICAL FIELD

The present invention relates to an image encoding apparatus, an image decoding apparatus, an image encoding method, an image decoding method, an image encoding program, and an image decoding program.

BACKGROUND ART

In recent years, systems for storage, reproduction, or transmission of image signals are becoming popular, including photo CD, video CD, DVD video (Digital Versatile Disk-Video), TV telephones, TV conferences, digital TV broadcasting, VOD (Video On Demand), and so on. In an image transmission system, as shown in FIG. 29A, on the transmitter side image encoder 1 encodes an input image into a bit stream, and bit stream transmitter 2 transmits the bit stream through a network to a receiver; on the receiver side bit stream receiver 3 receives the bit stream and image decoder 4 decodes the received bit stream to output an image. In an image storage system, as shown in FIG. 29B, image encoder 1 encodes an input image into a bit stream and the bit stream is stored in bit stream storage 5 such as a storage medium. In an image reproduction system, as shown in FIG. 29C, image decoder 4 decodes a bit stream stored in bit stream storage 5 and outputs a reproduced image.

In these systems there is a limit to a transmission band or to capacity of storage, and thus there are demands for effectively utilizing these resources by use of an image encoding system with a compression rate as high as possible. The image encoding systems can be classified into still picture encoding systems and moving picture encoding systems, an example of which will be described below using the moving picture encoding systems.

The conventionally known encoding systems for moving picture signals include the International Video Coding Standards such as ITU-T Recommendation H.263, ISO/IEC International Standard 14496-2 (MPEG-4 Visual), and so on.

In these moving picture encoding systems, generally, a motion compensated interframe prediction is performed for a frame image forming a moving picture signal supplied as a coding target, with respect to another frame image to reduce temporal redundancy in the moving picture signal; orthogonal transform and quantization operations are carried out for a difference image signal as a result of the interframe prediction or for an image signal not subjected to the interframe prediction to reduce spatial redundancy in the moving picture signal; and information source coding is further carried out for prediction and transform data such as obtained motion vector, orthogonal transform coefficients, and so on to reduce redundancy of data representation. These processes eliminate the redundancies in the moving picture signal, thus achieving efficient coding of moving picture.

In these moving picture encoding systems, the processes as described above are carried out for each of segments in a frame image, called macroblocks. In general one macroblock consists of 16 pixels×16 pixels, and a set of such macroblocks constitute a slice or a frame. On the other hand, one macroblock contains units of blocks resulting from subdivision thereof, and the aforementioned processes including the motion compensation, the orthogonal transform, etc. are carried out in units of up to macroblocks and, if necessary, in units of smaller blocks.

FIG. 1 is a flowchart schematically showing an example of a moving picture encoding method. This encoding method is an image encoding method of effecting predetermined transform and encoding operations on an input image D1 being a frame image in a moving picture or the like to generate transmissible or storable, data-compressed, coded data D9 in the image transmission system or in the image storage system.

In the image encoding method shown in FIG. 1, the data processing operation is carried out in units of macroblocks obtained by dividing the input image D1 into a predetermined size (a predetermined number of pixels). First, the input image D1 is subjected to the predetermined data processing operation to effect transformation of convert image data, thereby outputting a predictive residual image D5 expressed by space coordinates, coding mode information D3 indicating information about the data processing operation, and motion vector information D2 (step S101). The motion vector information D2 herein may contain, for example, a value of a motion vector itself or a motion vector difference value being a difference between a motion vector in a target block and a motion vector in a neighboring block.

Specifically, with reference to a predetermined image region in a local decoded image D12 described later, a search is made for an image area resembling an image of the coding target macroblock (motion search), and a motion vector is determined by an amount of spatial movement of the coding target macroblock relative to the image area resembling the coding target macroblock, detected as a result of the search (motion compensated prediction). Also generated as a predictive residual image D5 is difference data of pixel values between the coding target macroblock and the image area resembling the image data of the coding target macroblock, detected as a result of the search. Then, based on the motion vector and difference data of pixel values obtained as a result of the motion search, a macroblock coding mode to be applied to the image data is selected from a plurality of macroblock coding modes prepared.

The macroblock coding modes are generally classified under inter coding modes using the motion compensation and intra coding modes not using the motion compensation. In the inter coding modes, the motion compensation is applied to a macroblock, and predictive residuals of pixel values obtained as a result thereof are outputted as a predictive residual image D5. In the intra coding modes, predicted values of pixel values in the macroblock are set to 0, whereby the input image D1 is directly outputted as a predictive residual image D5. Information indicating a selected coding mode and a quantization parameter is outputted as coding mode information D3, and information about the motion vector as motion vector information D2.

Then the predictive residual image D5 is subjected to an orthogonal transform operation to generate a plurality of orthogonal transform coefficients D6 which are image data expressed by space frequencies (frequency image data) (step S102). This orthogonal transform is carried out for each of blocks resulting from subdivision of each macroblock, to yield orthogonal transform coefficients of each block.

The orthogonal transform coefficients are quantized by use of a predetermined quantization parameter to obtain quantized orthogonal transform coefficients D7 (step S103).

In passing, the quantization of a certain block results in producing the orthogonal transform coefficients all being zero in the block. There is no need for performing the coding of information about orthogonal transform coefficients for such an ineffective block with all the orthogonal transform coefficients of zero. Then the coding of coefficient information of an ineffective block is omitted by use of coded block pattern information (which will be referred to hereinafter as CBP representing Coded Block Pattern) indicating whether there is a significant quantized orthogonal transform coefficient in the block, thereby increasing efficiency of coding.

There are also cases where the result of the quantization process is that all the orthogonal transform coefficients are zero in all the blocks in a macroblock and each component of a motion vector is also zero. For such an ineffective macroblock with all the orthogonal transform coefficients of zero, there is no need for performing the coding of information about the macroblock. Such ineffective macroblocks frequently appear in stationary background portions and the like, and thus a macroblock coding flag (COD flag) is used for each macroblock to discriminate whether the macroblock is effective or ineffective.

The CBP and the COD flag are outputted as coding supplementary information D8.

Subsequently, variable-length coding and multiplexing operations are carried out for the motion vector information D2, coding mode information D3, quantized orthogonal transform coefficients D7, and coding supplementary information D8 to generate coded data D9 being compressed data (step S104).

Specifically, the variable-length coding using a variable-length coding table is effected on each of coding symbols included in the motion vector information D2, coding mode information D3, quantized orthogonal transform coefficients D7, and coding supplementary information D8 to generate the coded data D9.

FIG. 2 is a block diagram showing an example of a configuration of an image encoding apparatus. The image encoding method shown in FIG. 1 will be further described below with reference to the image encoding apparatus shown in FIG. 2.

With an input image D1 supplied as a coding target, first, a luma (luminance) signal image frame is divided into macroblocks of square image blocks in the size of 16 pixels×16 lines, and a chroma (color-difference) signal image frame into macroblocks of square image blocks in the size of 8 pixels×8 lines. These macroblocks are image blocks used as units of the data processing including the motion compensation and others. In after-described DCT (an orthogonal transform, e.g., in the MPEG-4 coding system, the blocks used are DCT blocks of the size of 8 pixels×8 lines. In this case, one macroblock has four luma (Y) blocks and two chroma (Cb, Cr) blocks in DCT. Image coding is carried out for each of these blocks.

The input image D1 is fed into a motion compensation means consisting of motion detector 11 and motion compensator 12. First, the input image D1 is fed into motion detector 11 and a motion of image is detected for each macroblock. The motion detector 11 compares image data of the coding target macroblock with image data in an image region of the same size as the macroblock, in a local decoded image to detect an image area resembling the image of the coding target macroblock and generate a motion vector D2 indicating a motion of the image.

Specifically, the motion detector 11 searches for an image area resembling the macroblock as a coding target in the input image D1, with reference to a predetermined image region in a local decoded image D12 stored as a previously coded frame image in frame memory 20. Then motion vector information D2 is determined by an amount of spatial movement between the coding target macroblock and the image area resembling the image data of the coding target macroblock, detected as a result of the search.

At this time, a coding mode applied to the coding target macroblock is also selected out of a plurality of coding modes prepared in advance. FIGS. 3A-3C are schematic diagrams showing an example of the coding modes prepared for the motion compensation. The coding mode exemplified in FIG. 3A is an inter coding mode 0, the coding mode in FIG. 3B an inter coding mode 1, and the coding mode in FIG. 3C an intra coding mode 2.

The inter coding modes 0-1 are modes of carrying out interframe coding, using mutually different block segmentation ways into motion compensation blocks. Concerning the motion compensation blocks in each mode, as shown in FIG. 3A, the inter coding mode 0 uses one block in the size of 16 pixels×16 lines for a luma component image. As shown in FIG. 3B, the inter coding mode 1 uses four blocks in the size of 8 pixels×8 lines for a luma component image.

The aforementioned motion vector information D2 is given to each motion compensation block segmented in the selected inter coding mode. Therefore, each macroblock is given the motion vector information D2 by the number of segment blocks. The motion vector information D2 is assigned to each motion compensation block, for example, according to the order indicated by numbers in each coding mode in FIGS. 3A-3C. In the both inter coding modes, a block in the size of 8 pixels×8 lines is used for a chroma component image, and a motion vector assigned thereto is one in a length equal to a half of a motion vector for a luma component image.

An example of the coding mode selecting method is as follows: for example, a variance value is first determined of pixel values in a predictive residual image after the motion compensation in a macroblock; where the variance value is larger than a preset threshold or larger than a variance value of pixel values in the macroblock in the input image, the intra coding mode is selected; the inter coding mode is selected in the other cases. This means that the intra coding mode is selected where the image data of the macroblock is complex.

When the inter coding mode is selected, the motion search is carried out for each of the four segment blocks of a macroblock to generate motion vectors and difference values of image data corresponding to the respective blocks. Then calculated are a code amount M(MV) for one motion vector in the inter coding mode 0 and a total M(4MV) of code amounts for four motion vectors in the inter coding mode 1. Further calculated are difference values D(MV) of image data in the inter coding mode 0 and a total D(4MV) of difference values of image data in the inter coding mode 1. Then, using a preset coefficient α, a comparison is made between values of M(MV)+α·D(MV) and M(4MV)+α·D(4MV); for example, when the former is smaller than or equal to the latter, the inter coding mode 0 is selected; when the latter is smaller, the inter coding mode 1 is selected.

Where the coding mode is the inter coding mode, after a motion vector is obtained for each motion compensation block, motion compensator 12 generates a predicted image D4, using the motion vector information D2 from motion detector 11 and the local decoded image D12 from frame memory 20. Subsequently, subtracter 13 calculates the difference (predictive residual) between input image D1 and predicted image D4 to generate a predictive residual image D5.

Where the coding mode is the intra coding mode, the pixel data of predicted image D4 is set to 0, whereby the input image D1 is directly outputted as a predictive residual image D5.

The information indicating the selected coding mode, and the quantization parameter are outputted as coding mode information D3, and the information about the motion vector as motion vector information D2.

The image data of predictive residual image D5 is fed into orthogonal transform part (orthogonal transform means) 14. The orthogonal transform part 14 performs the orthogonal transform for each orthogonal transform block included in a macroblock of the predictive residual image D5, to generate orthogonal transform coefficients D6 being frequency image data. For example, in MPEG-4, a macroblock includes four blocks of the size of 8 pixels×8 lines for each luma component image, and a macroblock includes one orthogonal transform block of the size of 8 pixels×8 lines for each chroma component image.

FIGS. 4A and 4B are diagrams showing the orthogonal transform of image data. Image data of each block resulting from the division for the orthogonal transform, in the predictive residual image D5 is space image data and, as exemplified by image components of 8 pixels×8 lines in FIG. 4A, it is represented by space image components $a_{11}$-$a_{88}$ of 8 pixels×8 lines defined by horizontal coordinates and vertical coordinates. The orthogonal transform part 14 performs the orthogonal transform of this space image data by a predetermined transformation method to transform it into frequency image data as shown in FIG. 4B. This frequency image data is represented by orthogonal transform coefficients $f_{11}$-$f_{88}$ being frequency image components of 8 pixels×8 lines defined by horizontal frequencies and vertical frequencies.

A specific orthogonal transform applicable herein is, for example, the Discrete Cosine Transform (DCT). The DCT is an orthogonal transform using the cosine terms of the Fourier transform and is often used in image coding. The DCT over the space image data generates the DCT coefficients $f_{11}$-$f_{88}$ being frequency image data. In the DCT, for example, in the MPEG-4 coding system, DCT blocks of 8 pixels×8 lines as shown in FIGS. 4A, 4B are used as blocks for the orthogonal transform.

Quantizer 15 quantizes the orthogonal transform coefficients D6 generated in this way, by a predetermined quantization parameter to yield quantized orthogonal transform coefficients D7. The quantizer also generates CBPs indicating whether there is a significant orthogonal transform coefficient, in units of blocks and, a COD flag indicating whether a macroblock contains a significant orthogonal transform coefficient, and outputs them as coding supplementary information D8.

The quantized orthogonal transform coefficients D7 and coding supplementary information D8 generated by quantizer 15 are subjected to variable-length coding at variable-length encoder 16, which generates coded data D9 being compressed data of the input image D1. The variable-length encoder 16 further receives input of the motion vector information D2 detected by the motion detector 11 and the coding mode information D3 indicating the coding mode selected at motion detector 11, and the quantization parameter. These motion vector information D2 and coding mode information D3 are also subjected to the variable-length coding at variable-length encoder 16, and the resultant data is multiplexed over the coded data D9.

In the present image encoding apparatus, the quantized orthogonal transform coefficients D7 generated at quantizer 15 are dequantized by dequantizer 17 to yield dequantized orthogonal transform coefficients D10, and they are further subjected to an inverse orthogonal transform at inverse orthogonal transform part 18 to yield a local decoded residual image D11. Then the local decoded residual image D11 and the predicted image D4 are added at adder 19 to generate a local decoded image D12. This local decoded image D12 is stored into frame memory 20 to be utilized for the motion compensation of another frame image.

An example of a moving picture decoding method and moving picture decoding apparatus will be described below.

FIG. 5 is a flowchart schematically showing an example of an image decoding method. The present decoding method is an image decoding method of effecting predetermined decoding and transformation operations on coded data D9 generated by the image encoding method shown in FIG. 1, to restore a decoded image D12 as an image identical to the local decoded image D12.

In the image decoding method shown in FIG. 5, first, the coded data D9 is subjected to variable-length decoding using a variable-length decoding table to generate quantized orthogonal transform coefficients D7 (step S201). The motion vector information D2, coding mode information D3, and coding supplementary information D8 are also variable-length decoded similarly from the coded data D9 by use of the variable-length decoding table.

Specifically, a variable-length decoding table is first set as a table to be applied to the coded data D9, and the coded data is variable-length decoded by use of the variable-length decoding table to generate coding symbols of the respective information items.

Then the quantized orthogonal transform coefficients D7 are subjected to a dequantization operation to generate dequantized orthogonal transform coefficients D10 (step S202) and an inverse orthogonal transform operation is further carried out to generate a local decoded residual image D11 (step S203). Then, using the local decoded residual image D11 and a previously decoded frame, the motion compensation is carried out by applying a coding mode indicated by the coding mode information D3, to restore the decoded image D12 (S204).

FIG. 6 is a block diagram schematically showing a configuration of an example of a moving picture decoding apparatus.

Coded data D9 supplied as a decoding target is fed into variable-length decoder 21 which performs the variable-length decoding using a predetermined variable-length decoding table to generate decoding symbols of the motion vector information D2, coding mode information D3, quantized orthogonal transform coefficients D7, and coding supplementary information D8. Specifically, for data-compressed coded data D9, the variable-length decoder 21 retrieves each data included for each macroblock in the coded data D9, from a bit stream while starting from the head of the frame image, and it variable-length decodes the data to generate the motion vector information D2, coding mode information D3, quantized orthogonal transform coefficients D7, and coding supplementary information D8. The variable-length decoding table used for the variable-length decoding is switched to another according to each symbol as occasion demands, as described above.

The quantized orthogonal transform coefficients D7 are subjected to dequantization and inverse orthogonal transform at dequantizer 22 and inverse orthogonal transformer 23. This results in generating a local decoded residual image D11. This local decoded residual image D11 is an image corresponding to the predictive residual image D5 before the coding, but some information is lost through the quantization and dequantization processes.

On the other hand, the motion vector information D2 and coding mode information D3 is fed into motion compensator 24. The motion compensator 24 performs the motion compensation for the image by the coding mode indicated by the coding mode information D3 to generate a predicted image D4, using the motion vector information D2 from the variable-length decoder 21 and a decoded image stored in frame memory 25. Then adder 26 adds the local decoded residual image D11 and the predicted image D4 to output a recovered frame image as a decoded image D12.

DISCLOSURE OF THE INVENTION

In the conventional, common moving-picture coding systems, as described above, the coded block pattern information (CBP) indicating whether significant image data is present was transmitted for each predetermined block in a macroblock, so as to permit omission of transmission of image data in units of blocks, thereby increasing the efficiency of coding. The coded block pattern information was provided using different entropy codes between luma signals and chroma signals to apply more suitable entropy codes according to characteristics of the respective signals, thereby increasing the efficiency of coding.

The coded block pattern information indicating significant image data in each block can be said to indicate likelihood of occurrence of significant image data in the macroblock, or an appearance pattern in each block with significant image data. Such information largely differs in its property, depending upon the coding condition and the property of image, even among signals of the same kind, luma signals or chroma signals.

For example, the moving picture coding involves the quantization of orthogonal transform coefficients by the quantization parameter and, in that process, a transaction of decreasing the quantity of image data is carried out by setting 0 for orthogonal transform coefficients of small values with little effect on the quality of decoded image so as to omit them.

At this time, where the quantization parameter takes a large value, coarser quantization is made, so as to omit many orthogonal transform coefficients assigned 0, thereby decreasing the number of blocks with significant image data. At this time, efficient coding can be performed by information source coding to assign codes of short code lengths to the coded block pattern information for few blocks with significant image data.

Where the quantization parameter takes a small value on the other hand, finer quantization is made, so as to decrease the number of orthogonal transform coefficients assigned 0 to be omitted, so that there are many blocks with significant image data. In this case, efficient coding can be performed by information source coding to assign codes of longer code lengths to the coded block pattern information for many blocks with significant image data.

For example, in the moving picture coding, the processing of motion compensated interframe predictive coding tends to make an unsuccessful prediction and provide large signals of difference image in an area where the motion is significant and complex on an image, whereas it tends to make a successful prediction and provide small signals of difference image in an area where the motion is small and simple on the image.

At this time, there are many blocks with significant image data in the case of the large signals of difference image, while there are few blocks with significant image data in the case of the small signals of difference image. If the coded block pattern information is coded by one information source coding means even in those cases, it will be difficult to achieve efficient coding in the both cases.

Concerning the motion vector, it is common practice to perform information source coding of a difference motion vector, which is a difference between a predicted motion vector resulting from a prediction of a motion vector value in a block as a target for coding from values of motion vectors in neighboring blocks, and an actual motion vector. The magnitudes of difference motion vectors tend to converge on 0 in the case where the motion is monotonic in neighboring images, whereas the magnitudes of difference motion vectors tend not to converge on 0 in the case where the motion is intense in neighboring images. In such cases, therefore, if the difference motion vectors are coded by one information source coding means, it will also be difficult to achieve efficient coding in the both cases.

As for the coding modes of macroblocks, characteristics of probability distribution of occurring coding modes are significantly different between in cases where the motion and texture are complex in neighboring images and in cases where they are monotonic, and thus, if the coding modes are encoded by one information source coding means, it will also be difficult to achieve efficient coding in the both cases.

Concerning the quantized orthogonal transform coefficients, characteristics of distribution of coefficients occurring in the block are also significantly different, depending upon the coding condition and the property of image. For example, where the quantization parameter takes a small value, finer quantization is made, and thus more quantized orthogonal transform coefficients of large values tend to occur; where the quantization parameter takes a large value, quantized orthogonal transform coefficients of small values tend to occur readily. In these cases, if the quantized orthogonal transform coefficients are encoded by one information source coding means, it will also be difficult to achieve efficient coding in the both cases.

The quantized orthogonal transform coefficients will be described below in more detail. In the conventional, common image coding systems, as described above, the quantized orthogonal transform coefficients were further subjected to the variable-length coding or information source coding, so as to decrease the volume of information necessary for transmission of the orthogonal transform coefficients, thereby increasing the efficiency of coding.

Concerning the orthogonal transform coefficients, the property of what kind of information tends to occur varies depending upon the property of image. For example, depending upon whether the intra coding mode or the inter coding mode is applied in the moving picture coding, the image subject to the orthogonal transform differs, either the image itself or the residual image after the motion compensation, so that the property of the orthogonal transform coefficients can significantly differ as well. For this reason, the common moving picture coding systems are configured to prepare dedicated variable-length coding tables for the orthogonal transform coefficients in the respective coding modes, so as to implement the information source coding suitable for the properties of the orthogonal transform coefficients in the respective modes.

However, the orthogonal transform coefficients change their property of what kind of information tends to occur, also depending upon situations of the orthogonal transform coefficients themselves to be encoded.

The orthogonal transform coefficients are those obtained as a result of a transformation to transform image signals into discrete signals in the spatial frequency domain by an orthogonal transform. Therefore, a natural image has a high correlation between adjacent pixels and provides stronger signals in the low spatial frequency domain, and thus the orthogonal transform coefficients resulting from the orthogonal transform generally have such characteristics that large coefficient values are likely to appear densely in the low frequency domain, while in the high frequency domain nonzero coefficient values are unlikely to occur and rarely take large values. Furthermore, in the common image coding systems, the aforementioned quantization involves a transaction of zeroing the orthogonal transform coefficients of small values in the high frequency domain. This is the transaction to increase the coding efficiency by decreasing signals with less effect on the human vision, but this transaction enhances the tendency that coefficient values are unlikely to appear in the high frequency domain.

The orthogonal transform coefficients are not completely off the correlation as to occurrence of each coefficient in natural images; for example, where image signals contain signals with large pixel values, many coefficients orthogonally transformed therefrom will take large values. Conversely, if two orthogonal transform coefficients belong to their respective frequency regions apart from each other, the correlation will be low between the coefficients, while also affected by the aforementioned difference in property depending upon the frequency domains.

While the orthogonal transform coefficients largely vary their property depending upon the frequency regions to which they belong, the common image coding systems adopt the uniform information source coding in spite of the change of the property thereof, which posed the problem that the efficient information source coding was not achieved.

As described above, the conventional moving picture coding had the problem that the information source coding was not efficiently performed, because the property of the coding-related information varied depending upon the coding condition and the property of image.

The present invention has been accomplished in order to solve the problems described above, and an object of the present invention is to provide an image encoding apparatus, an image decoding apparatus, an image encoding method, an image decoding method, an image encoding program, and an image decoding program capable of efficiently performing the information source coding of the coding-related information according to the coding condition and the property of image.

In order to achieve the above object, an image encoding apparatus of the present invention is an image encoding apparatus comprising: a motion detection part for dividing a coding target image into macroblocks of a predetermined size, dividing each said macroblock into blocks of a predetermined shape and size specified based on a macroblock type, and performing a motion compensated prediction in each unit of said block to output a motion vector; a motion compensation part for generating a predicted image from a reference image on the basis of the motion vector outputted from the motion detection part; a subtraction part for calculating a difference between the predicted image generated by the motion compensation part, and the coding target image to output a predictive residual image; a transform part for performing transform coding of the predictive residual image outputted from the subtraction part, in each unit of a predetermined transform block to output transform coefficients; a quantization part for quantizing the transform coefficients outputted from the transform part, based on a quantization parameter, to output quantized transform coefficients; and an encoding part for performing compression coding of coding-related information containing the motion vector outputted from the motion detection part, the macroblock type, the quantization parameter, and the quantized transform coefficients outputted from the quantization part, to output coded data; wherein the encoding part comprises a coded symbol memory for memorizing the coding-related information; a coding procedure provider for providing one or more types of coding procedures; and a coded data outputting part for selecting one of the coding procedures provided by the coding procedure provider, based on a predetermined coding procedure selection criterion, using the coding-related information stored in the coded symbol memory, and for performing the compression coding of the coding-related information on the basis of the selected coding procedure to output the coded data.

An image decoding apparatus corresponding thereto is an image decoding apparatus comprising a decoding part for decoding coded data obtained by dividing a coding target image into macroblocks of a predetermined size, dividing each said macroblock into blocks of a predetermined shape and size specified based on a macroblock type, performing a motion compensated prediction in each unit of said block to output a motion vector, generating a predicted image from a reference image on the basis of the motion vector, calculating a difference between the predicted image and the coding target image to output a predictive image, performing transform coding of the predictive residual image in each unit of a predetermined transform block to output transform coefficients, quantizing the transform coefficients on the basis of a quantization parameter to output quantized transform coefficients, and performing compression coding of coding-related information containing the motion vector, the quantized transform coefficients, the macroblock type, and the quantization parameter to yield coded data, wherein the decoding part comprises a decoded symbol memory for memorizing the coding-related information previously decoded; a decoding procedure provider for providing one or more types of decoding procedures; and a decoded data outputting part for selecting a decoding procedure which is one of the decoding procedures provided by the decoding procedure provider and which corresponds to a coding procedure used in the coding of the coding-related information as a decoding target, based on a predetermined decoding procedure selection criterion, using the coding-related information previously decoded and stored in the decoded symbol memory, and for decoding the coding-related information on the basis of the selected decoding procedure to output decoded data.

In order to achieve the above object, an image encoding method of the present invention is an image encoding method comprising: a motion detection step of dividing a coding target image into macroblocks of a predetermined size, dividing each said macroblock into blocks of a predetermined shape and size specified based on a macroblock type, and performing a motion compensated prediction in each unit of said block to output a motion vector; a motion compensation step of generating a predicted image from a reference image on the basis of the motion vector outputted in the motion detection step; a subtraction step of calculating a difference between the predicted image generated in the motion compensation step, and the coding target image to output a predictive residual image; a transform step of performing transform coding of the predictive residual image outputted in the subtraction step, in each unit of a predetermined transform block to output transform coefficients; a quantization step of quantizing the transform coefficients outputted in the transform step, based on a quantization parameter, to output quantized transform coefficients; and an encoding step of performing compression coding of coding-related information containing the motion vector outputted in the motion detection step, the macroblock type, the quantization parameter, and the quantized transform coefficients outputted in the quantization step, to output coded data; wherein the encoding step is to prepare one or more types of coding procedures, select a coding procedure out of the one or more types of coding procedures, based on a predetermined coding procedure selection criterion, using the coding-related information stored in a coded symbol memory, and perform the compression coding of the coding-related information on the basis of the selected coding procedure to output the coded data.

An image decoding method corresponding thereto is an image decoding method comprising a decoding step of decoding coded data obtained by dividing a coding target image into macroblocks of a predetermined size, dividing each said macroblock into blocks of a predetermined shape and size specified based on a macroblock type, performing a motion compensated prediction in each unit of said block to output a motion vector, generating a predicted image from a reference image on the basis of the motion vector, calculating a difference between the predicted image and the coding target image to output a predictive image, performing transform coding of the predictive residual image in each unit of a predetermined transform block to output transform coefficients, quantizing the transform coefficients on the basis of a quantization parameter to output quantized transform coefficients, and performing compression coding of coding-related information containing the motion vector, the quantized transform coefficients, the macroblock type, and the quantization parameter to yield coded data, wherein the decoding step is to prepare one or more types of decoding procedures, select a decoding procedure which is one of said one or more types of decoding procedures and which corresponds to a coding procedure used in the coding of the coding-related information as a decoding target, based on a predetermined decoding procedure selection criterion, using the coding-related information previously decoded and stored in a decoded symbol memory, and decode the coding-related information on the basis of the selected decoding procedure to output decoded data.

In order to achieve the above object, an image encoding program of the present invention is an image encoding program for letting a computer function as: motion detection means for dividing a coding target image into macroblocks of a predetermined size, dividing each said macroblock into blocks of a predetermined shape and size specified based on a macroblock type, and performing a motion compensated prediction in each unit of said block to output a motion vector; motion compensation means for generating a predicted image from a reference image on the basis of the motion vector outputted from the motion detection means; subtraction means for calculating a difference between the predicted image generated by the motion compensation means, and the coding target image to output a predictive residual image; transform means for performing transform coding of the predictive residual image outputted from the subtraction means, in each unit of a predetermined transform block to output transform coefficients; quantization means for quantizing the transform coefficients outputted from the transform means, based on a quantization parameter, to output quantized transform coefficients; and encoding means for performing compression coding of coding-related information containing the motion vector outputted from the motion detection means, the macroblock type, the quantization parameter, and the quantized transform coefficients outputted from the quantization means, to output coded data; wherein the encoding means comprises coding procedure providing means for providing one or more types of coding procedures; and coded data outputting means for selecting one of the coding procedures provided by the coding procedure providing means, based on a predetermined coding procedure selection criterion, using the coding-related information stored in a coded symbol memory, and for performing the compression coding of the coding-related information on the basis of the selected coding procedure to output the coded data.

An image decoding program corresponding thereto is an image decoding program for letting a computer function as: decoding means for decoding coded data obtained by dividing a coding target image into macroblocks of a predetermined size, dividing each said macroblock into blocks of a predetermined shape and size specified based on a macroblock type, performing a motion compensated prediction in each unit of said block to output a motion vector, generating a predicted image from a reference image on the basis of the motion vector, calculating a difference between the predicted image and the coding target image to output a predictive image, performing transform coding of the predictive residual image in each unit of a predetermined transform block to output transform coefficients, quantizing the transform coefficients on the basis of a quantization parameter to output quantized transform coefficients, and performing compression coding of coding-related information containing the motion vector, the quantized transform coefficients, the macroblock type, and the quantization parameter to yield coded data, wherein the decoding means comprises a decoding procedure providing means for providing one or more types of decoding procedures; and decoded data outputting means for selecting a decoding procedure which is one of the decoding procedures provided by the decoding procedure providing means and which corresponds to a coding procedure used in the coding of the coding-related information as a decoding target, based on a predetermined decoding procedure selection criterion, using the coding-related information previously decoded and stored in a decoded symbol memory, and for decoding the coding-related information on the basis of the selected decoding procedure to output decoded data.

The above-described image encoding apparatus, image encoding method, and image encoding program are configured to prepare a plurality of procedures for performing the information source coding of one coding-related information and select a procedure to be used in the information source coding of the coding-related information in a block, out of these procedures. Therefore, the procedure to be used in the information source coding, which is suitable for the property of each coding symbol varying as described above, can be selected from the plurality of procedures. As a result, it becomes feasible to efficiently perform the information source coding of the coding symbol, according to the coding condition and the property of image.

The above-described image decoding apparatus, image decoding method, and image decoding program are configured to prepare a plurality of procedures for information source decoding of one coding-related information and select a procedure to be used in the information source decoding of the coding-related information in a block, out of these procedures. Therefore, it is feasible to correctly decode the coded data coded by the aforementioned image encoding apparatus, image encoding method, and image encoding program.

The image encoding apparatus of the present invention can also be configured so that the encoding part has a function of performing compression coding of coded block pattern information containing a nonzero coefficient existence flag indicating whether there exists a nonzero, said quantized transform coefficient, for each said transform block in a said macroblock, and so that, on the occasion of encoding the coded block pattern information in the coding target macroblock, the coding procedure provider provides a coding procedure of decreasing a code length as a spatial correlation of the coded block pattern information becomes higher between the coding target macroblock and a neighboring macroblock thereto.

In the image decoding apparatus corresponding thereto, the decoding part has a function of, for each of the transform blocks in a said macroblock, decoding coded block pattern information containing a nonzero coefficient existence flag indicating whether there exists a nonzero, said quantized transform coefficient, and, on the occasion of decoding the coded block pattern information in the coding target macroblock, the decoding procedure provider provides a decoding procedure corresponding to a coding procedure provided so as to decrease a code length as a spatial correlation of the coded block pattern information becomes higher between the coding target macroblock and a neighboring macroblock thereto.

The image encoding apparatus of the present invention can also be configured so that, where a macroblock type in a neighboring macroblock to the coding target macroblock is one indicating division of the coding target macroblock into a maximum number of blocks, the coding procedure provider assumes that all the coding blocks in the coding target macroblock have the coded block pattern information indicating inclusion of a nonzero quantized transform coefficient, and, on the occasion of encoding the coded block pattern information in the coding target macroblock, the coding procedure provider provides a coding procedure of decreasing a code length as a spatial correlation of the coded block pattern information becomes higher between the coding target macroblock and the neighboring macroblock thereto.

In the image decoding apparatus corresponding thereto, where a macroblock type in a neighboring macroblock to the coding target macroblock is one indicating division of the coding target macroblock into a maximum number of blocks, the decoding procedure provider assumes that all the coding blocks in the coding target macroblock have the coded block pattern information indicating inclusion of a nonzero quantized transform coefficient, and, on the occasion of decoding the coded block pattern information in the coding target macroblock, the decoding procedure provider provides a decoding procedure corresponding to a coding procedure provided so as to decrease a code length as a spatial correlation of the coded block pattern information becomes higher between the coding target macroblock and the neighboring macroblock thereto.

Furthermore, the image encoding apparatus of the present invention can also be configured so that, on the occasion of encoding the coded block pattern information in the coding target macroblock, where a size of the quantization parameter in the coding target macroblock is greater than a preset threshold, the coding procedure provider provides a coding procedure of setting a shorter code length for the coded block pattern information indicating a smaller number of blocks containing a nonzero quantized transform coefficient.

In the image decoding apparatus corresponding thereto, on the occasion of decoding the coded block pattern information in the coding target macroblock, where a size of the quantization parameter in the coding target macroblock is larger than a preset threshold, the decoding procedure provider provides a decoding procedure corresponding to a coding procedure provided so as to set a shorter code length for the coded block pattern information indicating a smaller number of blocks including a nonzero quantized transform coefficient.

The image encoding apparatus of the present invention can also be configured so that, on the occasion of encoding the coded block pattern information in the coding target macroblock, the coding procedure provider provides a coding procedure of setting a smaller deviation of code lengths with increase in the number of blocks in a neighboring macroblock to the coding target macroblock.

In the image decoding apparatus corresponding thereto, on the occasion of decoding the coded block pattern information in the coding target macroblock, the decoding procedure provider provides a decoding procedure corresponding to a coding procedure provided so as to set a smaller deviation of code lengths with increase in the number of blocks in a neighboring macroblock to the coding target macroblock.

The image encoding apparatus of the present invention can also be configured so that, on the occasion of encoding the quantized transform coefficients in the coding target macroblock, the coding procedure provider provides a coding procedure of setting a smaller deviation of code lengths with increase in absolute values of the quantized transform coefficients in a neighboring macroblock to the coding target macroblock.

In the image decoding apparatus corresponding thereto, on the occasion of decoding the quantized transform coefficients in the coding target macroblock, the decoding procedure provider provides a decoding procedure corresponding to a coding procedure provided so as to set a smaller deviation of code lengths with increase in absolute values of the quantized transform coefficients in a neighboring macroblock to the coding target macroblock.

The image encoding apparatus of the present invention can also be configured so that, on the occasion of encoding the macroblock type in the coding target macroblock, the coding procedure provider provides a coding procedure of decreasing a code length as a spatial correlation of the macroblock type becomes higher between the coding target macroblock and a neighboring macroblock thereto.

In the image decoding apparatus corresponding thereto, on the occasion of decoding the macroblock type in the coding target macroblock, the decoding procedure provider provides a decoding procedure corresponding to a coding procedure provided so as to decrease a code length as a spatial correlation of the macroblock type becomes higher between the coding target macroblock and a neighboring macroblock thereto.

The image encoding apparatus of the present invention can also be configured so that, on the occasion of encoding the macroblock type in the coding target macroblock, the coding procedure provider provides a coding procedure of setting a shorter code length for a macroblock type including a larger number of blocks.

In the image decoding apparatus corresponding thereto, on the occasion of decoding the macroblock type in the coding target macroblock, the decoding procedure provider provides a decoding procedure corresponding to a coding procedure provided so as to set a shorter code length for a macroblock type including a larger number of blocks.

The image encoding apparatus of the present invention can also be configured so that the encoding part has a function of encoding a number of said nonzero quantized transform coefficients in the block, and so that, on the occasion of encoding the number of said nonzero quantized transform coefficients in the coding target macroblock, where the number of said nonzero quantized transform coefficients in a neighboring block to the coding target block is smaller than a preset threshold, the coding procedure provider provides a coding procedure of decreasing a code length with decrease in the number of said nonzero quantized transform coefficients.

In the image decoding apparatus corresponding thereto, the decoding part has a function of decoding a number of said nonzero quantized transform coefficients in the block, and, on the occasion of decoding the number of said nonzero quantized transform coefficients in the coding target macroblock, where the number of said nonzero quantized transform coefficients in a neighboring block to the coding target block is smaller than a preset threshold, the decoding procedure provider provides a decoding procedure corresponding to a coding procedure provided so as to decrease a code length with decrease in the number of said nonzero quantized transform coefficients.

The image encoding apparatus of the present invention can also be configured so that the coded symbol memory has a function of holding a difference motion vector value being a difference between a predicted motion vector predicted from a neighboring block, and an actual motion vector, and so that, on the occasion of encoding the coded block pattern information in the coding target macroblock, where a magnitude of the difference motion vector value in a neighboring macroblock to the coding target macroblock is larger than a preset threshold, the coding procedure provider provides a coding procedure of setting a shorter code length for coded block pattern information indicating a larger number of blocks containing a nonzero quantized transform coefficient.

In the image decoding apparatus corresponding thereto, the decoded symbol memory has a function of holding a difference motion vector value being a difference between a predicted motion vector predicted from a neighboring block, and an actual motion vector, and, on the occasion of decoding the coded block pattern information in the coding target macroblock, where a magnitude of the difference motion vector value in a neighboring macroblock to the coding target macroblock is larger than a preset threshold, the decoding procedure provider provides a decoding procedure corresponding to a coding procedure provided so as to set a shorter code length for coded block pattern information indicating a larger number of blocks containing a nonzero quantized transform coefficient.

The image encoding apparatus of the present invention can also be configured so that the coded symbol memory has a function of holding a difference motion vector value being a difference between a predicted motion vector predicted from a neighboring block, and an actual motion vector, and so that, on the occasion of encoding the difference motion vector value in the coding target macroblock, where a magnitude of the difference motion vector value in a neighboring block to the coding target block is smaller than a preset threshold, the coding procedure provider provides a coding procedure of setting a shorter code length for a smaller difference motion vector value.

In the image decoding apparatus corresponding thereto, the decoded symbol memory has a function of holding a difference motion vector value being a difference between a predicted motion vector predicted from a neighboring block, and an actual motion vector, and, on the occasion of decoding the difference motion vector value in the coding target macroblock, where a magnitude of the difference motion vector value in a neighboring block to the coding target block is smaller than a preset threshold, the decoding procedure provider provides a decoding procedure corresponding to a coding procedure provided so as to set a shorter code length for a smaller difference motion vector value.

The image encoding apparatus of the present invention can also be configured so that the coded symbol memory has a function of holding a difference motion vector value being a difference between a predicted motion vector predicted from a neighboring block, and an actual motion vector, and so that, on the occasion of encoding the macroblock type in the coding target macroblock, where a magnitude of the difference motion vector value in a neighboring block to the coding target block is larger than a preset threshold, the coding procedure provider provides a coding procedure of setting a shorter code length for a macroblock type including a larger number of blocks.

In the image decoding apparatus corresponding thereto, the decoded symbol memory has a function of holding a difference motion vector value being a difference between a predicted motion vector predicted from a neighboring block, and an actual motion vector, and, on the occasion of decoding the macroblock type in the coding target macroblock, where a magnitude of the difference motion vector value in a neighboring block to the coding target block is larger than a preset threshold, the decoding procedure provider provides a decoding procedure corresponding to a coding procedure provided so as to set a shorter code length for a macroblock type including a larger number of blocks.

In order to achieve the above object, another image encoding apparatus of the present invention is an image encoding apparatus comprising: a transform part for dividing a coding target image or a predictive residual image generated based on the coding target image, into predetermined transform blocks, and for performing transform coding of the coding target image or the predictive residual image in each unit of said transform block to output transform coefficients; a quantization part for quantizing the transform coefficients outputted from the transform part, based on a quantization parameter, to output quantized transform coefficients; and an encoding part for performing compression coding of coding-related information containing the quantization parameter and the quantized transform coefficients outputted from the quantization part, to output coded data; wherein the encoding part has a function of converting the quantized transform coefficients in the coding target block to a one-dimensional string according to frequencies and encoding a zero run value being a number of consecutive coefficients providing 0 as an absolute value of the quantized transform coefficients in the one-dimensional string, a level value being an absolute value of a said quantized transform coefficient, and a positive/negative sign indicating whether the quantized transform coefficient is positive or negative, and comprises a coded symbol memory for memorizing the coding-related information; a coding procedure provider for providing one or more types of coding procedures; and a coded data outputting part for selecting one of the coding procedures provided by the coding procedure provider, based on a predetermined coding procedure selection criterion, using the coding-related information stored in the coded symbol memory, and for performing the compression coding of the coding-related information on the basis of the selected coding procedure to output the coded data.

Another image decoding apparatus corresponding thereto is an image decoding apparatus comprising: a decoding part for decoding coded data obtained by dividing a coding target image or a predictive residual image generated based on the coding target image, into predetermined transform blocks, performing transform coding of the coding target image or the predictive residual image in each unit of said transform block to output transform coefficients, quantizing the output transform coefficients on the basis of a quantization parameter to output quantized transform coefficients, and performing compression coding of coding-related information containing the quantized transform coefficients and the quantization parameter to yield coded data, wherein the decoding part has a function of converting the quantized transform coefficients in the coding target block to a one-dimensional string according to frequencies and decoding a zero run value being a number of consecutive coefficients providing 0 as an absolute value of the quantized transform coefficients in the one-dimensional string, a level value being an absolute value of a said quantized transform coefficient, and a positive/negative sign indicating whether the quantized transform coefficient is positive or negative, and comprises a decoded symbol memory for memorizing the coding-related information previously decoded; a decoding procedure provider for providing one or more types of decoding procedures; and a decoded data outputting part for selecting a decoding procedure which is one of the decoding procedures provided by the decoding procedure provider and which corresponds to a coding procedure used in the coding of the coding-related information as a decoding target, based on a predetermined coding procedure selection criterion, using the coding-related information previously decoded and stored in the decoded symbol memory, and for decoding the coding-related information on the basis of the selected decoding procedure to output decoded data.

In order to achieve the above object, another image encoding method of the present invention is an image encoding method comprising: a transform step of dividing a coding target image or a predictive residual image generated based on the coding target image, into predetermined transform blocks, and performing transform coding of the coding target image or the predictive residual image in each unit of said transform block to output transform coefficients; a quantization step of quantizing the transform coefficients outputted in the transform step, based on a quantization parameter, to output quantized transform coefficients; and an encoding step of performing compression coding of coding-related information containing the quantization parameter and the quantized transform coefficients outputted in the quantization step, to output coded data; wherein the encoding step is a step of converting the quantized transform coefficients in the coding target block to a one-dimensional string according to frequencies and encoding a zero run value being a number of consecutive coefficients providing 0 as an absolute value of the quantized transform coefficients in the one-dimensional string, a level value being an absolute value of a said quantized transform coefficient, and a positive/negative sign indicating whether the quantized transform coefficient is positive or negative, and is to prepare one or more types of coding procedures, select a coding procedure out of the one or more types of coding procedures, based on a predetermined coding procedure selection criterion, using the coding-related information stored in a coded symbol memory, and perform the compression coding of the coding-related information on the basis of the selected coding procedure to output the coded data.

Another image decoding method corresponding thereto is an image decoding method comprising: a decoding step of decoding coded data obtained by dividing a coding target image or a predictive residual image generated based on the coding target image, into predetermined transform blocks, performing transform coding of the coding target image or the predictive residual image in each unit of said transform block to output transform coefficients, quantizing the output transform coefficients on the basis of a quantization parameter to output quantized transform coefficients, and performing compression coding of coding-related information containing the quantized transform coefficients and the quantization parameter to yield coded data, wherein the decoding step is a step of converting the quantized transform coefficients in the coding target block to a one-dimensional string according to frequencies and decoding a zero run value being a number of consecutive coefficients providing 0 as an absolute value of the quantized transform coefficients in the one-dimensional string, a level value being an absolute value of the quantized transform coefficients, and a positive/negative code indicating whether the quantized transform coefficient is positive or negative, and is to prepare one or more types of decoding procedures, select a decoding procedure which is one of the one or more types of decoding procedures and which corresponds to a coding procedure used in the coding of the coding-related information as a decoding target, based on a predetermined coding procedure selection criterion, using the coding-related information previously decoded and stored in a decoded symbol memory, and decode the coding-related information on the basis of the selected decoding procedure to output decoded data.

In order to achieve the above object, another image encoding program of the present invention is an image encoding program for letting a computer function as: transform means for dividing a coding target image or a predictive residual image generated based on the coding target image, into predetermined transform blocks, and for performing transform coding of the coding target image or the predictive residual image in each unit of said transform block to output transform coefficients; quantization means for quantizing the transform coefficients outputted from the transform means, based on a quantization parameter, to output quantized transform coefficients; and encoding means for performing compression coding of coding-related information containing the quantization parameter and the quantized transform coefficients outputted from the quantization means, to output coded data; wherein the encoding means comprises means for converting the quantized transform coefficients in the coding target block to a one-dimensional string according to frequencies and encoding a zero run value being a number of consecutive coefficients providing 0 as an absolute value of the quantized transform coefficients in the one-dimensional string, a level value being an absolute value of a said quantized transform coefficient, and a positive/negative sign indicating whether the quantized transform coefficient is positive or negative, and further comprises coding procedure providing means for providing one or more types of coding procedures; and coded data outputting means for selecting one of the coding procedures provided by the coding procedure providing means, based on a predetermined coding procedure selection criterion, using the coding-related information stored in a coded symbol memory, and for performing the compression coding of the coding-related information on the basis of the selected coding procedure to output the coded data.

Another image decoding program corresponding thereto is an image decoding program for letting a computer function as: decoding means for decoding coded data obtained by dividing a coding target image or a predictive residual image generated based on the coding target image, into predetermined transform blocks, performing transform coding of the coding target image or the predictive residual image in each unit of said transform block to output transform coefficients, quantizing the output transform coefficients on the basis of a quantization parameter to output quantized transform coefficients, and performing compression coding of coding-related information containing the quantized transform coefficients and the quantization parameter to yield coded data, wherein the decoding means comprises means for converting the quantized transform coefficients in the coding target block to a one-dimensional string according to frequencies and decoding a zero run value being a number of consecutive coefficients providing 0 as an absolute value of the quantized transform coefficients in the one-dimensional string, a level value being an absolute value of a said quantized transform coefficient, and a positive/negative sign indicating whether the quantized transform coefficient is positive or negative, and further comprises decoding procedure providing means for providing one or more types of decoding procedures; and decoded data outputting means for selecting a decoding procedure which is one of the decoding procedures provided by the decoding procedure providing means and which corresponds to a coding procedure used in the coding of the coding-related information as a decoding target, based on a predetermined coding procedure selection criterion, using the coding-related information previously decoded and stored in a decoded symbol memory, and for decoding the coding-related information on the basis of the selected decoding procedure to output decoded data.

The above-described image encoding apparatus, image encoding method, and image encoding program are configured to prepare a plurality of procedures for performing the information source coding of one coding-related information and select a procedure to be used in the information source coding of the coding-related information in a block, out of these procedures. Therefore, the procedure to be used in the information source coding, which is suitable for the property of each coding symbol varying as described above, can be selected from the plurality of procedures. As a result, it becomes feasible to efficiently perform the information source coding of the coding symbol, according to the coding condition and the property of image.

The above-described image decoding apparatus, image decoding method, and image decoding program are configured to prepare a plurality of procedures for information source decoding of one coding-related information and select a procedure to be used in the information source decoding of the coding-related information in a block, out of these procedures. Therefore, it is feasible to correctly decode the coded data coded by the aforementioned image encoding apparatus, image encoding method, and image encoding program.

The image encoding apparatus of the present invention can also be configured so that, on the occasion of encoding the level value, the coding procedure provider provides a coding procedure of setting a shorter code length for a value closer to a level value at a frequency near the coding target level value.

In the image decoding apparatus corresponding thereto, on the occasion of decoding the level value, the decoding procedure provider provides a decoding procedure corresponding to a coding procedure provided so as to set a shorter code length for a value closer to a level value at a frequency near the coding target level value.

The image encoding apparatus of the present invention can also be configured so that, on the occasion of encoding the level value, where a zero run value at a frequency near the coding target level value is larger than a preset threshold, the coding procedure provider provides a coding procedure of decreasing a code length as the level value becomes smaller.

In the image decoding apparatus corresponding thereto, on the occasion of decoding the level value, where a zero run value at a frequency near the coding target level value is larger than a preset threshold, the decoding procedure provider provides a decoding procedure corresponding to a coding procedure provided so as to decrease a code length as the level value becomes smaller.

The image encoding apparatus of the present invention can also be configured so that, on the occasion of encoding the level value, the coding procedure provider provides a coding procedure of setting a larger deviation of code lengths with increase in a frequency band of the coding target level value.

In the image decoding apparatus corresponding thereto, on the occasion of decoding the level value, the decoding procedure provider provides a decoding procedure corresponding to a coding procedure provided so as to set a larger deviation of code lengths with increase in a frequency band of the coding target level value.

The image encoding apparatus of the present invention can also be configured so that, on the occasion of encoding the level value, the coding procedure provider provides a coding procedure of setting a smaller deviation of code lengths as the level value becomes smaller at a frequency near the coding target level value.

In the image decoding apparatus corresponding thereto, on the occasion of decoding the level value, the decoding procedure provider provides a decoding procedure corresponding to a coding procedure provided so as to set a smaller deviation of code lengths as the level value becomes smaller at a frequency near the coding target level value.

The image encoding apparatus of the present invention can also be configured so that, on the occasion of encoding the zero run value, the coding procedure provider provides a coding procedure of setting a larger deviation of code lengths as the level value becomes smaller at a frequency near the coding target zero run value.

In the image decoding apparatus corresponding thereto, on the occasion of decoding the zero run value, the decoding procedure provider provides a decoding procedure corresponding to a coding procedure provided so as to set a larger deviation of code lengths as the level value becomes smaller at a frequency near the coding target zero run value.

The image encoding apparatus of the present invention can also be configured so that the encoding part has a function of performing compression coding of a number of nonzero quantized transform coefficients in the coding target block; where the number of nonzero quantized transform coefficients in the coding target block is smaller than a preset threshold, the encoding part encodes the level values and the zero run values thereof in order from a lowest frequency component; where the number of nonzero quantized coefficients in the coding target block is larger than the preset threshold, the encoding part encodes the level values and the zero run values thereof in order from a highest frequency component.

In the image decoding apparatus corresponding thereto, the decoding part has a function of decoding a number of nonzero quantized transform coefficients in the coding target block; where the number of nonzero quantized coefficients in the coding target block is smaller than a preset threshold, the decoding part decodes the level values and the zero run values thereof in order from a lowest frequency component; where the number of nonzero quantized coefficients in the coding target block is larger than the preset threshold, the decoding part decodes the level values and the zero run values thereof in order from a highest frequency component.

In order to achieve the above object, still another image encoding method of the present invention is an image encoding method of dividing an image into blocks of a predetermined size to effect coding thereof, and performing information source coding of coding-related information in each unit of the foregoing block to provide output of coded data, the image encoding method comprising preparing a plurality of means for performing the information source coding of one coding-related information and selecting a means to be used in the information source coding of the coding-related information in the block, out of the plurality of means.

In order to achieve the above object, still another image encoding apparatus of the present invention is an image encoding apparatus for dividing an image into blocks of a predetermined size to effect coding thereof, and performing information source coding of coding-related information in each unit of the foregoing block to provide output of coded data, the image encoding apparatus comprising a plurality of means for performing the information source coding of one coding-related information, wherein a means to be used in the information source coding of the coding-related information in the block is selected out of the plurality of means.

There are prepared a plurality of means for the information source coding of one coding-related information and a means to be used in the information source coding of the coding-related information in a block is selected out of these means, whereby it is feasible to select the means to be used in the information source coding, which is suitable for the property of each coding symbol varying in various ways, out of the plurality of means.

Still another image decoding method of the present invention is an image decoding method of decoding input of coded data obtained by dividing an image into blocks of a predetermined size and performing information-source coding of coding-related information in each unit of the block, the image decoding method comprising preparing a plurality of means for performing information source decoding of one coding-related information and selecting a means to be used in the information source decoding of the coding-related information in the block, out of the plurality of means.

Still another image decoding apparatus of the present invention is an image decoding apparatus for decoding input of coded data obtained by dividing an image into blocks of a predetermined size and performing information source coding of coding-related information in each unit of the block, the image decoding apparatus comprising a plurality of means for performing information source decoding of one coding-related information, wherein a means to be used in the information source decoding of the coding-related information in the block is selected out of the plurality of means.

By adopting this configuration, it is feasible to correctly decode the coded data coded by the aforementioned image encoding method or image encoding apparatus.

In the image encoding method or the image encoding apparatus of the present invention, preferably, the means to be used in the information source coding is selected based on the coding-related information applied in the block.

When the means to be used in the information source coding is selected based on the coding-related information applied in the block, it is feasible to perform the information source coding suitable for the property of the coding symbol varying according to the coding condition applied to the block as described above.

In the image decoding method or the image decoding apparatus of the present invention, preferably, the means to be used in the information source decoding is selected based on the coding-related information applied in the block.

By adopting this configuration, it is feasible to correctly decode the coded data coded by the aforementioned image encoding method or image encoding apparatus.

In this case, the coding-related information can contain coding-related information of the same kind coded prior to the coding of the coding-related information in question, or coding-related information of a different kind coded prior to the coding of the coding-related information in question; in addition, the means to be used in the information source coding can be selected based on an order on a code table used in the information source coding of the coding-related information.

In the image encoding method or the image encoding apparatus of the present invention, the means to be used in the information source coding can also be selected based on coding-related information applied in a block located in the neighborhood to the block in question.

When the means to be used in the information source coding is selected based on the coding-related information applied in the block located in the neighborhood to the block in question, it is feasible to estimate the property of the coding-related information varying depending upon the property of the image in the region on the image containing the block in question, from the coding-related information in the block located in the neighborhood, as described above, and perform the information source coding suitable for the property of the coding-related information.

In the image decoding method or the image decoding apparatus of the present invention, the means to be used in the information source decoding can also be selected based on coding-related information applied in a block located in the neighborhood to the block in question.

By adopting this configuration, it is feasible to correctly decode the coded data coded by the aforementioned image encoding method or image encoding apparatus.

In this case, the coding-related information can contain coding-related information of the same kind as the coding-related information in question, or coding-related information of a kind different from the coding-related information in question; and the means to be used in the information source coding can be selected based on an order on a code table used in the information source coding of the coding-related information.

In the image encoding method or the image encoding apparatus of the present invention, preferably, the plurality of means to be used in the information source coding have their respective, different orders of assignment to a code table in the information source coding of the coding-related information.

This permits the information source coding suitable for the property of each coding symbol to be performed even for the coding symbols varying the distribution of occurrence frequencies of coding symbols according to change in the property of the coding symbols as described previously.

In the image decoding method or the image decoding apparatus of the present invention, preferably, the plurality of means to be used in the information source decoding have their respective, different orders of assignment to a code table in the information source decoding of the coding-related information.

By adopting this configuration, it is feasible to correctly decode the coded data coded by the aforementioned image encoding method or image encoding apparatus.

In the image encoding method or the image encoding apparatus of the present invention, the plurality of means to be used in the information source coding can have their respective, different code configuration methods in the information source coding of the coding-related information.

This permits the information source coding suitable for the property of each coding symbol to be performed even for the coding symbols varying the deviation of distribution of occurrence frequencies of coding symbols according to change in the property of the coding symbols as described previously.

In the image decoding method or the image decoding apparatus of the present invention, the plurality of means to be used in the information source decoding can have their respective, different code configuration methods in the information source decoding of the coding-related information.

By adopting this configuration, it is feasible to correctly decode the coded data coded by the aforementioned image encoding method or image encoding apparatus.

In the image encoding method or the image encoding apparatus of the present invention, preferably, there are prepared a plurality of predicting means for the coding-related information; and predicted value similarity generating means for generating similarities of predicted values obtained as a result of the plurality of predicting means, and the means to be used in the information source coding is selected based on the similarities by the plurality of predicting means.

When the means to be used in the information source coding is selected based on the similarities of the predicted values obtained as a result of the plurality of predicting means, it is feasible to efficiently select the means to be used in the information source coding.

In the image decoding method or the image decoding apparatus of the present invention, preferably, there are prepared a plurality of predicting means for the coding-related information; and predicted value similarity generating means for generating similarities of predicted values obtained as a result of the plurality of predicting means, and the means to be used in the information source decoding is selected based on the similarities by the plurality of predicting means.

By adopting this configuration, it is feasible to correctly decode the coded data coded by the aforementioned image encoding method or image encoding apparatus.

In the image encoding method, image encoding apparatus, image decoding method, and image decoding apparatus of the present invention, the coding-related information to be coded or decoded corresponds to coding mode information in a block as a target for coding, coded block pattern information in the target block, motion vector information in the target block, a level value of an orthogonal transform coefficient in the target block, a number of nonzero coefficients among the orthogonal transform coefficients in the target block, or the like.

In the image encoding method, image encoding apparatus, image decoding method, and image decoding apparatus of the present invention, the coding-related information to be used in the selection of the above-described means can contain coding mode information, a quantization parameter, coded block pattern information, a motion vector, a level value of an orthogonal transform coefficient, a number of nonzero coefficients among the orthogonal transform coefficients, or the like. Where the coding-related information to be used in the selection of the above-described means contains the coding mode information, it is possible to use an activity in a neighboring block, which is defined by the coding mode information. Where the coding-related information to be used in the selection of the above-described means contains the coded block pattern information, it is possible to use a directional deviation of an appearance pattern of significant orthogonal transform coefficients in a neighboring block, which is defined by the coded block pattern information.

In the image encoding method or the image encoding apparatus of the present invention, preferably, the plurality of means used in the information source coding are updated independently of each other according to the result of the coding.

When the means are updated independently of each other according to the result of the coding, it is feasible to perform the information source coding more suiting the coding condition and the property of image.

In the image decoding method or the image decoding apparatus of the present invention, preferably, the plurality of means used in the information source decoding are updated independently of each other according to the result of the decoding.

By adopting this configuration, it is feasible to correctly decode the coded data coded by the aforementioned image encoding method or image encoding apparatus.

In order to achieve the above object, an image transmission system of the present invention is an image transmission system comprising an image encoder for encoding an image; a bit stream transmitter for transmitting a bit stream encoded by the image encoder; a bit stream receiver for receiving the bit stream thus transmitted; and an image decoder for decoding the received bit stream, wherein the image encoder performs the encoding by one of the aforementioned image encoding methods.

By performing the encoding by one of the aforementioned image encoding methods, the means to be used in the information source coding, which is suitable for the property of the coding symbol varying in various ways, can be selected out of the plurality of means.

Another image transmission system of the present invention is an image transmission system comprising an image encoder for encoding an image; a bit stream transmitter for transmitting a bit stream encoded by the image encoder; a bit stream receiver for receiving the bit stream thus transmitted; and an image decoder for decoding the received bit stream, wherein the image decoder performs the decoding by one of the aforementioned image decoding methods.

By adopting this configuration, it is feasible to correctly decode the coded data coded by one of the aforementioned image encoding methods.

In order to achieve the above object, an image storage system of the present invention is an image storage system comprising an image encoder for encoding an image; and a bit stream storage for storing a bit stream encoded by the image encoder, wherein the image encoder performs the encoding by one of the aforementioned image encoding methods.

By performing the encoding by one of the aforementioned image encoding methods, the means to be used in the information source coding, which is suitable for the property of the coding symbol varying in various ways, can be selected out of the plurality of means.

An image reproduction system of the present invention is an image reproduction system comprising a bit stream storage for retaining a bit stream stored; and an image decoder for decoding a bit stream read out of the bit stream storage, wherein the image decoder performs the decoding by one of the aforementioned image decoding methods.

By adopting this configuration, it is feasible to correctly decode the coded data coded by one of the aforementioned image encoding methods.

In order to achieve the above object, another image encoding method of the present invention is an image encoding method of dividing an image into blocks of a predetermined size, performing an orthogonal transform thereof, and performing information source coding of orthogonal transform coefficient information, the image encoding method comprising preparing a plurality of means for performing the information source coding, and selecting a means to be used in the information source coding of the orthogonal transform coefficient information, out of the plurality of means.

Another image encoding apparatus of the present invention is an image encoding apparatus for dividing an image into blocks of a predetermined size, performing an orthogonal transform thereof, and performing information source coding of orthogonal transform coefficient information, the image encoding apparatus comprising a plurality of means for performing the information source coding, wherein a means to be used in the information source coding of the orthogonal transform coefficient information is selected out of the plurality of means.

There are prepared a plurality of means for performing the information source coding of the orthogonal transform coefficient information and a means to be used in the information source coding of the orthogonal transform coefficient information is selected out of the plurality of means, whereby it is feasible to select the means to be used in the information source coding, which is suitable for the property of the orthogonal transform coefficient information varying in various ways, out of the plurality of means.

Another image decoding method of the present invention is an image decoding method of decoding input of coded data obtained by dividing an image into blocks of a predetermined size, performing an orthogonal transform thereof, and performing information source coding of orthogonal transform coefficient information, the image decoding method comprising preparing a plurality of means for performing information source decoding, and selecting a means to be used in the information source decoding of the orthogonal transform coefficient information, out of the plurality of means.

Furthermore, another image decoding apparatus of the present invention is an image decoding apparatus for decoding input of coded data obtained by dividing an image into blocks of a predetermined size, performing an orthogonal transform thereof, and performing information source coding of orthogonal transform coefficient information, the image decoding apparatus comprising a plurality of means for performing information source decoding, wherein a means to be used in the information source decoding of the orthogonal transform coefficient information is selected out of the plurality of means.

By adopting this configuration, it is feasible to correctly decode the coded data coded by the aforementioned image encoding method or image encoding apparatus.

In the image encoding method or the image encoding apparatus of the present invention, preferably, the means to be used in the information source coding is selected based on a coefficient value of a significant coefficient in the orthogonal transform coefficient information transmitted in advance.

When the means to be used in the information source coding is selected based on the coefficient value of the significant coefficient in the orthogonal transform coefficient information, it is feasible to predict a change in the property of the orthogonal transform coefficient information varying in various ways, from the coefficient value transmitted in advance, and perform the information source coding suitable for the property of the orthogonal transform coefficient information.

In the image decoding method or the image decoding apparatus of the present invention, preferably, the means to be used in the information source decoding is selected based on a coefficient value of a significant coefficient in the orthogonal transform coefficient information transmitted in advance.

By adopting this configuration, it is feasible to correctly decode the coded data coded by the aforementioned image encoding method or image encoding apparatus.

In the image encoding method or the image encoding apparatus of the present invention, the means to be used in the information source coding can also be selected based on a zero run count in the orthogonal transform coefficient information transmitted in advance.

When the means to be used in the information source coding is selected based on the zero run count in the orthogonal transform coefficient information, it is feasible to predict a change in the property of the orthogonal transform coefficient information varying in various ways, from the zero run count transmitted in advance, and perform the information source coding suitable for the property of the orthogonal transform coefficient information.

In the image decoding method or the image decoding apparatus of the present invention, the means to be used in the information source decoding can also be selected based on a zero run count in the orthogonal transform coefficient information transmitted in advance.

By adopting this configuration, it is feasible to correctly decode the coded data coded by the aforementioned image encoding method or image encoding apparatus.

In the image encoding method or the image encoding apparatus of the present invention, the means to be used in the information source coding can also be selected based on a space frequency to which the orthogonal transform coefficient information belongs.

When the means to be used in the information source coding is selected based on the space frequency to which the orthogonal transform coefficient information belongs, it is feasible to predict a change in the property of the orthogonal transform coefficient information varying in various ways, from the space frequency, and perform the information source coding suitable for the property of the orthogonal transform coefficient information.

In the image decoding method or the image decoding apparatus of the present invention, the means to be used in the information source decoding can also be selected based on a space frequency to which the orthogonal transform coefficient information belongs.

By adopting this configuration, it is feasible to correctly decode the coded data coded by the aforementioned image encoding method or image encoding apparatus.

In the image encoding method or the image encoding apparatus of the present invention, preferably, the plurality of means used in the information source coding have their respective, different orders of assignment to a code table in the information source coding of the orthogonal transform coefficient information.

This permits the information source coding suitable for the property of the orthogonal transform coefficient information to be performed even if the property of the orthogonal transform coefficient information varies, so as to change frequencies of occurrence of respective information items.

In the image decoding method or the image decoding apparatus of the present invention, preferably, the plurality of means used in the information source decoding have their respective, different orders of assignment to a code table in the information source decoding of the orthogonal transform coefficient information.

By adopting this configuration, it is feasible to correctly decode the coded data coded by the aforementioned image encoding method or image encoding apparatus.

In the image encoding method or the image encoding apparatus of the present invention, preferably, the plurality of means used in the information source coding have their respective, different code configuration methods in the information source coding of the orthogonal transform coefficient information.

This permits the information source coding suitable for the property of the orthogonal transform coefficient information to be performed even if the property of the orthogonal transform coefficient information varies, so as to change the deviation of distribution of occurrence frequencies of respective information items.

In the image decoding method or the image decoding apparatus of the present invention, preferably, the plurality of means used in the information source decoding have their respective, different code configuration methods in the information source decoding of the orthogonal transform coefficient information.

By adopting this configuration, it is feasible to correctly decode the coded data coded by the aforementioned image encoding method or image encoding apparatus.

In the image encoding method or the image encoding apparatus of the present invention, the information source coding of the orthogonal transform coefficient information may be carried out for a combination of a zero run count and a coefficient value in an orthogonal transform coefficient string, or may be carried out individually for each of the zero run count and coefficient value in the orthogonal transform coefficient string.

Similarly, in the image decoding method or the image decoding apparatus of the present invention, the information source decoding of the orthogonal transform coefficient information may be carried out for a combination of a zero run count and a coefficient value in an orthogonal transform coefficient string, or may be carried out individually for each of the zero run count and coefficient value in the orthogonal transform coefficient string.

In the image encoding method or the image encoding apparatus of the present invention, preferably, consecutive numbers with a level value of equal magnitude are assigned as the orthogonal transform coefficient information to a code table.

By adopting this configuration, it becomes feasible to perform more efficient coding.

In the image decoding method or the image decoding apparatus of the present invention, preferably, consecutive numbers with a level value of equal magnitude are assigned as the orthogonal transform coefficient information to a code table.

By adopting this configuration, it is feasible to correctly decode the coded data coded by the aforementioned image encoding method or image encoding apparatus.

In the image encoding method or the image encoding apparatus of the present invention, preferably, whether the orthogonal transform coefficient information should be encoded in order from a lowest frequency component or from a highest frequency component is determined according to coding information in a coding target block.

By adopting this configuration, it becomes feasible to perform more efficient coding.

In the image decoding method or the image decoding apparatus of the present invention, preferably, whether the orthogonal transform coefficient information should be decoded in order from a lowest frequency component or from a highest frequency component is determined according to previously decoded information in a decoding target block.

By adopting this configuration, it is feasible to correctly decode the coded data coded by the aforementioned image encoding method or image encoding apparatus.

In the image encoding method or the image encoding apparatus of the present invention, preferably, the means to be used in the information source coding is selected based on a motion vector difference value in the coding target block transmitted in advance.

When the means to be used in the information source coding is selected based on the motion vector difference value in the coding target block transmitted in advance, it is feasible to predict a change in the property of the orthogonal transform coefficient information varying in various ways, from the motion vector difference value transmitted in advance, and perform the information source coding suitable for the property of the orthogonal transform coefficient information.

In the image decoding method or the image decoding apparatus of the present invention, preferably, the means to be used in the information source decoding is selected based on a motion vector difference value in the decoding target block transmitted in advance.

By adopting this configuration, it is feasible to correctly decode the coded data coded by the aforementioned image encoding method or image encoding apparatus.

In the image encoding method or the image encoding apparatus of the present invention, preferably, the orthogonal transform coefficient information as the coding target is a total of zero run lengths in a block.

By adopting this configuration, it is feasible to efficiently encode the total of zero run lengths.

In the image decoding method or the image decoding apparatus of the present invention, preferably, the orthogonal transform coefficient information as the decoding target is a total of zero run lengths in a block.

By adopting this configuration, it is feasible to correctly decode the coded data coded by the aforementioned image encoding method or image encoding apparatus.

In order to achieve the above object, another image transmission system of the present invention is an image transmission system comprising an image encoder for encoding an image; a bit stream transmitter for transmitting a bit stream encoded by the image encoder; a bit stream receiver for receiving the bit stream thus transmitted; and an image decoder for decoding the received bit stream, wherein the image encoder performs the encoding by one of the aforementioned image encoding methods.

When the coding is performed by one of the foregoing image encoding methods, it is feasible to perform the information source coding suitable for the property of the orthogonal transform coefficient information varying in various ways.

In order to achieve the above object, another image transmission system of the present invention is an image transmission system comprising an image encoder for encoding an image; a bit stream transmitter for transmitting a bit stream encoded by the image encoder; a bit stream receiver for receiving the bit stream thus transmitted; and an image decoder for decoding the received bit stream, wherein the image decoder performs the decoding by one of the aforementioned image decoding methods.

By adopting this configuration, it is feasible to correctly decode the coded data coded by one of the aforementioned image encoding methods.

In order to achieve the above object, another image storage system of the present invention is an image storage system comprising an image encoder for encoding an image; and a bit stream storage for storing a bit stream encoded by the image encoder, wherein the image encoder performs the encoding by one of the aforementioned image encoding methods.

When the encoding is carried out by one of the aforementioned image encoding methods, it is feasible to perform the information source coding suitable for the property of the orthogonal transform coefficient information varying in various ways.

In order to achieve the above object, another image reproduction system of the present invention is an image reproduction system comprising a bit stream storage for retaining a bit stream stored; and an image decoder for decoding a bit stream read out of the bit stream storage, wherein the image decoder performs the decoding by one of the aforementioned image decoding methods.

By adopting this configuration, it is feasible to correctly decode the coded data coded by one of the aforementioned image encoding methods.

In the image encoding method or the image encoding apparatus of the present invention, there are prepared a plurality of means for performing the information source coding of one coding-related information, and one means to be used in the information source coding of the coding-related information in a block is selected from these means. Therefore, the means to be used in the information source coding suitable for the property of the coding symbol varying as described above can be selected out of the plurality of means. As a result, it becomes feasible to efficiently perform the information source coding of the coding symbol, according to the coding condition and the property of image.

In the image decoding method or the image decoding apparatus of the present invention, there are prepared a plurality of means for performing the information source decoding of one coding-related information, and one means to be used in the information source decoding of the coding-related information in a block is selected from these means. Therefore, it is feasible to correctly decode the coded data coded by the aforementioned image encoding method or image encoding apparatus.

In the image encoding method or the image encoding apparatus of the present invention, there are prepared a plurality of means for performing the information source coding of orthogonal transform coefficient information, and a means to be used in the information source coding of the orthogonal transform coefficient information is selected out of the plurality of means. Therefore, a means to be used in the information source coding suitable for the property of the orthogonal transform coefficient information varying in various ways can be selected out of the plurality of means. As a result, it becomes feasible to perform the information source coding suitable for the property of the orthogonal transform coefficient information, as changed according to a frequency domain of orthogonal transform coefficients or a tendency of other orthogonal transform coefficients, and thereby implement efficient coding.

In the image decoding method or the image decoding apparatus of the present invention, there are prepared a plurality of means for performing the information source decoding of orthogonal transform coefficient information, and a means to be used in the information source decoding of the orthogonal transform coefficient information is selected out of the plurality of means. Therefore, it is feasible to correctly decode the coded data coded by the aforementioned image encoding method or image encoding apparatus.

BRIEF DESCRIPTION OF THE DRAWINGS

FIGS. 3A-3C are diagrams showing an example of types of macroblock coding modes according to the prior art.

FIGS. 4A and 4B are diagrams showing an example of the orthogonal transform according to the prior art.

FIGS. 9A and 9B are diagrams showing an example of a map table indicating a relation between coded block pattern information of luma signals and index values and, an example of a variable-length coding table indicating a relation between index values and variable-length codes.

FIGS. 10A and 10B are diagrams showing an example of application in which switching between map tables according to the present invention is applied to the coded block pattern information of luma signals.

FIGS. 11A and 11B are diagrams showing an example of a map table indicating a relation between the coded block pattern information of chroma signals and index values and, an example of a variable-length coding table indicating a relation between index values and variable-length codes.

FIGS. 12A and 12B are diagrams showing an example of application in which switching between map tables according to the present invention is applied to the coded block pattern information of chroma signals.

FIGS. 16A and 16B are diagrams schematically showing configurations of macroblocks and coded block pattern information in the H.26L encoding system.

FIGS. 18A-18D are diagrams showing an example of application in which switching between map tables according to the present invention is applied to the coded block pattern information in the H.26L encoding system.

FIG. 19 is a diagram showing an example of application in which switching between map tables according to the present invention is applied to the coded block pattern information of chroma signals in the H.26L encoding system.

FIGS. 20A and 20B are diagrams showing an example of distribution of occurrence probabilities of respective symbols of coded block pattern information.

FIGS. 21A-21C are diagrams showing an example of a plurality of variable-length coding tables with different characteristics.

FIGS. 24A-24J are diagrams schematically showing another example of types of macroblock coding modes.

FIG. 25 is a diagram showing an example of definition of points for the respective macroblock coding modes.

FIGS. 26A and 26B are diagrams showing an example of a map table indicating a relation between macroblock coding modes and index values and, an example of a variable-length coding table indicating a relation between index values and variable-length codes.

FIG. 27 is a diagram showing another example of definition of points for the macroblock coding modes.

FIGS. 28A and 28B are diagrams showing another example of a map table indicating a relation between macroblock coding modes and index values and, another example of a variable-length coding table indicating a relation between index values and variable-length codes.

FIG. 29A is a diagram schematically showing a configuration of an image transmission system.

FIG. 29B is a diagram schematically showing a configuration of an image storage system.

FIG. 29C is a diagram schematically showing a configuration of an image reproduction system.

FIG. 31 is a diagram showing a map table MT(CX) where CX takes values from 0 to 7.

FIGS. 34A and 34B are diagrams showing an example of a map table indicating a relation between nonzero quantized orthogonal transform coefficient values and index values and, an example of a variable-length coding table indicating a relation between index values and variable lengths.

FIGS. 35A and 35B are diagrams showing an example of change of the map table according to the present invention, and an example of a code string using the map table after the change.

FIG. 36 is a diagram showing an example of the map table in which consecutive numbers with the absolute value of Level value of 1 are assigned in the code table.

FIGS. 37A-37C are diagrams showing another example of a plurality of variable-length coding tables with different characteristics.

FIGS. 38A-38C are diagrams showing probability tables.

BEST MODES FOR CARRYING OUT THE INVENTION

First Embodiment

Figure 1:
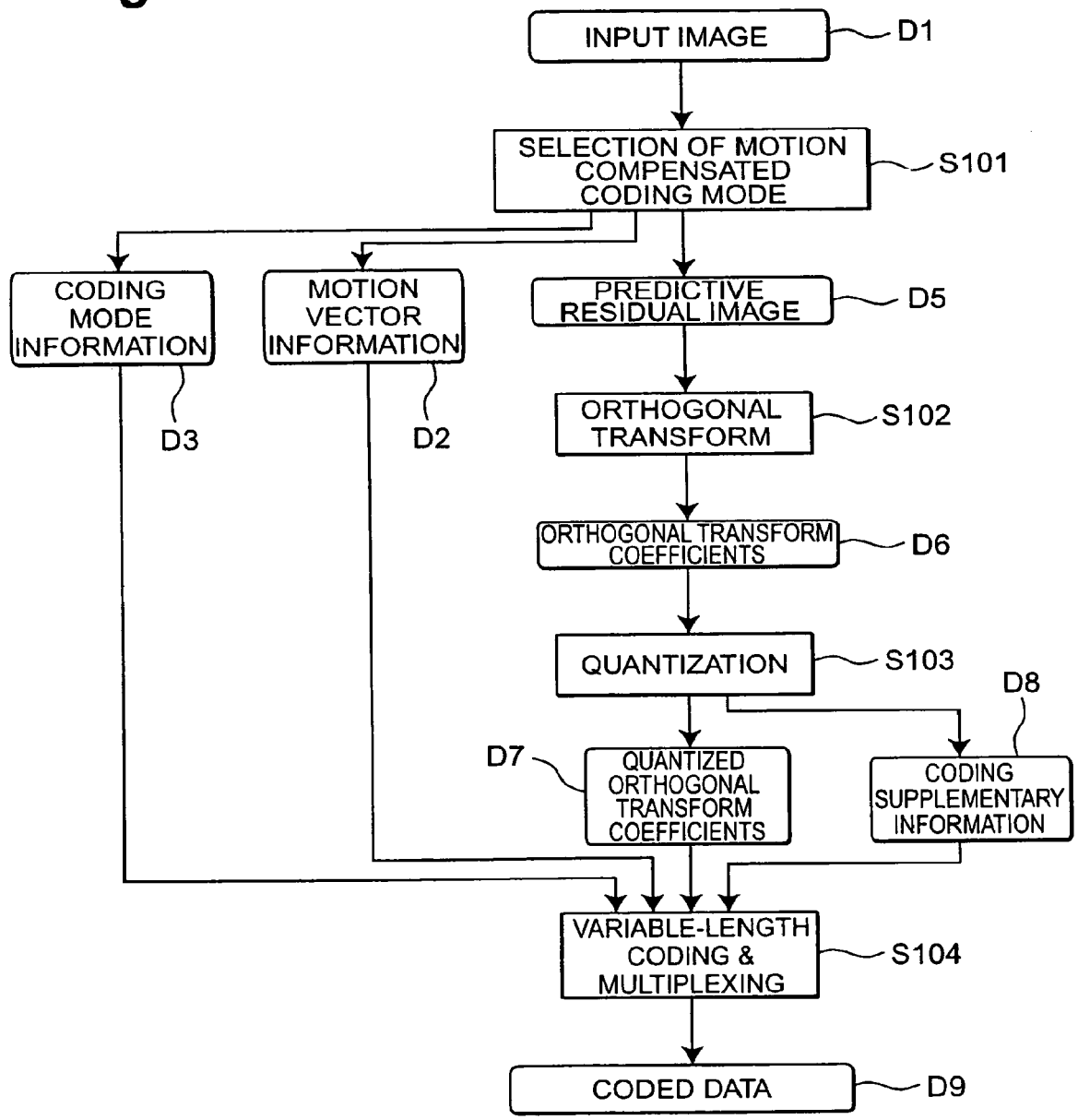
FIG. 1 is a flowchart schematically showing an example of the moving picture encoding technique according to the prior art.

Embodied forms of the image encoding method, image decoding method, image encoding apparatus, image decoding apparatus, image transmission system, image storage system, and image reproduction system according to the first embodiment of the present invention will be described below in detail with reference to the drawings. The same elements will be denoted by the same reference symbols throughout the description of the drawings, without redundant description thereof. It is also noted that dimensional ratios in the drawings do not always agree with those in the description. In the description hereinafter, the embodiment will be described on the presumption that an input frame image fed as a coding target is a moving picture consisting of time-series frame images.

Figure 2:
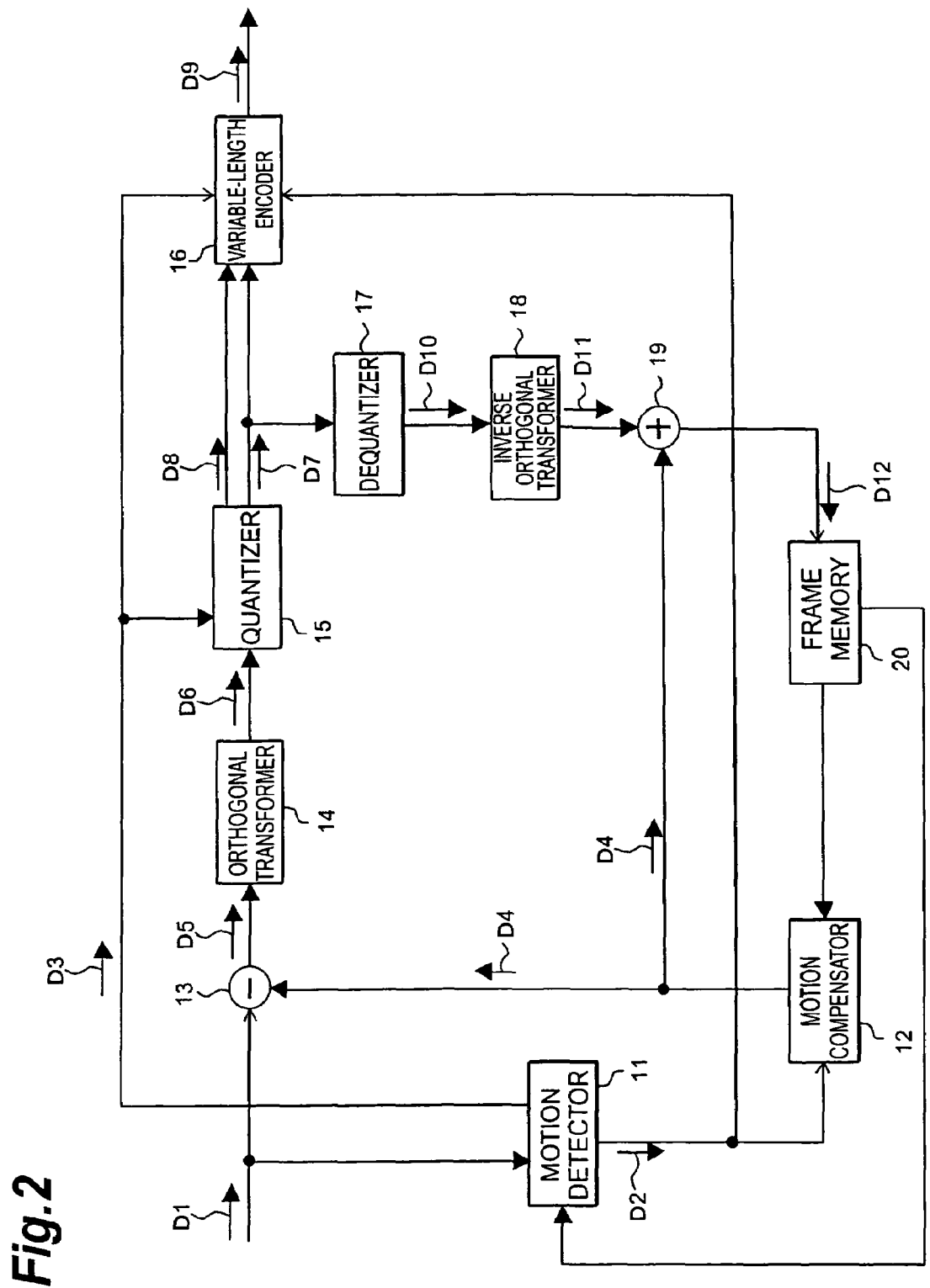
FIG. 2 is a block diagram schematically showing an example of the moving picture encoding apparatus according to the prior art.
Figure 5:
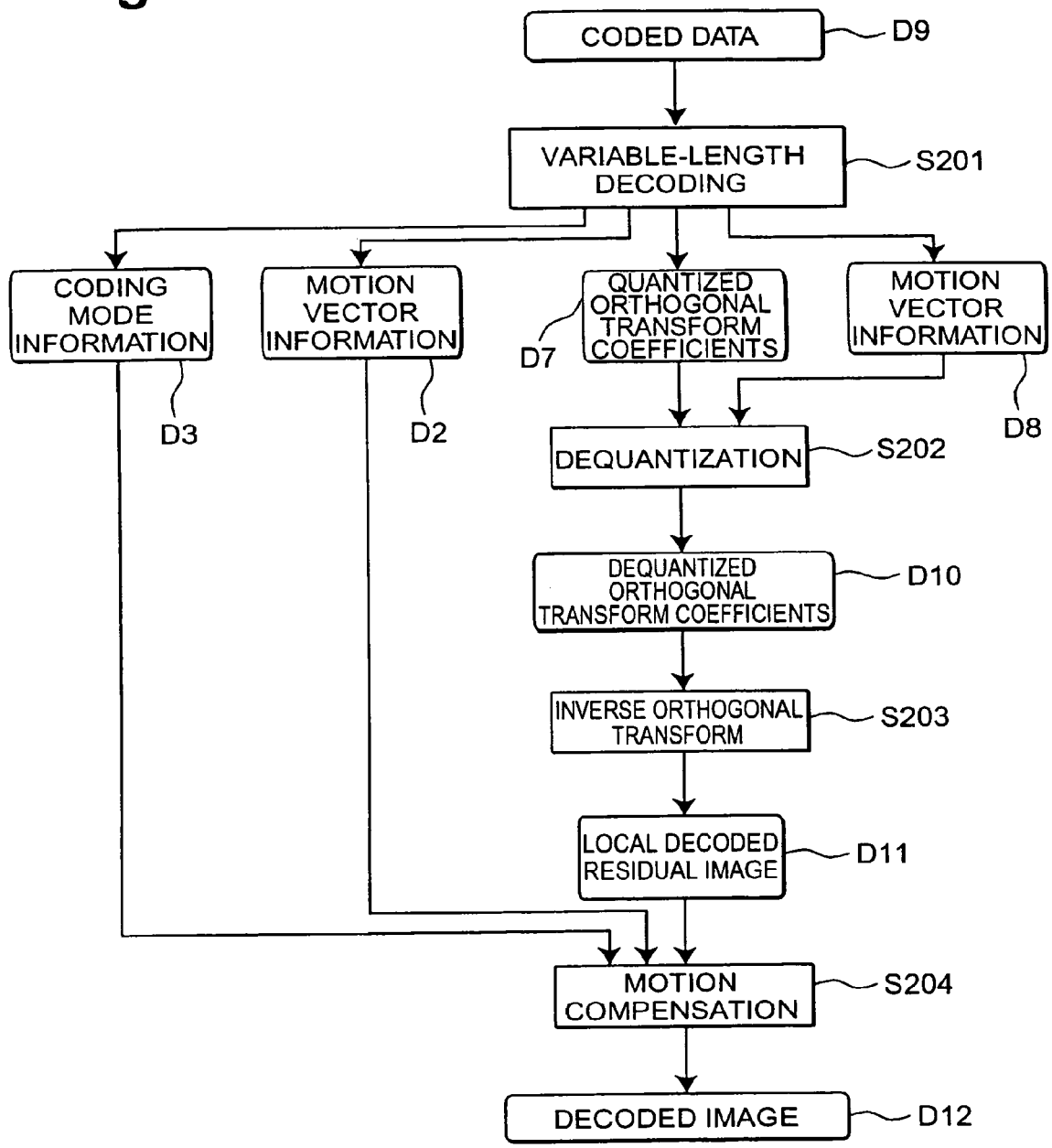
FIG. 5 is a flowchart schematically showing an example of the moving picture decoding technique according to the prior art.
Figure 6:
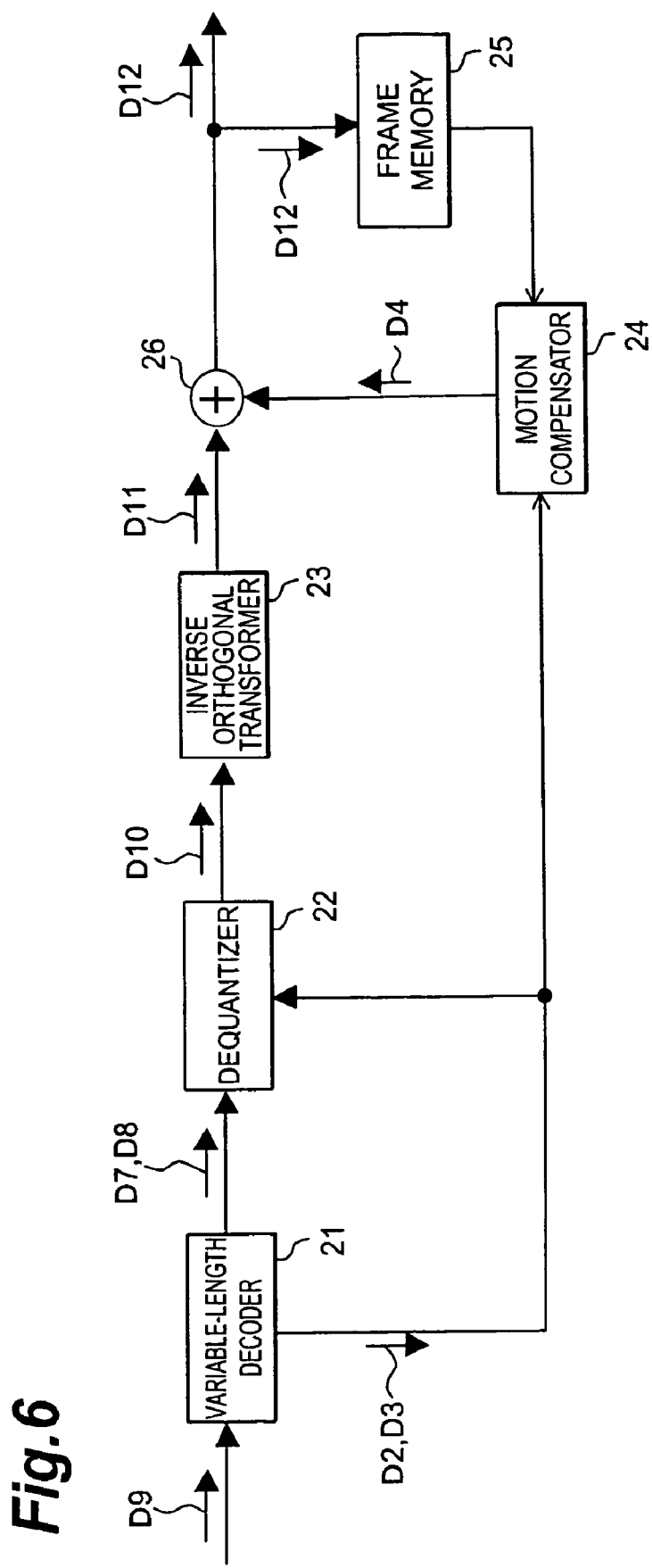
FIG. 6 is a block diagram schematically showing an example of the moving picture decoding apparatus according to the prior art.

The procedure of variable-length coding of the CBP in coding supplementary information D8 and the suitable coding condition thereof, which are the features of the first embodiment of the present invention, will be described below with specific examples thereof, using the MPEG-4 coding system as an example. It is noted that the coding method and coding condition described below can also be applied similarly to the image encoding method and image encoding apparatus shown in FIGS. 1 and 2 and to the image decoding method and image decoding apparatus shown in FIGS. 5 and 6. It is also noted that the specific encoding system and decoding system do not have to be limited to the foregoing MPEG-4 encoding system.

In MPEG-4 the CBP is a flag indicating whether there is a nonzero AC component among the orthogonal transform coefficients in each block in a macroblock for which the intra coding mode is selected. It is also a flag indicating whether there is a nonzero DC component or nonzero AC component among the orthogonal transform coefficients in each block in a macroblock for which the inter coding mode is selected.

Figure 7A:
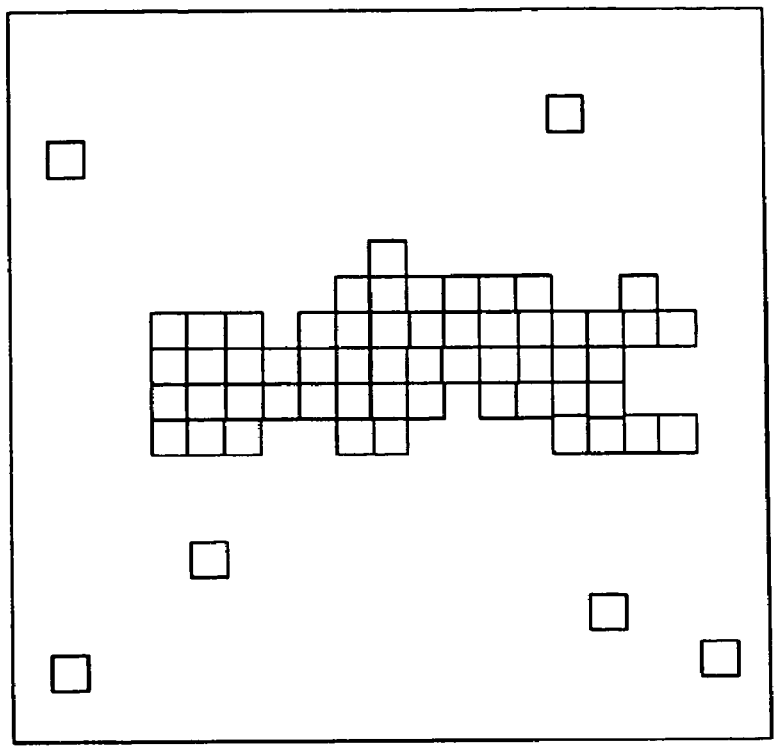
FIGS. 7A and 7B are diagrams showing an example of distribution of nonzero quantized orthogonal transform coefficients.
Figure 7B:
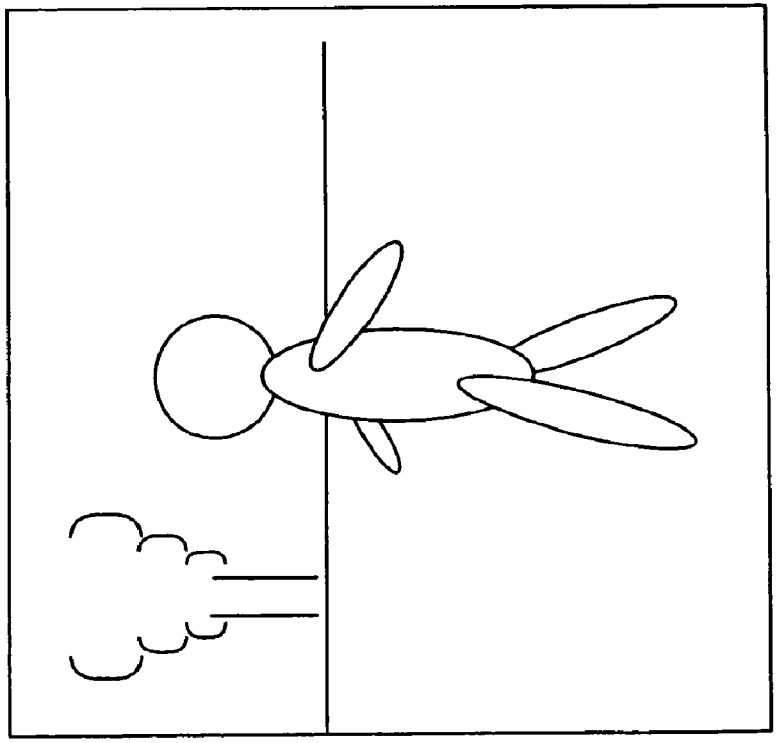

Incidentally, an area with nonzero orthogonal transform coefficients is significantly dependent upon the spatial characteristics of image and the quantization parameter. FIGS. 7A and 7B are conceptual diagrams showing the relationship between the spatial characteristics of image and nonzero orthogonal transform coefficients. As shown in FIGS. 7A and 7B, there is less motion in the background part in the screen, where it is relatively easy to make a correct motion compensated prediction; therefore, nonzero orthogonal transform coefficients are unlikely to appear. Conversely, the moving figure part in the screen contains hard motion to cause considerable change of texture, so that there appear many residuals by the motion compensated prediction. For this reason, nonzero orthogonal transform coefficients are likely to appear in such areas. Namely, nonzero orthogonal transform coefficients are unlikely to appear in areas with small change in texture and motion, whereas nonzero orthogonal transform coefficients are likely to appear in areas with large change in texture and motion. Particularly, in the case of natural images and the like, it is often the case that tendencies of change in shape and motion are similar in neighboring areas.

Figure 8:
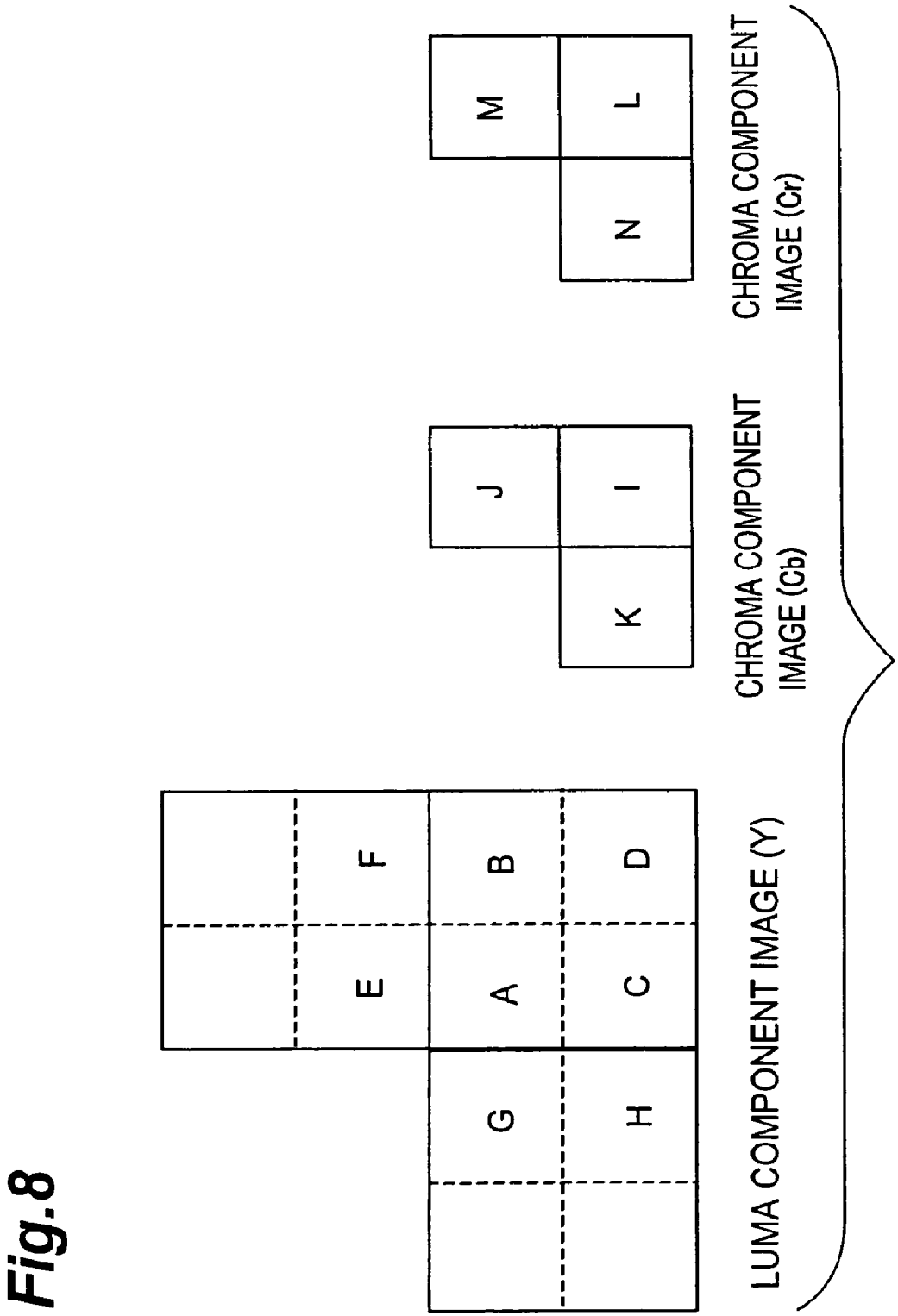
FIG. 8 is a diagram showing relations among blocks in a macroblock and adjacent blocks.

Here, as shown in FIG. 8, let blocks of a coding target macroblock in a luma component image be block A, block B, block C, and block D in the raster scan order, and lower blocks of a macroblock adjacent above be block E and block F. Furthermore, let right blocks of a macroblock adjacent left be block G and block H. In addition, let blocks of Cb and Cr in a coding target macroblock be blocks I and L, respectively; blocks adjacent above be blocks J and M; and blocks adjacent left be blocks K and N.

Then, for example, where nonzero orthogonal transform coefficients exist in all the blocks E, F, and G, we can infer from analogy in consideration of the spatial continuity of the image that there is a high possibility that nonzero orthogonal transform coefficients also exist in block A. Conversely, for example, where neither of the blocks E, F, and G contains nonzero orthogonal transform coefficients, we can infer from analogy that there is a high possibility that no nonzero orthogonal transform coefficients exist in block A, either. In this manner, for each block of the coding target macroblock, the probability of existence of nonzero orthogonal transform coefficients in the coding target macroblock varies depending upon the presence/absence of nonzero orthogonal transform coefficients in neighboring blocks. In view of the above, the image encoding method in the first embodiment of the present invention is characterized in that efficient coding can be implemented by generating the spatial context on the basis of the presence/absence of nonzero orthogonal transform coefficients in neighboring blocks to the coding target macroblock and switching between map tables used in the variable-length coding of the CBP of the coding target macroblock, on the basis of the spatial context.

The following will describe an example of means for switching between map tables used in the variable-length coding to encode the CBP in the first embodiment of the present invention. First, the spatial context is introduced, as described below, for CBPY which is the CBP for the luma components and for CBPC which is the CBP for the chroma components, and the method is configured to switch between map tables according to the spatial context.

FIG. 9A shows a map table in which CBPYs are associated with index values corresponding to the respective CBPYs. FIG. 9B shows an example of a variable-length coding table in which index values are associated with variable-length codes corresponding to the respective index values. A CBPY is expressed by four bits, which correspond to blocks A, B, C, and D in order from the MSB (Most Significant Bit) and each of which indicates 1 for the presence of a nonzero orthogonal transform coefficient or 0 for the absence thereof. Here, let us introduce points P(A), P(B), and P(C), and operator "==," in order to express correlations between blocks A, B, C, D and neighboring blocks. The operator "==" is an operator that returns 1 where two numerals are equal, but 0 where they are unequal. Namely, where CBP(A) being the CBP of block A is equal to CBP(G) being the CBP of block G, the result of the operation of Eq (1) below is 1.

$$CBP(A)==CBP(G) \qquad \text{Eq (1)}$$

In other words, where CBP(A) and CBP(G) both are 1 or 0, the operation result of Eq (1) is 1; otherwise, the operation result of Eq (1) is 0. Points P(A), P(B), and P(C) are also defined herein by Eqs (2), (3), and (4) below.

$$P(A)=2\cdot(CBP(A)==CBP(E))+2\cdot(CBP(A)==CBP(G))+ \\ (CBP(A)==CBP(H))+(CBP(A)==CBP(F)) \qquad \text{Eq (2)}$$

$$P(B)=4\cdot(CBP(B)==CBP(F))+2\cdot(CBP(B)==CBP(E)) \qquad \text{Eq (3)}$$

$$P(C)=4\cdot(CBP(C)==CBP(H))+2\cdot(CBP(C)==CBP(G)) \qquad \text{Eq (4)}$$

These equations permit degrees of correlations of the CBPs of blocks A, B, and C with those of the neighboring blocks to be expressed by points P(A), P(B), and P(C).

P(A), P(B), and P(C) are calculated for all the patterns in the map table shown in FIGS. 9A, 9B, and a total thereof is defined as P(CBPY). Namely, P(CBPY) is represented by the following equation.

$$P(CBPY)=P(A)+P(B)+P(C) \qquad \text{Eq (5)}$$

However, if a neighboring block to the coding target macroblock is outside the screen or outside a given slice, the operation result by the operator "==" is always set to 0 because of no correlation. Namely, for example, where blocks G, H are outside the screen or outside the slice, for example, values of (CBP(A)==CBP(G)) and (CBP(A)==CBP(H)) are always 0.

The P(CBPY) obtained in this manner provides a larger value for a CBPY having a higher spatial correlation with CBPYs in the neighborhood of the coding target macroblock. This means that the P(CBPY) takes a larger value for a CBPY assumed to have a higher probability of occurrence on the basis of the spatial context. Then a map table is created by rearranging the order of index values in FIG. 9A so as to assign the index values of CBPYs in increasing order from the smallest to the P(CBPY)'s obtained in this way, starting from the largest P(CBPY). However, where two P(CBPY)'s are equal, one with a smaller index value in the map table of FIG. 9A is also assigned a smaller index value in the new map table. FIGS. 10A and 10B show the map tables of CBPY in respective examples where the CBPs of the blocks E, F, G, and H are 1, 1, 0, 0, respectively (FIG. 10A) and where they are 0, 1, 1, 0, respectively (FIG. 10B).

For CBPC, the map table is also switched to another in much the same manner on the basis of the spatial context. FIG. 11A shows an example of the map table of CBPC, and FIG. 11B an example of the variable-length coding table of CBPC. A CBPC is expressed by two bits, which correspond to Cb and Cr in order from the MSB side and each of which indicates 1 for the presence of a nonzero orthogonal transform coefficient or 0 for the absence thereof. In accordance with FIG. 8, just as in the case of CBPY, P(I), P(L), and P(CBPC) are defined by Eqs (6), (7), and (8) below.

$$P(I)=(CBP(I)==CBP(J))+(CBP(I)==CBP(K)) \qquad \text{Eq (6)}$$

$$P(L)=(CBP(L)==CBP(M))+(CBP(L)==CBP(N)) \qquad \text{Eq (7)}$$

$$P(CBPC)=P(I)+P(L) \qquad (8)$$

However, where a neighboring block to the coding target macroblock is outside the screen or outside a given slice, the operation result by the operator "==" is always set to 0 because of no correlation. Namely, for example, where block K is outside the screen or outside the slice, for example, the value of (CBP(I)==CBP(K)) is always set to 0.

The P(CBPC) obtained in this manner provides a larger value for a CBPC having a higher spatial correlation with CBPCs in the neighborhood of the coding target macroblock. Namely, the P(CBPC) takes a larger value for a CBPC assumed to have a higher probability of occurrence on the basis of the spatial context. Then a map table is created by rearranging the order of index values in FIG. 11A to assign the index values of CBPCs in increasing order from the smallest to the values of P(CBPC)'s obtained in this way, starting from the largest P(CBPC). However, where two P(CBPC)'s are equal, one with a smaller index value in the map table of FIG. 11A is also assigned a smaller index value in the new map table. FIGS. 12A and 12B show the map tables of CBPC in respective examples where the CBPs of J, K, M, and N in FIG. 8 are (0, 1, 0, 0), respectively (FIG. 12A), and where they are (0, 0, 1, 1), respectively (FIG. 12B).

As described above, since the first embodiment of the present invention is configured to switch the map tables of CBPY and CBPC in consideration of the continuity of image, it is feasible to assign short codewords to symbols likely to appear and long codewords to symbols unlikely to appear, and thereby encode the CBP suitably.

Figure 13:
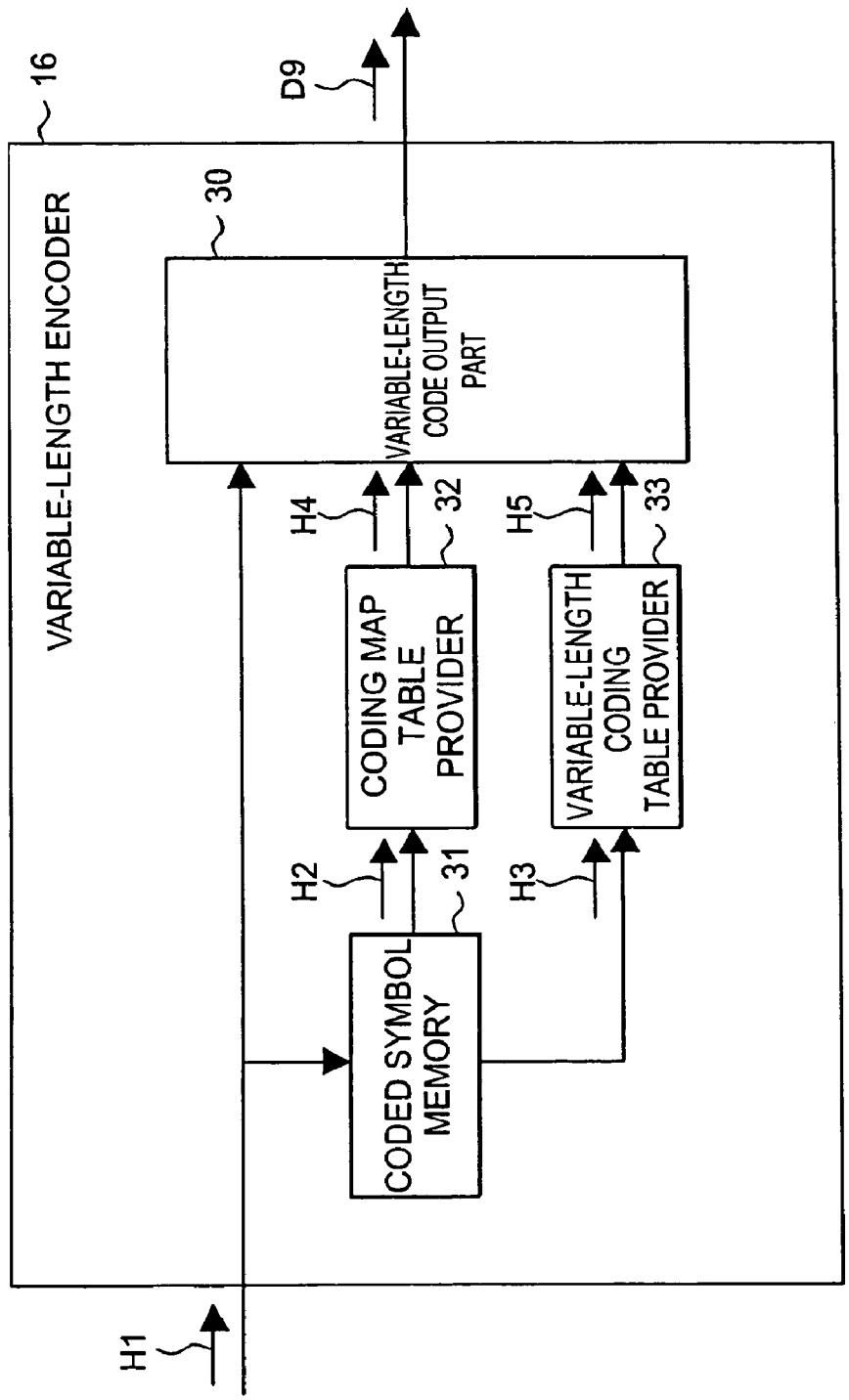
FIG. 13 is a block diagram schematically showing an example of a variable-length encoder according to the present invention.

FIG. 13 is an illustration showing a block diagram of variable-length encoder 16 according to the first embodiment of the present invention. Namely, in the variable-length encoder 16 of FIG. 13, the CBPs are first fed as input symbols H1 into variable-length code output part 30. Then coded symbol memory 31 feeds the CBPs in neighboring blocks as coding map table reference information H2 into coding map table provider 32. Then coding map table provider 32 determines a coding map table to be used for the coding of the CBPs, on the basis of the aforementioned technique, and provides the coding map table H4 to the variable-length code output part 30. Variable-length coding table provider 33 also feeds a variable-length coding table H5 into the variable-length code output part 30. Variable-length coding table reference information H3 can be fed into variable-length coding table provider 33, but this input is not always essential in the present embodiment. Then the coding target CBPs are variable-length coded to be outputted as coded data D9.

Figure 15B:
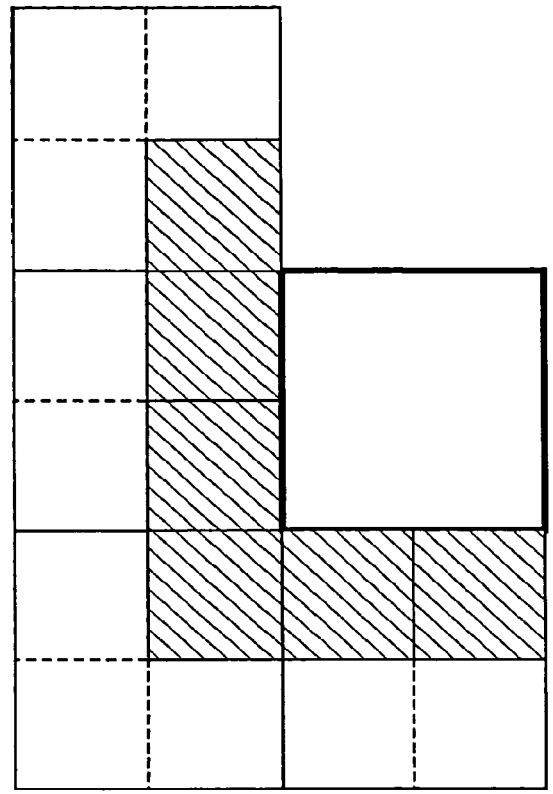
FIGS. 15A and 15B are diagrams showing an example of locations of blocks used in generation of context of the coded block pattern information according to the present invention.
Figure 15A:
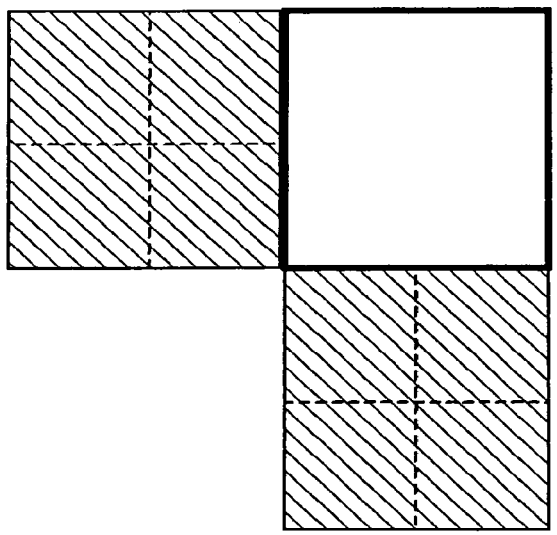

In the first embodiment of the present invention only the blocks adjacent to the coding target macroblock were referred to on the occasion of generating the spatial context of CBPs, but, without having to be limited to the adjacent blocks, it is a matter of course that the spatial context can be generated by utilizing additional information of CBPs of blocks that are not adjacent to the coding target macroblock but that exist in the neighborhood, for example as shown in FIG. 15A, or that the spatial context can also be generated by utilizing information of blocks in macroblocks not used in the first embodiment of the present invention, for example as shown in FIG. 15B, with similar effect.

The encoding method in the first embodiment of the present invention was described in the configuration wherein the CBPY and CBPC each were separately variable-length encoded using the separate variable-length coding tables, but it is a matter of course that similar effect can also be attained by encoding the CBPY and CBPC together while effecting switching of the map table using a variable-length coding table and map table for CBPs, for example, expressed by six bits wherein four bits from the MSB represent the CBPY and two bits from the LSB the CBPC. In this case, the encoding method may also be configured to effect switching of the variable-length coding table, using the P(CBPY) and P(CBPC) calculated by Eq (5) and Eq (8), and, for example, utilizing the value of P(CBP) obtained by Eq (9) below.

$$P(CBP) = P(CBPY) + P(CBPC) \qquad \text{Eq (9)}$$

Since in the encoding method according to the first embodiment of the present invention the spatial context was generated on the basis of the information in the neighboring blocks previously coded, a similar spatial context can also be regenerated on the occasion of decoding, and switching among variable-length decoding tables can be effected in similar fashion to that on the encoder side.

Figure 14:
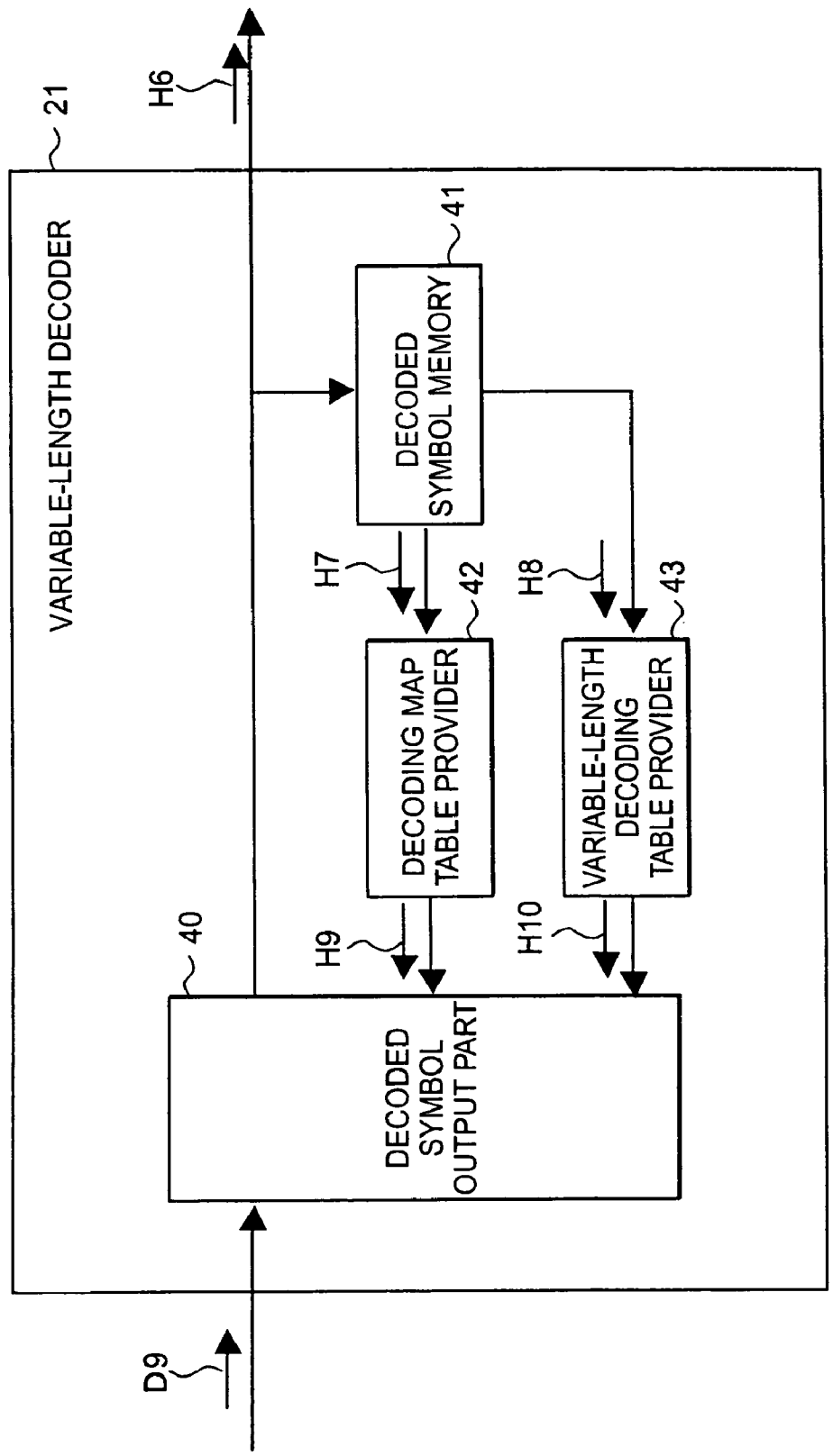
FIG. 14 is a block diagram schematically showing an example of a variable-length decoder according to the present invention.

Namely, in the block diagram of variable-length decoder 21 shown in FIG. 14, when coded data D9 coded by the encoding method according to the first embodiment of the present invention is fed into decoded symbol output part 40 of the variable-length decoder 21, decoded symbol memory 41 feeds the CBPs of neighboring blocks from the symbols previously decoded, as decoding map table reference information H7 into decoding map table provider 42. Then decoding map table provider 42 selects a decoding map table H9 by procedure similar to that in the coding and feeds it to decoded symbol output part 40. Variable-length decoding table provider 43 feeds a variable-length decoding table H10 into decoded symbol output part 40. Variable-length decoding table reference information H8 can be fed into the variable-length decoding table provider 43, but this input is not always essential in the present embodiment. Then decoded symbol output part 40 performs variable-length decoding to decode and output the CBPs as decoded symbols H6, and simultaneously stores them into decoded symbol memory 41.

It follows that the decoding method in the first embodiment of the present invention can suitably decode the CBPs encoded by the encoding method in the first embodiment of the present invention.

The encoding method in the first embodiment of the present invention was described using the MPEG-4 encoding system as an example, but it is a matter of course that similar effect can also be achieved in the other encoding systems by similarly generating the spatial context for the coding of CBPs and effecting the switching of the variable-length coding table on the basis of the spatial context. The following will describe an example of application in which the first embodiment of the present invention is applied to the encoding method of CBPs in the H.26L encoding system as another encoding system.

FIGS. 16A and 16B show configurations of macroblocks and configurations of CBPs in the H.26L encoding system. In H.26L a macroblock of a luma component image is of the size of 16 pixels×16 lines, while macroblocks of two types of chroma component images are of the size of 8 pixels×8 lines. The orthogonal transform is carried out in units of 4 pixels×4 lines for each macroblock, and the DC components of the chroma component images out of the orthogonal transform coefficients generated in this way are further subjected to the orthogonal transform of 2 pixels×2 lines. In the case of macroblocks intra-coded, there are two types of coding modes, intra 4×4 coding mode and intra 16×16 coding mode, as coding modes, and configurations of CBPs in the respective modes are different.

First, in the intra 4×4 coding mode, as to the CBPY, a macroblock is divided into four blocks of 8 pixels×8 lines, as in MPEG-4, and whether a nonzero orthogonal transform coefficient exists in each block is indicated. On the other hand, the CBPC has three cases of "0," "1," and "2." The CBPC "0" indicates that no nonzero orthogonal transform coefficient exists as to the chroma components. The CBPC "1" indicates that a nonzero orthogonal transform coefficient exists only in the DC components of the chroma components but no nonzero orthogonal transform coefficient exists in the AC components. The CBPC "2" indicates that at least one nonzero orthogonal transform coefficient exists in the AC components of the chroma components. The inter-coded macroblocks have the configurations of CBPs similar to those in the intra 4×4 coding mode. In the CBPs in the intra 16×16 coding mode, the CBPY is comprised of only one bit indicating whether a nonzero orthogonal transform coefficient exists in the AC component in a macroblock. The CBPC in the intra 16×16 coding mode is similar to that in the intra 4×4 coding mode.

Figure 17B:
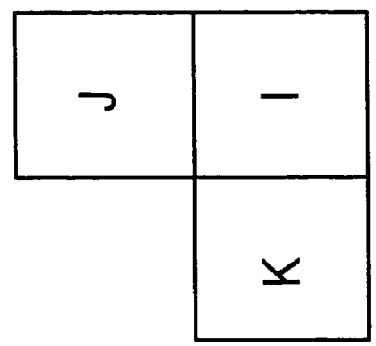
FIGS. 17A and 17B are diagrams showing relations among a macroblock and adjacent blocks where the present invention is applied in the H.26L encoding system.
Figure 17A:
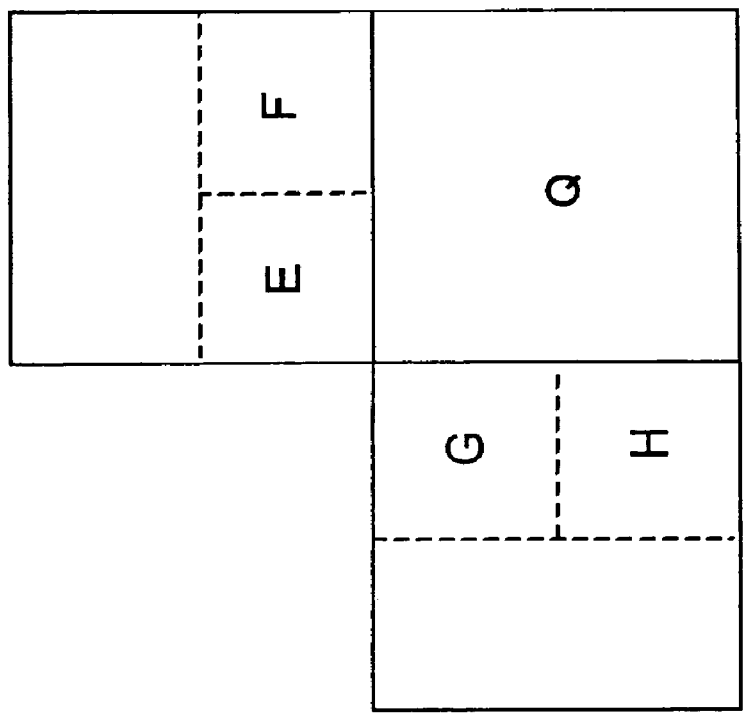

First, since the configuration of CBPY is similar to that in MPEG-4 except for the case of the intra 16×16 coding mode, the other encoding methods can adopt methods similar to those in the case where the invention was applied to MPEG-4, while handling only the case in the intra 16×16 coding mode as an exceptional process. Where the coding target macroblock in FIG. 8 is coded in the intra 16×16 coding mode, the P(CBPY) is calculated, for example, using Eq (10) below, and a CBPY yielding a larger value of P(CBPY) is given a higher priority. As shown in FIG. 17A, the entire coding target macroblock is defined as block Q, and CBP(Q) represents the value of CBPY in the coding target macroblock. FIGS. 18A and 18B show a map table and a variable-length coding table in coding of CBPY in the application to H.26L, similar to FIGS. 9A, 9B.

$$P(CBPY) = (CBP(Q) == CBP(E)) + (CBP(Q) == CBP(F)) + (CBP(Q) == CBP(G)) + (CBP(Q) == CBP(H)) \qquad \text{Eq (10)}$$

Where a macroblock adjacent to a coding target macroblock is one coded in the intra 16×16 coding mode, all the CBPs for the luma component of the macroblock coded in the intra 16×16 coding mode are assumed to be the same value as the CBPY of the macroblock coded in the intra 16×16 coding mode, and coding is carried out by a method similar to that in the application to MPEG-4 in the first embodiment of the present invention. Namely, for example, where the coding mode of the macroblock adjacent left to the coding target macroblock is the intra 16×16 coding mode and where the CBPY there of is "1," the spatial context is generated while assuming that the CBP(G) and CBP(H), which are the values of CBPs of block G and block H in FIG. 8, both are "1."

Since the configuration of CBPC is common to all the coding modes, there is no need for an exceptional process in the encoding method. As shown in FIG. 17B, let a block of a chroma component image in a coding target macroblock be block I, a block adjacent above be J, and block adjacent left be K. FIGS. 18C and 18D show a map table and a variable-length coding table in the coding of CBPC in the application to H.26L. In the application to H.26L, the CBPC can take one of the values "0," "1," and "2." Since this value is considered to resemble values of CBPC in neighboring blocks, the spatial context is generated so as to estimate the value of CBPC of block I from the values of CBPC of block J and block K. Namely, letting CBPC(J) represent the value of CBPC in block J and CBPC(K) represent the value of CBPC in block K, the P(CBPC) is calculated by Eq (11) below and the map table is switched to one wherein the index values are assigned in increasing order from the value of CBPC closest to the P(CBPC).

$$P(CBPC)=(CBPC(K)+CBPC(J))/2 \qquad \text{Eq (11)}$$

Namely, for example, where CBPC(J)=CBPC(K)=2, Eq (11) yields P(CBPC)=2 and thus the map table is generated so that the index value for CBPC=2 becomes the smallest among the CBPCs in the coding target macroblock and the index values thereafter increase in order for CBPC=1 and finally for CBPC=0, as shown in the table in FIG. 19.

By the configuration as described above, the switching of the map table can also be implemented in the H.26L encoding system on the basis of the spatial context, while applying the information in the neighboring blocks to the coding target macroblock to the coding of CBPs, and short codewords can be assigned to symbols with high occurrence probabilities, which can implement suitable coding of CBPs.

Second Embodiment

The first embodiment of the present invention presented the method of implementing the suitable coding of CBPs by the configuration wherein the spatial context was generated by making use of the information of CBPs in the neighboring blocks in the coding of CBPs and wherein the map table was switched on the basis of the spatial context, whereas the encoding method and apparatus in the second embodiment of the present invention are characterized in that the coding efficiency is increased by generating the spatial context while further utilizing the coding mode information in the neighboring blocks and implementing the switching of the map table based thereon in the coding of CBPs.

The encoding and decoding in the second embodiment of the present invention will be described based on the MPEG-4 encoding system, as described in the first embodiment of the present invention. The first embodiment of the present invention employed the configuration wherein the spatial context was generated by making use of the values of CBPs in the neighboring blocks in the coding of CBPs of the coding target macroblock and wherein the map table of CBPs was switched according to the spatial context, whereas the second embodiment of the present invention further utilizes the coding mode information in the neighboring macroblocks in the generation of the spatial context.

As previously described, the coding modes of macroblocks in MPEG-4 consist of two inter coding modes and one intra coding mode. Among the inter coding modes the inter coding mode 1 characterized by use of four motion vectors is considered to be selected because of the difference among motions of respective blocks in a macroblock, and it is considered in this case that the motions are not monotonic and nonzero orthogonal transform coefficients are likely to appear. Therefore, in the case of the CBPs of the neighboring blocks to the coding target macroblock as shown in FIG. 8, if a macroblock to which neighboring blocks belong is coded in the inter coding mode 1, the spatial context is generated by adopting CBP=1, regardless of actual CBP values. This configuration enables setting of a map table reflecting the fact that nonzero orthogonal transform coefficients are likely to appear because of complexity of motion in the neighboring region in the inter coding mode 1 considered to indicate complex motion, thereby increasing the coding efficiency of CBPs.

The coded data coded by the above method can be suitably decoded by setting the map table by means similar to the above on the occasion of decoding.

The encoding method in the second embodiment of the present invention was described above in the configuration wherein the spatial context was generated according to the coding mode in the neighboring macroblocks to the coding target macroblock, but it is a matter of course that the spatial context can be generated by also referring to the coding mode in the coding target macroblock.

Third Embodiment

The encoding method in the third embodiment of the present invention is characterized in that in the coding of CBPs the variable-length coding table is switched according to a distribution of probabilities of occurrence of respective patterns of CBPs. Namely, as shown in FIGS. 20A and 20B, there are cases where rates of occurrence of symbols differ depending upon images, against the index order of CBPY, for example. FIG. 20A is a table showing a case where some upper index values have high occurrence probabilities and the others low occurrence probabilities. FIG. 20B is a table showing a case where the deviation is not too large among the occurrence probabilities against index values. In such cases demonstrating distributions of occurrence rates with different characteristics, it is feasible to further increase the coding efficiency by switching among variable-length coding tables suitable for the respective characteristics.

For example, there are prepared a plurality of variable-length coding tables as shown in FIGS. 21A to 21C, and a control is made so as to adaptively switch among them. An example is a plurality of variable-length coding tables shown in FIGS. 21A-21C, which are called the exp-Golomb codes and which are configured as follows. Namely, the codes are configured by adding the Binary part of k+j bits to the Unary part of j+1 bits (j=0, 1, . . . ). Namely, j equals the number of "0" in the Binary part at a certain code and k a code length of the Binary part at the zeroth code. FIG. 21A shows the exp-Golomb codes in the case of k=0, FIG. 21B those in the case of k=1, and FIG. 21C those in the case of k=2. As apparent from the figures, the deviation of distribution of code lengths tends to decrease as the value of k increases.

Now, there are prepared a plurality of variable-length coding tables with different characteristics of deviation of distribution of code lengths in this way and adaptive switching is made among these. A method of switching among these variable-length coding tables is as follows. For example, where the quantization parameter is large, a nonzero orthogonal transform coefficient is unlikely to appear, the CBPY with each bit being "0" is more likely to appear, and it is thus easy to make a correct prediction by the spatial context. Conversely, the CBPY with each bit being "1" is unlikely to appear, so that the prediction by the spatial context tends to be off. Where the quantization parameter is small, a nonzero orthogonal transform coefficient is likely to appear, the CBPY with each bit being "1" is more likely to appear, and the prediction by the spatial context tends to be correct. Conversely, the CBPY with each bit being "0" is unlikely to appear, so that the prediction by the spatial context tends to be off. Where the quantization parameter is neither large nor small, the CBPY has the bits scattered without deviation to "0" or "1," patterns appear depending on the bits, and the prediction by the spatial context also tends to be off. Then the control can be made with reference to the value of the quantization parameter of the coding target macroblock so that, for example, the table of FIG. 21A is applied to the case where the quantization parameter is greater than a predetermined threshold Th1, for example, the table of FIG. 21C is applied to the case where the quantization parameter is not more than the threshold Th1 and is larger than a threshold Th2, and the table of FIG. 21A to the case where the quantization parameter is smaller than the threshold Th2; whereby it is feasible to provide the variable-length coding tables suitable for the respective cases and thereby implement the variable-length coding with high coding efficiency.

Another example of the switching method among the variable-length coding tables is to count the number of occurrences of actual CBPYs according to index values of CBPYs. Namely, where C(n) represents a counter of occurrence frequencies according to index values of the respective CBPYs (n=1-15), the control is made so as to apply, for example, the table of FIG. 21C to the case where the variance of C'(n) resulting from normalization of C(n) is smaller than a preset threshold Th3, and apply, for example, the table of FIG. 21A to the case where the variance is not less than the threshold Th3; whereby it is feasible to provide the variable-length coding tables suitable for the respective cases and thereby implement the variable-length coding with high coding efficiency.

The encoding method above was described using the three variable-length coding tables in FIGS. 21A-21C, but it is a matter of course that the number and values of variable-length coding tables are not limited to FIGS. 21A-21C. The switching among the variable-length coding tables can be implemented by holding the variable-length coding tables in a memory, and another potential method is that the switching among the variable-length coding tables is implemented by using the Universal codes, such as the exp-Golomb codes exemplified above, and switching a parameter thereof.

Specifically, in the variable-length encoder 16 of FIG. 13, the CBPs are first fed as input symbols H1 into variable-length code output part 30. Then coded symbol memory 31 feeds the CBPs in the neighboring blocks as variable-length coding table reference information H2 to coding map table provider 32. Then coding map table provider 32 determines a coding map table to be used in the coding of the CBPs, for example, on the basis of the technique described in the first embodiment of the present invention, and provides the coding table H4 to variable-length code output part 30. Coded symbol memory 31 also feeds the quantization parameter of the coding target macroblock as variable-length coding table reference information H3 to variable-length coding table provider 33. Then the variable-length coding table provider 33 determines a variable-length coding table to be used for the coding of the CBPs, on the basis of the technique in the third embodiment of the present invention, and supplies the variable-length coding table H5 to variable-length code output part 30. Then the coding target CBPs are variable-length coded to be outputted as coded data D9.

Similarly, in the block diagram of variable-length decoder 21 shown in FIG. 14, when coded data D9 coded by the encoding method in the third embodiment of the present invention is fed into decoded symbol output part 40 of variable-length decoder 21, decoded symbol memory 41 feeds the quantization parameter of the decoding target macroblock from the symbols previously decoded, as decoding map table reference information H7 into decoding map table provider 42. Then decoding map table provider 42 selects a decoding map table H9 by procedure similar to the coding and feeds it to decoded symbol output part 40. Decoded symbol memory 41 also feeds the CBPs in the neighboring blocks previously decoded, next to the decoding target macroblock, as variable-length decoding table reference information H8 into variable-length decoding table provider 43. Then variable-length decoding table provider 43 selects a variable-length decoding table by procedure similar to the coding and feeds it as variable-length decoding table H10 into decoded symbol output part 40. Then decoded symbol output part 40 performs the variable-length decoding to decode the CBPs as decoded symbols H6 and output them, and simultaneously stores them into decoded symbol memory 41.

The encoding method in the third embodiment of the present invention was configured to switch among the variable-length coding tables on the basis of the quantization parameter in the coding target macroblock, but it is a matter of course that the present invention can also be applied by similar means, using any information as long as it is coding information that affects the complexity of the image to be coded in the coding target macroblock. For example, where the macroblock coding mode is a mode in which a macroblock is divided into finer blocks, the image is considered to have higher degree of complexity. Conversely, with decrease in the number of divided blocks, the image is considered to have lower degree of complexity. Therefore, in the case where the image is considered to have high-degree of complexity on the basis of the macroblock coding mode, nonzero quantized orthogonal transform coefficients are likely to occur and it is considered that all CBP patterns can occur; therefore, the control is made so as to implement the coding using a variable-length coding table with smaller deviation of code lengths as a variable-length coding table for the coding of CBPs. Conversely, in the case where the image is considered to have low degree of complexity, the control is made so as to implement the coding using a variable-length coding table with larger deviation of code lengths as a variable-length coding table for the coding of CBPs. For example, concerning motion vectors, the possibility of complexity of the image to be coded tends to become higher with increase in the length of the motion vector. For this reason, the encoding method may also be configured so as to perform the control to use a variable-length coding table with smaller deviation of code lengths with increase in the length of the motion vector in the macroblock. In the case of the encoding system of predicting a motion vector of the coding target block from motion vectors in the neighboring blocks and coding a difference value between a predicted value and an actual motion vector, it is also possible to adopt a configuration wherein the variable-length coding table is switched to another on the basis of the motion vector difference value in the coding target macroblock. Namely, as the motion vector difference value increases, the motion becomes more complex in the neighborhood of the coding target macroblock, and as a result it can be inferred that nonzero quantized orthogonal transform coefficients are likely to occur; in this case, the control may be configured to use a variable-length coding table with smaller deviation of code lengths, for example, with increasing absolute value of the difference motion vector in the coding target macroblock.

As described above, the third embodiment of the present invention employs the configuration wherein the switching among variable-length coding tables is implemented according to the distribution of occurrence probabilities of the respective CBPs, and thus it can achieve efficient coding.

Fourth Embodiment

Figures 22A, 22B, 22C, 22D:
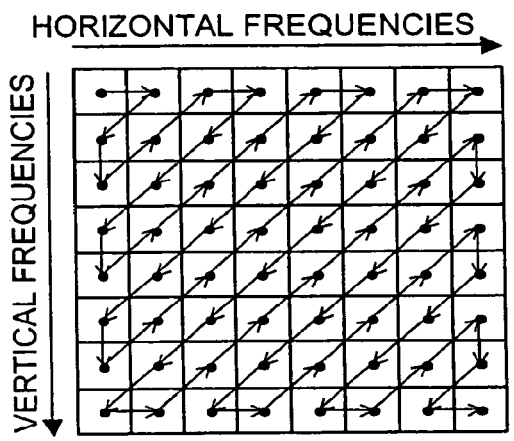
FIGS. 22A-22D are diagrams schematically showing an encoding method of quantized orthogonal transform coefficients.

Described next is the procedure of variable-length coding of orthogonal transform coefficients in the encoding method according to the fourth embodiment of the present invention. The description herein is based on the assumption that the orthogonal transform to transform spatial image data into frequency image data is Discrete Cosine Transform (DCT). FIG. 22A shows a specific numerical example of quantized orthogonal transform coefficients $q_{11}$-$q_{88}$ obtained by quantizing the orthogonal transform coefficients $f_{11}$-$f_{88}$ of 8 pixels×8 lines shown in FIG. 4B. The variable-length encoder of image encoding apparatus performs the variable-length coding over such quantized orthogonal transform coefficients according to a predetermined processing procedure to generate coded data.

In the case of the quantized orthogonal transform coefficients $q_{11}$-$q_{88}$ where the subscripts i, j of each coefficient $q_{ij}$ represent a vertical frequency and a horizontal frequency corresponding thereto, unlike the image components $a_{11}$-$a_{88}$ in the spatial image data (cf. FIG. 4A), each quantized orthogonal transform coefficient, concerning the magnitude of the coefficient value thereof or the like, has a data characteristic dependent upon the values of the corresponding space frequencies. In general, in the case of natural images, large orthogonal transform coefficient values are obtained in the low frequency region and coefficient values decrease toward the high frequency region. This distribution can be approximated by a Laplace distribution with a peak at zero. As densities of pixels in each block vary greater, the spread of the distribution of transform coefficients is also greater and an average amplitude value of coefficients increases.

In the processing procedure of the variable-length coding of the quantized orthogonal transform coefficients, first, the quantized orthogonal transform coefficients $q_{11}$-$q_{88}$ being two-dimensional data are transformed into one-dimensional data, for example, by the zigzag scan shown in FIG. 22B. In this zigzag scan, the quantized orthogonal transform coefficients are scanned to yield a data string from the low frequency region to the high frequency region as the one-dimensional data after the scan. This yields the one-dimensional data shown in FIG. 22C, in which the quantized orthogonal transform coefficients are aligned from the low frequency region to the high frequency region.

This one-dimensional data of quantized orthogonal transform coefficients is further transformed into data consisting of values of Level and Run shown in FIG. 22D. Here the Level indicates a coefficient level at a quantized orthogonal transform coefficient with a nonzero coefficient value among the plurality of quantized orthogonal transform coefficients. The Run indicates a zero run length being the number of data with the coefficient value of 0 present immediately before a nonzero quantized orthogonal transform coefficient.

For example, in the case of the data example of DCT coefficients shown in FIG. 22A, the sixty four DCT coefficients $q_{11}$-$q_{88}$ are sorted out, based on locations of appearance of DCT coefficients with nonzero coefficient value, into a coefficient set $S_1$ consisting of coefficient $q_{11}$, a coefficient set $S_2$ consisting of coefficients $q_{12}$, $q_{21}$, a coefficient set $S_3$ consisting of coefficients $q_{31}$-$q_{13}$, a coefficient set $S_4$ consisting of coefficients $q_{14}$-$q_{32}$, a coefficient set $S_5$ consisting of coefficients $q_{41}$-$q_{15}$, and a coefficient set $S_6$ consisting of coefficients $q_{16}$-$q_{88}$, as shown in FIG. 22C.

For each of these coefficient sets $S_i$ (i=1-6), as shown in FIG. 22D, Level value $L_i$ and Run value $R_i$ are determined. Specifically, the coefficient set $S_1$ has $L_1=q_{11}=10$ and $R_1=0$. The coefficient set $S_2$ has $L_2=q_{21}=-2$ and $R_2=1$. The coefficient set $S_3$ has $L_3=q_{13}=2$ and $R_3=2$. The coefficient set $S_4$ has $L_4=q_{32}=-1$ and $R_4=2$. The coefficient set $S_5$ has $L_5=q_{15}=1$ and $R_5=5$. The last coefficient set $S_6$ is a coefficient group of the coefficients $q_{16}$-$q_{88}$ all having the coefficient value of 0, and thus has $L_6=0$ and $R_6$ undefined.

Nonzero coefficient count CC and Run total RT in the coding target block are calculated from the data of Level and Run shown in FIG. 22D. For example, specifically, they are calculated as nonzero coefficient count CC=5 and Run total RT=10 from FIG. 22D.

For example, the same as the table shown in FIG. 9B can be used as a variable-length coding table to be used in the coding of these coefficient sets and the nonzero coefficient count CC and Run total RT. In this variable-length coding table the left column represents the index values and the right column the variable-length codes corresponding to the index values.

FIG. 13 is an illustration showing the block diagram of variable-length encoder 16 according to the fourth embodiment of the present invention. The nonzero coefficient count CC and Run total RT are first fed as input symbols H1 into variable-length code output part 30 and variable-length coding table provider 33. The variable-length coding table provider 33 provides, for example, the variable-length coding table H5 as shown in FIG. 9B, as a variable-length coding table corresponding to the input symbols H1, for the variable-length code output part 30, and the input symbols H1 are encoded using the variable-length coding table H5. Namely, using a value obtained by subtracting 1 from the value of nonzero coefficient count CC, as an index value, a corresponding variable-length code is outputted as coded data D9. Similarly, using the value of Run total RT as an index value, a corresponding code is outputted as variable-length coded data D9.

Then the coefficient sets are encoded in order from the high frequency side. However, the coefficient set with all the coefficient values of 0 is not encoded. First, the Run values $R_i$ of all the coefficient sets are first fed as input symbols H1 into variable-length code output part 30, and then they are encoded similarly using the variable-length coding table and using the Run values $R_i$ as indexes, to be outputted as coded data D9.

Then the coding of Level value is carried out for all the nonzero Level values in order from the high-frequency-side coefficient set.

The encoding method in the fourth embodiment of the present invention is characterized in that the variable-length coding table in the coding of Level values in a coding target block is switched according to Level values in previously coded blocks in the neighborhood of the coding target block.

Figure 23:
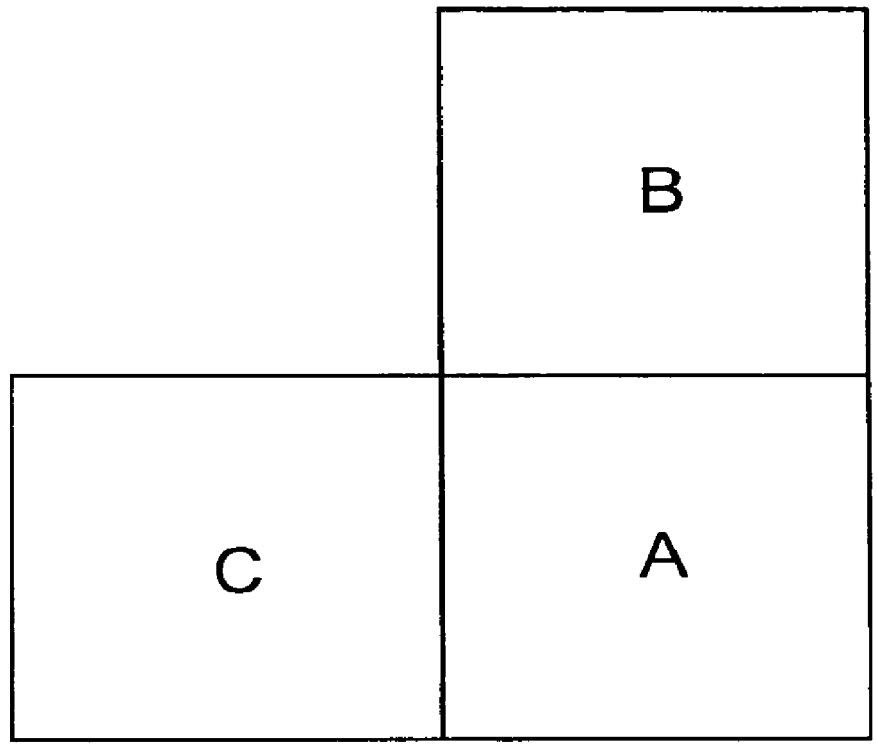
FIG. 23 is a diagram showing a positional relation among a coding target macroblock and adjacent macroblocks.

Let a block as a target for coding be block A, a block adjacent above thereto be block B, and a block adjacent left thereto be block C, as shown in FIG. 23. It is known that in image signals nonzero orthogonal transform coefficients are unlikely to appear in areas with small change in texture and motion and, conversely, nonzero orthogonal transform coefficients are likely to appear in areas with large change in texture and motion. Particularly, natural images and the like often tend to have similar tendencies of change in texture and motion in neighboring regions. Therefore, it is possible to analogize a tendency of occurrence of coded coefficients in a block as a target for coding, from tendencies of occurrence of coded coefficients in neighboring blocks to the coding target block.

Namely, for example, if many coefficients with large Level value appear in block B and block C adjacent to block A as a coding target, their neighboring areas are considered to demonstrate complex change in texture and motion in image signals; therefore, we can infer from analogy that many coefficients with large Level value also occur in the coding target block A. Conversely, for example, if only coefficients with small Level value appear in block B and block C adjacent to block A as a coding target, or if no coefficient has a nonzero Level value, their neighboring areas are considered to be monotonic in texture and motion in image signals; therefore, we can infer from analogy that coefficients with small Level value also tend to appear in the coding target block C.

Incidentally, where there appear many large Level values, it is difficult to analogize whether a Level value is small or large; therefore, it is feasible to perform efficient coding by use of a variable-length coding table with as small a deviation of code lengths for the respective Level values as possible. Conversely, where the Level values tend to be small, the coding can be efficiently performed by use of such a variable-length coding table as to make the code lengths shorter for coefficients with small Level value.

Then there are prepared a plurality of variable-length coding tables with different characteristics of the deviation of distribution of code lengths, for example, as shown in FIGS. 21A-21C, and the variable-length coding table for the coding target Level values is switched to another according to the Level values in the neighboring macroblocks. Namely, the control is carried out as follows: where it is inferred that small Level values tend to appear in the coding target macroblock, from the Level values in the neighboring macroblocks, the coding is performed by use of a table with a large deviation of code lengths, as shown in FIG. 21A; where it is inferred that large Level values also tend to appear, the coding is performed by use of a table with a small deviation of code lengths, as shown in FIG. 21C.

Specifically, on the occasion of coding the Level values in the block as a coding target, for example, a maximum MaxL is determined out of absolute values of Level values in block B and block C in FIG. 23, and is compared with preset thresholds Th7 and Th8 (Th7<Th8), and the switching of the variable-length coding table is performed so that the variable-length coding table of FIG. 21A is used where MaxL is smaller than Th7, the variable-length coding table of FIG. 21B is used where MaxL is not less than Th7 and is smaller than Th8, and the variable-length coding table of FIG. 21C is used where MaxL is not less than Th8.

Namely, in the variable-length encoder 16 of FIG. 13, when the Level values are fed as input symbols H1 into variable-length code output part 30, coded symbol memory 31 feeds MaxL as variable-length coding table reference information H3 into variable-length coding table provider 33 and the variable-length coding table provider 33 provides a variable-length coding table H5 which is selected by the aforementioned control technique on the basis of the variable-length coding table reference information H3, for the variable-length code output part 30. The other operation is similar to that in the first to third embodiments of the present invention.

By adopting this configuration, the tendency of appearance of Level values in the block as a coding target can be analogized from the neighboring blocks to the coding target block; short code lengths can be assigned to small Level values in the case where small Level values are likely to appear; not too long code lengths can also be assigned to large Level values in the case where it is difficult to analogize whether the Level values are small or large; therefore, it is feasible to perform efficient coding of Level values.

The encoding method in the fourth embodiment of the present invention was described in the configuration wherein MaxL out of the absolute values of Level values in block B and block C in the neighborhood to the coding target block was used as variable-length coding table reference information H3, but it is a matter of course that the present invention is by no means intended to be limited to this example and that, for example, the maximum can be selected from absolute values of Level values in the reference range also including other previously coded neighboring blocks or the maximum can be replaced by any other information selected from a variety of information items that indicate the characteristic of Level values in the neighboring blocks, such as an intermediate value, a total of absolute values, a variance, an average of absolute values, and so on.

The encoding method in the fourth embodiment of the present invention was described so that the coding of Run values was carried out before that of the Level values, but it is a matter of course that the present invention may be arranged so that the Run values are encoded after the Level values or so that the Run values and Level values are alternately encoded.

FIG. 14 is an illustration showing the block diagram of variable-length decoder 21 according to the fourth embodiment of the present invention. When coded data D9 coded by the encoding method in the fourth embodiment of the present invention is fed into decoded symbol output part 40 of variable-length decoder 21, the decoded symbol memory 41 feeds MaxL into variable-length decoding table provider 43. Then variable-length decoding table provider 43 determines a variable-length decoding table used for the target, by the processing similar to that in the coding and supplies the variable-length decoding table H9 to decoded symbol output part 40. The decoded symbol output part 40 then performs the variable-length decoding to decode and output the Level values as decoded symbols H6, and simultaneously stores them into decoded symbol memory 41.

Since the variable-length decoder is configured as described above, it is feasible to properly decode the coded data coded by the encoding method in the fourth embodiment of the present invention.

The encoding method and decoding method in the fourth embodiment of the present invention were described above using the specific table values, but it is a matter of course that the present invention is by no means intended to be limited to these values. The embodiment of the present invention was described using the example of DCT coefficients of 8 pixels×8 lines, but it is needless to mention that the type of the orthogonal transform and the size of blocks are not limited to these.

Fifth Embodiment

The encoding method in the fifth embodiment of the present invention will be described below. Now, the motion vector information D2 is given as follows: for example, in the coding in MPEG-4, an intermediate value of motion vectors in neighboring macroblocks is generated as a predicted value, for a motion vector in a macroblock as a target for coding, and a difference MVD between the predicted value and the actual motion vector is encoded.

Here, as shown in FIG. 23, let a macroblock as a coding target be macroblock A, a block adjacent above thereto be macroblock B, and block adjacent left thereto be macroblock C. In image signals, particularly, natural images and the like often tend to have a similar tendency of change in texture and motion in a certain area to those in neighboring areas. Therefore, where the change of motion is great in neighboring macroblocks to a macroblock as a coding target, the change of motion is also great in the coding target macroblock and it is difficult to analogize what is the absolute value of the motion vector difference. Conversely, where the change of motion is small in neighboring macroblocks, we can infer that it is highly possible that the neighboring areas contain monotonic motion or are at a standstill, and thus we can infer from analogy that the absolute value of the motion vector difference in the coding target macroblock also takes a small value.

Therefore, where the absolute values of motion vector differences are small in the neighboring macroblocks to the coding target macroblock, it is highly possible that the absolute value of the motion vector difference of the coding target converges in the vicinity of 0, and thus the coding can be performed efficiently by use of a variable-length coding table with short code lengths in the vicinity of 0. Conversely, where the absolute values of motion vector differences are large in the neighboring macroblocks to the coding target macroblock, the absolute value of the motion vector difference of the coding target does not always converge in the vicinity of 0. Therefore, in this case, the coding can be performed efficiently by use of a variable-length coding table with not too large difference is code lengths, regardless of whether the absolute value of the motion vector difference is large or small.

Keeping these in mind, the fifth embodiment of the present invention comprises preparing a plurality of variable-length coding tables with different characteristics of deviation of distribution of code lengths, for example, as shown in FIGS. 21A-21C, and implementing switching of the variable-length coding table for the motion vector difference in the coding target macroblock, in accordance with magnitudes of absolute values of motion vector differences in neighboring macroblocks to the coding target macroblock.

Specifically, let us define MVD(B) and MVD(C) as absolute values of motion vector differences in macroblock B adjacent above and macroblock C adjacent left as neighboring macroblocks to the coding target macroblock A, for example, as shown in FIG. 23. With respect to a preset threshold Th0, the variable-length coding is carried out as follows: if MVD(B) and MVD(C) both are smaller than Th0, the variable-length coding is carried out using the table of FIG. 21A as a variable-length coding table for the motion vector difference in macroblock A; if only either MVD(B) or MVD(A) is equal to Th0 or larger than Th0, the variable-length coding is carried out using the table of FIG. 21B; if MVD(B) and MVD(C) both are equal to Th0 or larger than Th0, the variable-length coding is carried out using the table of FIG. 21C. However, where macroblock B or macroblock C is outside the screen or outside a given slice, the processing is carried out on the assumption that the absolute value of the motion vector difference of that macroblock is a preset value Z (Z≧Th0). The reason for this is that when an adjacent macroblock is outside the screen or outside the slice, it is difficult to make a correct predicted value of the motion vector and possible values of the motion vector difference of the coding target do not always converge in the vicinity of 0. Where an adjacent macroblock is an intra macroblock, the processing is carried out similarly on the assumption that the absolute value of the motion vector difference of the macroblock is Z. The reason for this is also that it is difficult to make a correct predicted value of the motion vector of the coding target, just as in the above case, and possible values of the motion vector difference of the coding target do not always-converge in the vicinity of 0.

Namely, in the variable-length encoder 16 of FIG. 13 the motion vector difference MVD is first fed as an input symbol H1 into the variable-length code output part 30. Then coded symbol memory 31 feeds MVD(B) and MVD(C) as variable-length coding table reference information H3 into variable-length coding table provider 33. Then the variable-length coding table provider 33 compares MVD(B) and MVD(C) with the preset threshold Th0 as described above, determines a variable-length coding table to be used for the coding target motion vector, on the basis thereof, and provides the variable-length coding table H5 for the variable-length code output part 30. Then the coding target motion vector is variable-length coded to be outputted as coded data D9.

In the encoding method according to the fifth embodiment of the present invention, where the MVD value tends to converge around 0 as described above, the variable-length coding table is switched to one with short code lengths near 0 to make such a control as to decrease the code lengths in the case of the MVD value being in the vicinity of 0; where the MVD value does not always converge around 0, the variable-length coding table is switched to a table with small deviation of code lengths to prevent the code lengths from becoming long even if the MVD value is large; therefore, it is feasible to efficiently encode the MVD value.

The encoding method was described using the three variable-length coding tables in FIGS. 21A-21C, but it is a matter of course that the number and values of variable-length coding tables are not limited to those in FIGS. 21A-21C. The switching among the tables may also be implemented in such a way that a plurality of variable-length coding tables are retained in a memory in variable-length coding table provider 33 and the provision of variable-length coding table H3 is switched among them, or in such a way that the Universal codes such as the exp-Golomb codes as exemplified are used and a parameter thereof is switched to generate the variable-length coding table H3 in variable-length coding table provider 33.

FIG. 14 is an illustration showing the block diagram of variable-length decoder 21 according to the fifth embodiment of the present invention. When coded data D9 coded by the encoding method according to the fifth embodiment of the present invention is fed into decoded symbol output part 40 of variable-length decoder 21, decoded symbol memory 41 feeds MVD(B) and MVD(C) calculated from the previously decoded symbols, as variable-length decoding table reference information H8 into the variable-length decoding table provider 43. Then the variable-length decoding table provider 43 selects a variable-length decoding table H10 by procedure similar to the coding and feeds it to decoded symbol output part 40. Then decoded symbol output part 40 performs the variable-length decoding to decode and output the MVD value as a decoded symbol H6, and simultaneously stores it into decoded symbol memory 41.

Since the variable-length decoder is configured as described above, the coded data coded by the encoding method in the fifth embodiment of the present invention can be suitably decoded.

Sixth Embodiment

The encoding method in the fifth embodiment of the present invention was configured to switch the variable-length coding table according to the motion vectors in macroblocks around a macroblock as a coding target, whereas the encoding method in the sixth embodiment of the present invention is characterized in that the variable-length coding table is switched according to macroblock coding modes in macroblocks around a macroblock as a coding target.

As previously shown in FIGS. 3A to 3C, for example, MPEG-4 has the three classes of coding modes of macroblocks, the inter coding mode 0, the inter coding mode 1, and the intra coding mode. Incidentally, the inter coding mode 1 is a coding mode in which the motion compensation is made more effectively using four motion vectors where the motion in the screen is complex than in the inter coding mode 0. Therefore, we can infer that the motion in the screen in a macroblock for which the inter coding mode 1 is selected is more complex than that in a macroblock for which the inter coding mode 0 is selected. In the encoding method according to the second embodiment of the present invention, therefore, point P(MB) indicating complexity is defined according to each coding mode for an arbitrary macroblock MB, as shown in FIG. 25. Let points P(B) and P(C) calculated for macroblocks B and C shown in FIG. 8, which are adjacent to a macroblock as a coding target, according to the definition. Then a point for macroblock A as a coding target is defined by Eq (12) below.

$$P(A)=P(B)+P(C) \qquad \text{Eq (12)}$$

Now, the point P(A) calculated as described above represents the complexity of motion in the screen in the macroblocks adjacent to the macroblock as a coding, target and, the difficulty of prediction of the motion vector in the macroblock as a coding target from the adjacent macroblocks. The larger the point, the harder the prediction, or the more complex the motion.

Therefore, there are prepared a plurality of variable-length coding tables with different characteristics of deviation of distribution of code lengths as shown in FIGS. 21A-21C, and the variable-length coding table for the motion vector difference value in the coding target macroblock is switched according to the magnitude of the point P(A) calculated from the macroblock coding modes in the neighboring macroblocks to the coding target macroblock.

Specifically, for example, with respect to preset thresholds Th1 and Th2 (Th1<Th2), we can infer that if point P(A) is smaller than Th1, the motion is not complex and the motion vector predicted value tends to be correct, and thus the variable-length coding is carried out using the table of FIG. 21A configured so that codes for motion vectors with their absolute value closer to 0 have shorter code lengths. Similarly, if P(A) is not less than Th1 and is smaller than Th2, the variable-length coding is carried out using the table of FIG. 21B; if P(A) is not less than Th2, the variable-length coding is carried out using the table of FIG. 21C. However, where the macroblock B or macroblock C is outside the screen or outside a given slice, the point P(X) of that macroblock (where X is B or C) is assumed to be the same point as that for the intra coding mode (with AC coefficients). The reason for it is that when an adjacent macroblock is outside the screen or outside the slice, the predicted value of motion vector is unlikely to be correct and possible values of the motion vector difference of the coding target do not always converge around 0.

Namely, in the variable-length encoder 16 of FIG. 13 the motion vector difference MVD is first fed as an input symbol H1 into variable-length code output part 30. Then coded symbol memory 31 feeds the coding mode information of macroblock B and macroblock C as variable-length coding table reference information H3 into variable-length coding table provider 33. Thereafter, variable-length coding table provider 33 calculates the point P(A) as described above, compares it with the preset thresholds Th1 and Th2, determines a variable-length coding table to be used for the coding target motion vector, on the basis thereof, and provides the variable-length coding table H5 for the variable-length code output part 30. Then the coding target motion vector is variable-length coded to be outputted as coded data D9.

In the encoding method according to the sixth embodiment of the present invention, where the MVD value tends to converge around 0 by analogy from the macroblock coding modes in the macroblocks around the macroblock as a coding target as described above, the variable-length coding table is switched to one with short code lengths around 0 to make such a control as to decrease the code lengths in the case of the MVD value being around 0; where the MVD value does not always tend to converge around 0, the variable-length coding table is switched to a table with small deviation of code lengths to prevent the code lengths from becoming long even if the MVD value is large; therefore, it is feasible to implement efficient coding of the MVD value.

The encoding method was described using the three variable-length coding tables in FIGS. 21A-21C, but it is a matter of course that the number and values of variable-length coding tables are not limited to those in FIGS. 21A-21C. The switching among the tables may also be implemented in such a way that a plurality of variable-length coding tables are retained in a memory in variable-length coding table provider 33 and the provision of variable-length coding table H5 is switched among them, or in such a way that the Universal codes such as the exp-Golomb codes as exemplified are used and a parameter thereof is switched to generate the variable-length coding table H5 in variable-length coding table provider 33.

FIG. 14 is an illustration showing the block diagram of variable-length decoder 21 according to the sixth embodiment of the present invention. When coded data D9 coded by the encoding method in the sixth embodiment of the present invention is fed into decoded symbol output part 40 of variable-length decoder 21, decoded symbol memory 41 feeds the macroblock coding modes in the macroblocks B and C adjacent to the macroblock as a coding target, which are determined from the previously decoded symbols, as variable-length decoding table reference information H8 into variable-length decoding table provider 43. Then variable-length decoding table provider 43 selects a variable-length decoding table H10 by procedure similar to the coding and feeds it to decoded symbol output part 40. Thereafter, decoded symbol output part 40 performs the variable-length decoding to decode and output the MVD value as a decoded symbol H6, and simultaneously stores it into decoded symbol memory 41.

Since the variable-length decoder is configured as described above, it is feasible to suitably decode the coded data coded by the encoding method according to the sixth embodiment of the present invention.

The sixth embodiment of the present invention described the preferred encoding method and decoding method of the motion vector difference using the macroblock coding modes by the use of the example of application to MPEG-4, but it is noted that the encoding method is not limited to this example, of course. An example described below is an encoding method in which the invention is applied to the H.26L encoding system.

In the H.26L encoding system, the macroblock coding modes prepared are ten coding modes including one skip (Skip) mode 0, seven inter modes 1-7, and two intra modes 8, 9 as shown in FIGS. 24A-24J.

Among these, the skip mode 0 is a mode that is used where no motion of image is detected, and mode of copying an image at the same location in a reference frame used for the motion compensation.

The inter modes 1-7 are modes where the interframe coding (coding between frames) is carried out using their respective block segmentations different from each other. The motion compensation blocks in the respective modes are defined as shown in FIGS. 24A-24J: mode 1 is a mode using one block in the size of 16 pixels×16 lines. Mode 2 is a mode using two blocks in the size of 16 pixels×8 lines. Mode 3 is a mode using two blocks in the size of 8 pixels×16 lines. Mode 4 is a mode using four blocks in the size of 8 pixels×8 lines. Mode 5 is a mode using eight blocks in the size of 8 pixels×4 lines. Mode 6 is a mode using eight blocks in the size of 4 pixels×8 lines. Mode 7 is a mode using sixteen blocks in the size of 4 pixels×4 lines. FIG. 28A shows a map table indicating a correspondence between these modes and index values, and FIG. 28B a variable-length coding table indicating codes corresponding to the respective index values.

Intra modes 8, 9 are modes where the intraframe coding (coding within-frame) is carried out using their respective block segmentations different from each other. The blocks in the respective modes are defined as shown in FIGS. 24A-24J: mode 8 is a mode using sixteen blocks in the size of 4 pixels×4 pixels. Mode 9 is a mode using one block in the size of 16×16.

Now, for these ten coding modes, let us define points P in much the same manner as in the example of application to MPEG-4. For example, the points are defined as shown in FIG. 27. Namely, since we can infer that the motion becomes more complex with increase in the number of block segments in the inter coding modes, the points are defined so as to become larger with increase in the number of block segments. Since the skip mode is considered to contain no motion, we can infer that the motion in the neighborhood is often null or small as well, and thus the point is defined so as to take a small value. It is also expected in the intra coding modes that the motion becomes more complex with increase in the number of block segments, so as to make it harder to make a right prediction of motion vector in the coding target macroblock and that where the number of block segments is small, the motion can be not so complex but the prediction of motion vector tends to be off. Therefore, in mode 8 the point is defined to take a large value and in mode 9 the point is defined to take a smaller value than in mode 8. It is noted that these values are presented just as an example for easier understanding of the description and the present invention is by no means intended to be limited to these specific values in the table.

Now, using the table of points for the coding modes in FIG. 27, the points P(B) and P(C) of macroblocks B and C adjacent to the macroblock as a coding target are calculated in much the same manner as in the example of application to MPEG-4. Then the point P(A) for the coding target macroblock is determined from P(B) and P(C).

Thereafter, P(A) is compared with the thresholds in similar manner, and the variable-length coding table is switched according to the result of the comparison, thus enabling the application of the present invention to the H.26L encoding system.

Seventh Embodiment

Described next is the encoding method according to the seventh embodiment of the present invention. Now, the macroblock coding modes, for example, in MPEG-4, as previously shown in FIGS. 3A-3C, are classified under the three coding modes of macroblocks, the inter coding mode 0, the inter coding mode 1, and the intra coding mode. Incidentally, the inter coding mode 1 is a coding mode of performing the motion compensation using four motion vectors more effectively where the motion in the screen is complex or where the texture is complex, than in the inter coding mode 0. Therefore, we can infer that the motion and texture in the screen in a macroblock for which the inter coding mode 1 is selected are more complex than in a macroblock for which the inter coding mode 0 is selected. It is also considered as to the intra coding mode that the texture becomes more complex with increase in the number of nonzero coefficients in a macroblock and, conversely, the texture becomes more monotonic with decrease in the number of nonzero coefficients.

Here, as shown in FIG. 23, let a macroblock as a coding target be a macroblock A, a block adjacent above thereto be a macroblock B, and a block adjacent left thereto be a macroblock C. In image signals, particularly, in the case of natural images and the like, it is often the case that a tendency of change in texture and motion in a certain area is similar to those in neighboring areas. Therefore, where the motion and texture are complex in neighboring macroblocks to a macroblock as a coding target, we can infer that the motion and texture also become complex in the coding target macroblock. Conversely, where the motion and texture are monotonic in the neighboring macroblocks, we can infer that the motion and texture are also monotonic in the coding target macroblock.

It follows that we can analogize a coding mode likely to appear in the coding target macroblock, from the information of the macroblock coding modes or the like in the neighboring macroblocks to the coding target macroblock.

In the encoding method according to the seventh embodiment of the present invention, therefore, for an arbitrary macroblock MB, point P(MB) indicating complexity is defined according to each coding mode as shown in FIG. 25. For the intra coding mode, however, different points are defined depending upon whether there are AC components among the orthogonal transform coefficients of luma component.

Points P(B) and P(C) are defined as points calculated for macroblocks B and C shown in FIG. 23, adjacent to the coding target macroblock through application of the definition. Then a point for the coding target macroblock A is defined by Eq (13) below.

$$P(A)=(P(B)+P(C))/2 \qquad \text{Eq (13)}$$

Now, the point P(A) calculated as described above indicates the complexity of motion and texture in the macroblocks adjacent to the coding target macroblock. The larger the point, the more complex the motion and texture.

Therefore, a map table is prepared as shown in FIG. 26A and a variable-length coding table as shown in FIG. 26B. The map table is switched according to the magnitude of point P(A) calculated from the macroblock coding modes in the neighboring macroblocks to the coding target macroblock so as to change assignment of codewords in the variable-length coding of the macroblock coding mode in the coding target macroblock. However, since two points are calculated for an intra macroblock, the smaller is adopted.

Specifically, the map table is switched as follows: for example, a difference DP is calculated between the calculated point P(A) and a point defined for each coding mode and index values in the map table are arranged in increasing order from the smallest corresponding to increasing order of DP values of the coding modes.

Namely, in the variable-length encoder 16 of FIG. 13 a macroblock coding mode is first fed as an input symbol H1 into variable-length code output part 30. Then coded symbol memory 31 feeds the coding mode information and CBPs of macroblocks B and C as coding map table reference information H2 to coding map table provider 32. Then coding map table provider 32 calculates the point P(A) as described above, determines a coding map table on the basis thereof, and provides the coding map table H4 for variable-length code output part 30. The variable-length coding table provider 33 also provides a variable-length coding table H5 for variable-length code output part 30. Then the macroblock coding mode is variable-length coded to be outputted as coded data D9.

Since the encoding method in the seventh embodiment of the present invention is configured to switch the map table so as to encode a macroblock coding mode analogized to be likely to appear, by a shorter code length as described above, it can efficiently encode the macroblock coding mode.

FIG. 14 is an illustration showing the block diagram of variable-length decoder 21 according to the seventh embodiment of the present invention. When coded data D9 coded by the encoding method in the seventh embodiment of the present invention is fed into decoded symbol output part 40 of variable-length decoder 21, decoded symbol memory 41 feeds the macroblock coding modes and CBPs in the macroblocks B and C being previously decoded symbols, as decoding map table reference information H7 into decoding map table provider 42. Then decoding map table provider 42 selects a decoding map table H9 by procedure similar to the coding and feeds it into decoded symbol output part 40. Variable-length decoding table provider 43 also feeds a variable-length decoding table H10 into decoded symbol output part 40. Then the decoded symbol output part 40 performs the variable-length decoding to decode and output the coding mode as a decoded symbol H6, and simultaneously stores it into decoded symbol memory 41.

Since the variable-length decoder is configured as described above, it is feasible to suitably decode the coded data coded by the encoding method in the seventh embodiment of the present invention.

The seventh embodiment of the present invention described the preferred encoding method and decoding method of the macroblock coding mode utilizing the coding information in the neighboring macroblocks around the coding target macroblock by the use of the example of application to MPEG-4, but it is a matter of course that the encoding method is not limited to this example. An example described below is an encoding method as an example of application to the H.26L encoding system.

In the H.26L encoding system, the macroblock coding modes prepared are ten coding modes including one skip (Skip) mode 0, seven inter modes 1-7, and two intra modes 8, 9 as shown in FIGS. 24A-24J.

Among these, the skip mode 0 is a mode that is used where no motion of image is detected, and mode of copying an image at the same location in a reference frame used for the motion compensation.

The inter modes 1-7 are modes where the interframe coding (coding between frames) is carried out using their respective block segmentations different from each other. The motion compensation blocks in the respective modes are defined as shown in FIGS. 24A-24J: mode 1 is a mode using one block in the size of 16 pixels×16 lines. Mode 2 is a mode using two blocks in the size of 16 pixels×8 lines. Mode 3 is a mode using two blocks in the size of 8 pixels×16 lines. Mode 4 is a mode using four blocks in the size of 8 pixels×8 lines. Mode 5 is a mode using eight blocks in the size of 8 pixels×4 lines. Mode 6 is a mode using eight blocks in the size of 4 pixels×8 lines. Mode 7 is a mode using sixteen blocks in the size of 4 pixels×4 lines.

Intra modes 8, 9 are modes where the intraframe coding (coding within frame) is carried out using their respective block segmentations different from each other. The blocks in the respective modes are defined as shown in FIGS. 24A-24J: mode 8 is a mode using sixteen blocks in the size of 4 pixels×4 pixels. Mode 9 is a mode using one block in the size of 16×16.

Now, for these ten coding modes, let us define points P in much the same manner as in the example of application to MPEG-4. For example, the points are defined as shown in FIG. 27. Namely, since we can infer that the motion and texture become more complex with increase in the number of block segments in the inter coding modes, the points are defined so as to become larger with increase in the number of block segments. Since the skip mode is considered to contain no motion, we can infer that the motion in the neighborhood is often null or small as well, and thus the point is defined so as to take a small value. It is also expected in the intra coding modes that the motion and texture become more complex with increase in the number of block segments, so as to make it harder to make a right prediction of motion vector in the coding target macroblock and that where the number of block segments is small, the motion and texture can be not so complex but the prediction of motion vector tends to be off. Therefore, in mode 8 the point is defined to take a large value and in mode 9 the point is defined to take a smaller value than in mode 8. It is noted that these values are presented just as an example for easier understanding of the description and the present invention is by no means intended to be limited to these specific values in the table.

Now, using the table of points for the coding modes in FIG. 27, the points P(B) and P(C) of macroblocks B and C adjacent to the macroblock as a coding target are calculated in much the same manner as in the example of application to MPEG-4. Then the point P(A) for the coding target macroblock is determined from P(B) and P(C) in accordance with Eq (13).

Thereafter, while reference is made to the value of P(A) in similar fashion, the map table is switched to one where the index values become smaller as a point in each coding mode becomes closer to the value of point P(A), thereby enabling the application of the present invention to the H.26L encoding system.

Eighth Embodiment

The seventh embodiment of the present invention involved the switching of only the map table without switching of the variable-length coding table, whereas the encoding method in the eighth embodiment of the present invention is characterized in that the variable-length coding table is switched according to the coding modes in the neighboring macroblocks to the coding target macroblock, so as to implement more efficient coding.

Now, where coding modes indicating complexity of the same level are selected in the macroblocks B and C adjacent to the macroblock A as a coding target previously shown in FIG. 23, we can infer that it is highly possible that a coding mode indicating complexity of the same level as that in the macroblocks B and C is also selected in the macroblock A. However, where coding modes indicating utterly different complexities are selected in the macroblocks B and C, we cannot analogize which coding mode is selected in the macroblock A. Therefore, where degrees of complexity are similar in the coding modes selected in the macroblocks B and C, the variable-length coding of the coding mode is carried out using a variable-length coding table with large deviation of code lengths so as to implement coding with shorter code lengths for coding modes of smaller index values; conversely, where degrees of complexity are not similar in the coding modes selected in the macroblocks B and C, the variable-length coding of the coding mode is carried out using a variable-length coding table with small deviation of code lengths so as not to give a large difference between code lengths for the coding modes of small index values and code lengths for coding modes of large index values; whereby it is feasible to implement the efficient variable-length coding of the coding mode.

For example, there are prepared a plurality of variable-length coding tables with different characteristics of deviation of distribution of code lengths as shown in FIGS. 21A-21C, and the variable-length coding table in the coding target macroblock is switched according to the magnitude of the difference between points P(B) and P(C) in the neighboring macroblocks to the coding target macroblock.

Specifically, for example, in the application to the H.26L encoding system, the switching of the map table is carried out according to the seventh embodiment of the present invention and the absolute value PD is calculated of the difference between points P(B) and P(C) determined for the macroblocks B and C from the table in FIG. 27. Then, for example, with respect to preset thresholds Th1 and Th2 (Th1<Th2), the variable-length coding table of FIG. 21A with large deviation of code lengths is used where PD is smaller than Th1; the variable-length coding table of FIG. 21B is used where PD is not less than Th1 and is smaller than Th2; the variable-length coding table of FIG. 21C with small deviation of code lengths is used where PD is not less than Th2; whereby it is feasible to implement efficient coding of the macroblock coding mode.

Namely, in the variable-length encoder 16 of FIG. 13 a macroblock coding mode is first fed as an input symbol H1 into variable-length code output part 30. Then coded symbol memory 31 feeds the coding mode information of macroblock B and macroblock C as coding map table reference information H2 into coding map table provider 32. Similarly, coded symbol memory 31 also feeds the coding mode information of macroblock B and macroblock C as variable-length coding table reference information H3 into variable-length coding table provider 33. Then coding map table provider 32 calculates the point P(A) as described above, determines a coding map table on the basis thereof, and provides the coding map table H4 for variable-length code output part 30. Variable-length coding table provider 33 compares the absolute value PD of the difference between point P(B) and point P(C) with the preset thresholds Th1 and Th2 as described above to select a variable-length coding table H5, and then provides it for the variable-length code output part 30. Then the macroblock coding mode is variable-length coded to be outputted as coded data D9.

In the variable-length decoder according to the eighth embodiment of the present invention as shown in FIG. 14, when coded data D9 coded by the encoding method in the eighth embodiment of the present invention is fed into decoded symbol output part 40 of variable-length decoder 21, decoded symbol memory 41 feeds the macroblock coding mode information in the macroblocks B and C being previously decoded symbols, as decoding map table reference information H7 to decoding map table provider 42. Similarly, decoded symbol memory 41 also feeds the macroblock coding mode information in the macroblocks B and C being the previously decoded symbols, as variable-length decoding table reference information H8 into variable-length decoding table provider 43. Then decoding map table provider 42 selects a decoding map table H9 by procedure similar to the coding and feeds it to decoded symbol output part 40. The variable-length decoding table provider 43 also selects a variable-length decoding table H10 by procedure similar to the coding and feeds it to decoded symbol output part 40. Thereafter, decoded symbol output part 40 performs the variable-length decoding to decode and output the coding mode as a decoded symbol H6, and simultaneously stores it into decoded symbol memory 41.

Since the variable-length decoder is configured as described above, it is feasible to properly decode the coded data coded by the encoding method in the eighth embodiment of the present invention.

Ninth Embodiment

The encoding methods in the first to eighth embodiments of the present invention were characterized by adaptively switching the coding map table or variable-length coding table according to the context in the neighborhood, whereas the encoding method according to the ninth embodiment of the present invention is characterized by further involving learning of coding information corresponding to each index value in each coding map table from the past coding result.

Figure 30:
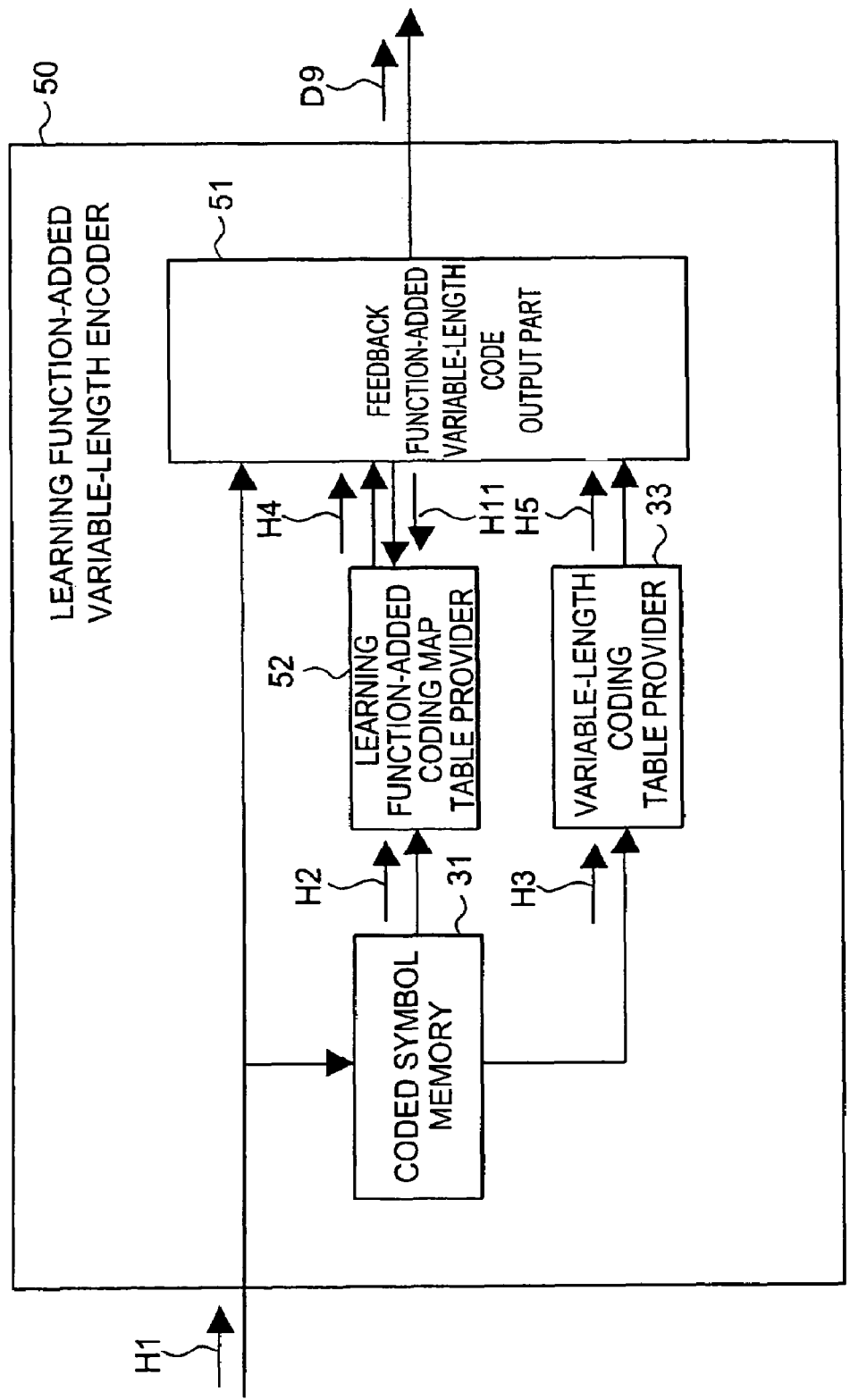
FIG. 30 is a block diagram schematically showing an example of the variable-length encoder according to the present invention.

FIG. 30 is a block diagram showing a configuration of learning function-added variable-length encoder 50 according to the ninth embodiment of the present invention. In FIG. 30, the same elements as in the variable-length encoder 16 in FIG. 13 are denoted by the same reference symbols, without redundant description thereof. In the learning function-added variable-length encoder 50 in the ninth embodiment of the present invention, feedback function-added variable-length code output part 51 is characterized by further having a function of outputting adopted index value H11 being an index value against an input symbol in a coding map table, in addition to the function of the variable-length code output part 30 in FIG. 13. Furthermore, learning function-added coding map table provider 52 is characterized by further having a function of receiving the adopted index value H11 and updating the map table in the context against the input symbol H1, in addition to the function of the coding map table provider 32 in FIG. 13.

When the input symbol H1 is fed into learning function-added variable-length encoder 50 according to the ninth embodiment of the present invention, learning function-added coding map table provider 52 determines a used map table on the basis of the coding map table reference information H2 and past learning result and provides the map table H4 to be used, for feedback function-added variable-length code output part 51. Variable-length coding table provider 33, if necessary, determines a variable-length coding table to be used, on the basis of variable-length coding table reference information H3, and provides the variable-length coding table H5 to be used, for feedback function-added variable-length code output part 51. The feedback function-added variable-length code output part 51 performs the variable-length coding of the input symbol H1 using the map table and variable-length coding table obtained in this way, outputs coded data D9, and provides the adopted index value H11 being an index value in the map table corresponding to the input symbol H1, for the learning function-added coding map table provider 52. The learning function-added coding map table provider 52 updates the used map table on the basis of the input adopted index value H11 and, where the same context is selected next time, the coding is performed using the map table updated in this way.

The update of the map table will be described below in detail with a specific example. Here is presented an example using the coding modes of macroblocks in H.26L for the coding target symbol, which will be described as an application to the seventh embodiment of the present invention.

In H.26L there are ten macroblock coding modes as shown in FIGS. 24A-24J, and the example in the seventh embodiment of the present invention was such that the points were defined as shown in FIG. 27, the point P(A) was determined by Eq (13) from the points P(B) and P(C) for the coding modes of macroblocks B and C adjacent to the coding target macroblock A shown in FIG. 23, and the map table was switched using the point P(A) as context.

It is obvious from Eq (13) that possible values of P(A) are eight integers from 0 to 7. It is also obvious that there are eight types of map tables MT(CX) generated according to the values CX of P(A). FIG. 31 shows the map tables MT(CX) where CX takes the values from 0 to 7. In the tables shown in FIG. 31, let MT(CX,M) represent an index value corresponding to a coding mode M in a map table MT (CX). As seen from FIG. 31, for example, a map table MT(3, M) for P(A)=3 is configured to take the index values of 7, 2, 0, 1, 3, 4, 5, 8, 9, and 6 in order from M=0 to M=9.

Supposing the context is P(A)=3 and the coding mode as a coding target is mode 8, a code corresponding to the index value 9 at MT(3,8) in the map table MT(3) is outputted, for example, based on the variable-length coding table shown in FIG. 9B. However, if mode 8 is selected with a high frequency as a coding mode with occurrence of the context P(A)=3, a short code should be assigned to mode 8 by setting the corresponding index value to a smaller value.

Therefore, for example, a frequency C(3,8) of selections of mode 8 in MT(3) is counted and, if the frequency becomes larger than a preset threshold Th9, the index value MT(3,8) corresponding to mode 8 is interchanged with MT(3,7) having a next smaller index value than MT(3,8). The selection frequency C(3,8) corresponding to mode 8 is then reset to 0. When the control is made in this way so as to decrease the index value for a mode with high selection frequency and update the map tables independently of each other, it is feasible to optimize each of the map tables according to each context.

The update method of map tables described herein is just an example, and, by optimizing the map tables according to each context as described above, it is feasible to implement efficient variable-length coding more suitable for the coding condition and the property of image.

Figure 32:
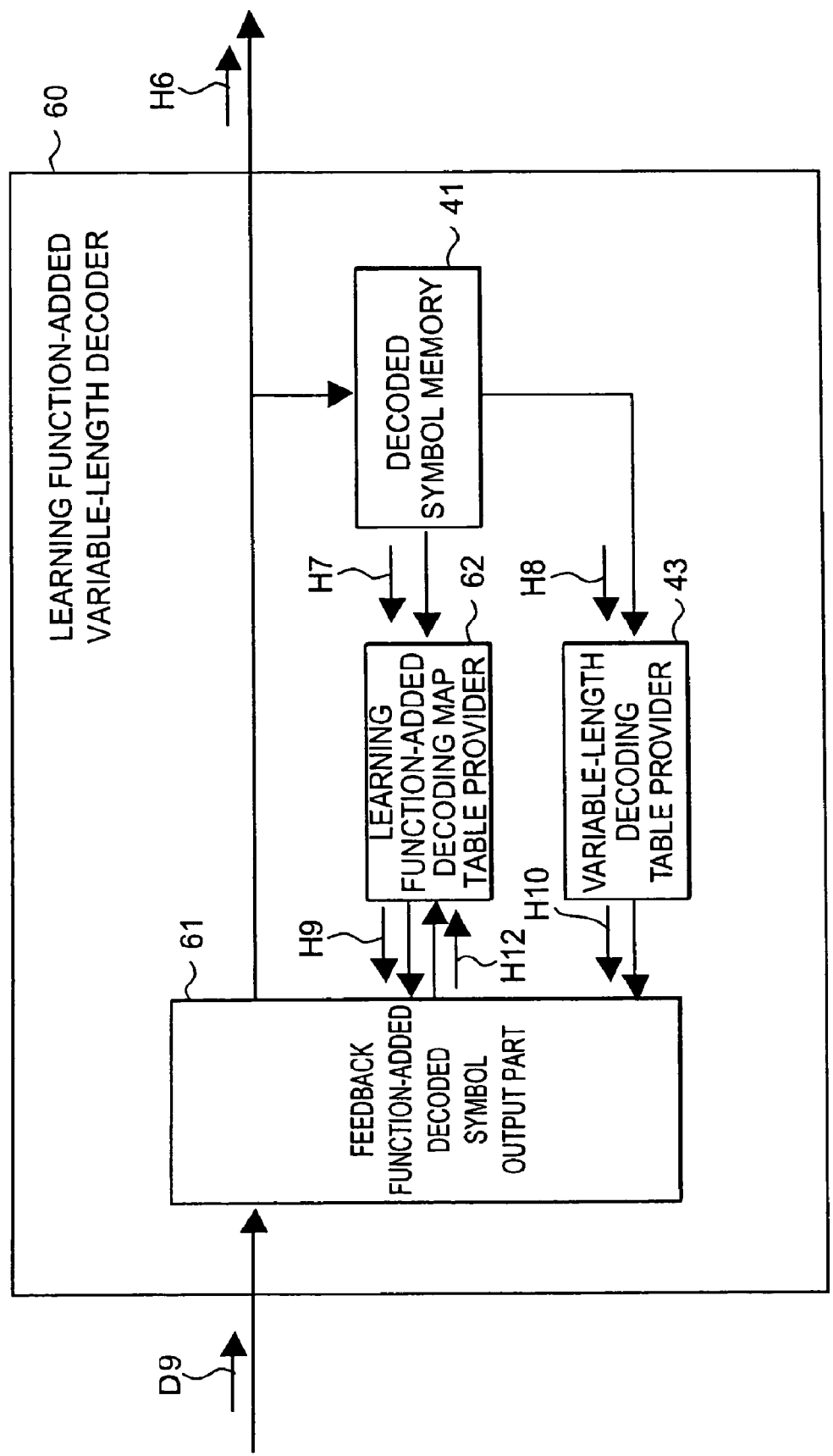
FIG. 32 is a block diagram schematically showing an example of the variable-length decoder according to the present invention.

FIG. 32 is a block diagram showing a configuration of learning function-added variable-length decoder 60 according to the ninth embodiment of the present invention. In FIG. 32, the same elements as in the variable-length decoder 21 in FIG. 14 are denoted by the same reference symbols, without redundant description thereof. In the learning function-added variable-length decoder 60 according to the ninth embodiment of the present invention, feedback function-added decoded symbol output part 61 is characterized by further having a function of outputting a used index value H12 being an index value against an output symbol in a decoding map table, in addition to the function of decoded symbol output part 40 in FIG. 14. Learning function-added decoding map table provider 62 is characterized by further having a function of receiving the used index value H12 and updating the map table in the context for the output symbol H6, in addition to the function of decoding map table provider 42 in FIG. 14.

The process of learning in the learning function-added variable-length decoder 60 in the ninth embodiment of the present invention configured as described above is arranged to be the same as the process of learning in the ninth embodiment of the present invention, whereby it is feasible to suitably decode the coded data coded by the encoding method in the ninth embodiment of the present invention.

The ninth embodiment of the present invention described the process of learning using the example of the macroblock coding modes in the H.26L encoding system, but it is a matter of course that it can also be applied to any other coding symbols without having to be limited to the example and the preferred encoding method and decoding method can be provided as a result is thereof.

The ninth embodiment of the present invention was described using the map table switching method in the seventh embodiment of the present invention, but it is a matter of course that the present invention is not limited to it and can also be applied to any encoding method and decoding method with means for selecting codewords to be assigned to symbols on the basis of the context, thus providing the preferred encoding method and decoding method as a result.

Tenth Embodiment

Described next is the encoding method according to the tenth embodiment of the present invention. The encoding method in the fifth embodiment of the present invention was configured to switch the variable-length coding table with reference to the motion vector difference values in the neighboring macroblocks on the occasion of coding the motion vector difference MVD of the coding target macroblock as motion vector information D2, whereas the encoding method in the tenth embodiment of the present invention is characterized by switching the variable-length coding table with reference to the motion vectors in the neighboring macroblocks.

Namely, as described previously, the motion vector information D2 is obtained, for example in the coding in MPEG-4, in the following manner: an intermediate value of motion vectors in the neighboring macroblocks is generated as a predicted value, for a motion vector of a coding target macroblock, and a difference MVD between the predicted value and the actual motion vector is coded as motion vector information D2. Where the motion vectors in the neighboring macroblocks take values close to each other, the predicted value of motion vector can be considered to be a reliable value and thus the motion vector difference MVD tends to converge near 0 with a high possibility. In this case, therefore, efficient coding can be implemented by use of a variable-length coding table with shorter code lengths near 0. Conversely, where the motion vectors in the neighboring macroblocks take values largely different from each other, the motion vector predicted value is considered to be an unreliable value, and thus the motion vector difference MVD does not always converge near 0. In this case, therefore, efficient coding can be implemented by use of such a variable-length coding table as not to make a large difference in code lengths, regardless of whether the absolute value of the motion vector difference is large or small.

Keeping these in mind, the tenth embodiment of the present invention involves preparing a plurality of variable-length coding tables with different characteristics of deviation of distribution of code lengths, for example, as shown in FIGS. 21A-21C, and switching among the variable-length coding tables for the motion vector difference value in the coding target macroblock, in accordance with the magnitude of the sum of absolute differences between motion vectors in the neighboring macroblocks to the coding target macroblock.

Figure 33:
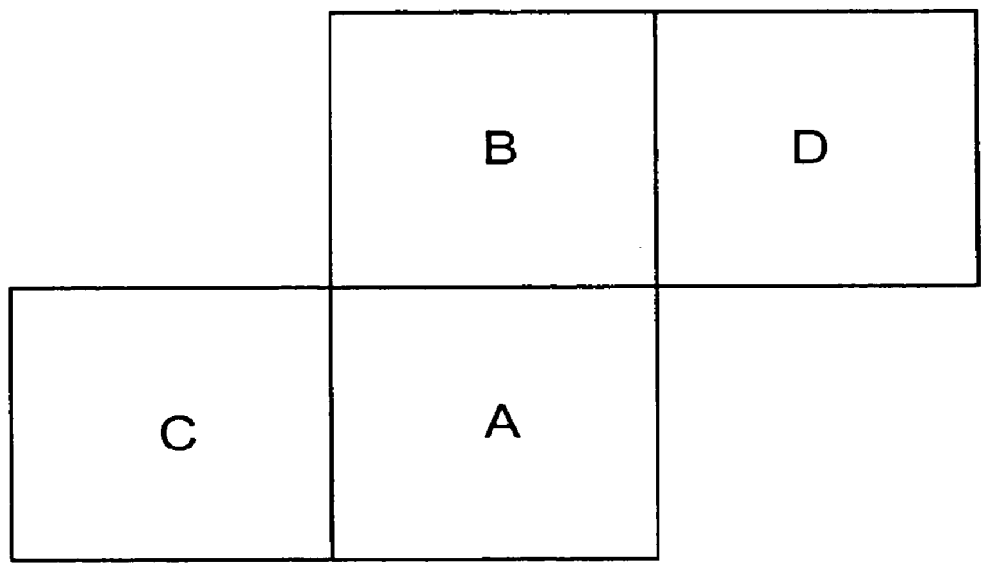
FIG. 33 is a diagram showing a positional relation among a coding target macroblock and adjacent macroblocks.

Specifically, let MV(B), MV(C), and MV(D) be a motion vector in a macroblock B adjacent above, a motion vector in a macroblock C adjacent left, and a motion vector in a macroblock D adjacent right upper as neighboring macroblocks to the coding target macroblock A as shown in FIG. 33. With respect to preset thresholds Th10, Th11 (where Th10<Th11), if a value of S=|MV(B)−MVD(C)|+|MV(C)−MV(D)| as a sum of absolute differences between the motion vectors is smaller than Th10, the variable-length coding is performed using the table of FIG. 21A as a variable-length coding table for the motion vector difference in the macroblock A; if S is not less than Th10 and is smaller than Th11, the variable-length coding is performed using the table of FIG. 21B; if S is not less than Th11, the variable-length coding is performed using the table of FIG. 21C. However, where the macroblock B, macroblock C, or macroblock D is outside the screen or outside a given slice, or is an intra-coded macroblock, the absolute difference from the motion vector of that macroblock is treated as a preset value Z10 (Z10≧Th10). The reason for it is that when the macroblock for generation of the motion vector predicted value is outside the screen or outside the slice, or an intra coded macroblock, it is difficult to make a right predicted value of motion vector and possible values of the motion vector difference of the coding target do not always converge near 0.

Namely, in the variable-length encoder 16 of FIG. 13 a motion vector difference MVD is first fed as an input symbol H1 into variable-length code output part 30. Then coded symbol memory 31 feeds MV(B), MV(C), and MV(D) as variable-length coding table reference information H3 into variable-length coding table provider 33. Then variable-length coding table provider 33 compares the sum S of absolute differences of MV(B), MV(C), and MV(D) with the preset thresholds Th10 and Th11 as described above, determines a variable-length coding table to be used for the coding target motion vector, on the basis thereof, and provides the variable-length coding table H5 for the variable-length code output part 30. Then the coding target motion vector is variable-length coded to be outputted as coded data D9.

The encoding method in the tenth embodiment of the present invention is configured, as described above, so that where the MVD value tends to converge near 0, the variable-length coding table is switched to one with short code lengths near 0 to make such a control as to decrease the code lengths in the case of the MVD value being near 0 and so that where the estimation of the MVD value does not always converge near 0, the variable-length coding table is switched to a table with small deviation of code lengths to prevent the code lengths from becoming long even if the MVD value is large; therefore, it is feasible to implement efficient coding of the MVD value.

The encoding method was described using the three variable-length coding tables in FIGS. 21A-21C, but it is a matter of course that the number and values of variable-length coding tables are not limited to those in FIGS. 21A-21C. The switching among the tables may also be implemented in such a way that a plurality of variable-length coding tables are retained in a memory in variable-length coding table provider 33 and the provision of variable-length coding table H3 is switched among them, or in such a way that the Universal codes such as the exp-Golomb codes as exemplified are used and a parameter thereof is switched to generate the variable-length coding table H3 in variable-length coding table provider 33.

FIG. 14 is an illustration showing the block diagram of variable-length decoder 21 according to the tenth embodiment of the present invention. When coded data D9 coded by the encoding method in the tenth embodiment of the present invention is fed into decoded symbol output part 40 of variable-length decoder 21, decoded symbol memory 41 feeds MV(B), MV(C), and MV(D) calculated from the previously decoded symbols, as variable-length decoding table reference information H8 into variable-length decoding table provider 42. Then the variable-length decoding table provider 43 selects a variable-length decoding table H10 by procedure similar to the coding and feeds it into decoded symbol output part 40. Then the decoded symbol output part 40 performs the variable-length decoding to decode and output a motion vector as a decoded symbol H6, and simultaneously stores it into decoded symbol memory 41.

Since the variable-length decoder is configured as described above, it is feasible to suitably decode the coded data coded by the encoding method in the tenth embodiment of the present invention.

Eleventh Embodiment

Described next is the encoding method according to the eleventh embodiment of the present invention. The encoding method in the fourth embodiment of the present invention was configured not to implement the switching of the variable-length coding table on the occasion of coding the nonzero coefficient count CC in the block, whereas the encoding method in the eleventh embodiment of the present invention is characterized by switching the variable-length coding table with reference to the nonzero coefficient counts in the neighboring blocks on the occasion of coding the nonzero coefficient count CC.

Namely, since a characteristic of an image at a certain point in the screen tends to resemble a characteristic of an image in its neighboring areas as described previously, there is a high possibility that the nonzero coefficient count in a certain block is close to those in neighboring blocks. Therefore, where the nonzero coefficient counts in the neighboring blocks to a coding target block are values close to zero, the nonzero coefficient count CC in the coding target block can also take a value close to 0 with a high possibility. In this case, therefore, efficient coding can be performed by use of a variable-length coding table with short code lengths near 0. Conversely, where the nonzero coefficient counts in the neighboring blocks take values not close to 0, the nonzero coefficient count CC in the coding target block does not always converge near 0. In this case, therefore, efficient coding can be performed by use of such a variable-length coding table as not to make a large difference in code lengths, regardless of whether the value of the nonzero coefficient count CC is large or small.

Keeping these in mind, the eleventh embodiment of the present invention involves preparing a plurality of variable-length coding tables with different characteristics of deviation of distribution of code lengths, for example, as shown in FIGS. 21A-21C, and switching the variable-length coding table for the nonzero coefficient count CC in the coding target block, in accordance with an average of values of the respective nonzero coefficient counts in the neighboring blocks to the coding target block.

Specifically, let CC(B) and CC(C) be the nonzero coefficient counts in block B adjacent above and block C adjacent left as neighboring blocks to the coding target block A, for example, as shown in FIG. 23. With respect to preset thresholds Th12, Th13 (where Th12<Th13), the value of MC=(CC (B)+CC(C))/2 being an average of nonzero coefficient counts in the respective blocks, is compared with the thresholds, and the variable-length coding is carried out using as a variable-length coding table for the nonzero coefficient count CC(A) in the block A, the table of FIG. 21A if MC is smaller than Th12, the table of FIG. 21B if MC is not less than Th12 and is smaller than Th13, or the table of FIG. 21C if MC is not less than Th13. However, where the block B or block C is outside the screen or outside a given slice, the nonzero coefficient count of that block is treated as a predetermined value Z11 (Z11≧Th12). The reason for it is that when an adjacent block is outside the screen or outside the slice, or is an intra-coded block, it is difficult to predict possible values of the nonzero coefficient count of the coding target, and they do not always converge near 0.

Namely, in the variable-length encoder 16 of FIG. 13 a nonzero coefficient count CC is first fed as an input symbol H1 into variable-length code output part 30. Then coded symbol memory 31 feeds CC(B) and CC(C) as variable-length coding table reference information H3 into variable-length coding table provider 33. Then variable-length coding table provider 33 compares the average MC Of CC(B) and CC(C) with the preset thresholds Th12 and Th13 as described above, determines a variable-length coding table to be used for the coding target nonzero coefficient count, on the basis thereof, and provides the variable-length coding table H5 for variable-length code output part 30. Then the coding target motion vector is variable-length coded to be outputted as coded data D9.

The encoding method in the eleventh embodiment of the present invention is configured, as described above, so that where the nonzero coefficient count CC tends to converge near 0, the variable-length coding table is switched to one with short code lengths near 0 to make such a control as to decrease the code lengths in the case of the nonzero coefficient count CC near 0 and so that where the prediction of the nonzero coefficient count CC does not always converge near 0, the variable-length coding table is switched to a table with small deviation of code lengths to prevent the code lengths from becoming long even if the nonzero coefficient count CC is large; therefore, it can efficiently encode the nonzero coefficient count CC.

The encoding method was described using the three variable-length coding tables in FIGS. 21A-21C, but it is a matter of course that the number and values of variable-length coding tables are not limited to those in FIGS. 21A-21C. The switching among the tables may also be implemented in such a way that a plurality of variable-length coding tables are retained in a memory in variable-length coding table provider 33 and the provision of variable-length coding table H3 is switched among the tables, or in such a way that the Universal codes such as the exp-Golomb codes as exemplified are used and a parameter thereof is switched to generate the variable-length coding table H3 in variable-length coding table provider 33.

FIG. 14 is an illustration showing the block diagram of variable-length decoder 21 according to the eleventh embodiment of the present invention. When coded data D9 coded by the encoding method in the eleventh embodiment of the present invention is fed into decoded symbol output part 40 of variable-length decoder 21, decoded symbol memory 41 feeds CC(B) and CC(C) calculated from the previously decoded symbols, as variable-length decoding table reference information H8 into variable-length decoding table provider 42. Then variable-length decoding table provider 43 selects a variable-length decoding table H10 by procedure similar to the coding and feeds it into decoded symbol output part 40. Then decoded symbol output part 40 performs the variable-length decoding to decode and output a nonzero coefficient count CC as a decoded symbol H6, and simultaneously stores it into decoded symbol memory 41.

Twelfth Embodiment

First described with reference to FIGS. 22A-22D is the procedure of variable-length coding of orthogonal transform coefficients being image data in the encoding method according to the twelfth embodiment of the present invention. The description herein is based on the assumption that the orthogonal transform to transform spatial image data into frequency image data is Discrete Cosine Transform (DCT). FIG. 22A shows a specific numerical example of quantized orthogonal transform coefficients $q_{11}$-$q_{88}$ obtained by quantizing the orthogonal transform coefficients $f_{11}$-$f_{88}$ of 8 pixels×8 lines shown in FIG. 4B. The variable-length encoder of image encoding apparatus performs the variable-length coding over such quantized orthogonal transform coefficients according to a predetermined processing procedure to generate coded data.

In the case of the quantized orthogonal transform coefficients $q_{11}$-$q_{88}$ where the subscripts i, j of each coefficient $q_{ij}$ represent a vertical frequency and a horizontal frequency corresponding thereto, unlike the image components $a_{11}$-$a_{88}$ in the spatial image data (cf. FIG. 4A), each quantized orthogonal transform coefficient, concerning the magnitude of the coefficient value thereof or the like, has a data characteristic dependent upon the values of the corresponding space frequencies. In general, in the case of natural images, large absolute values of coefficient values of orthogonal transform are obtained in the low frequency region and absolute values of coefficient values decrease toward the high frequency region. This distribution can be approximated by a Laplace distribution with a peak at zero. As densities of pixels in each block vary greater, the spread of the distribution of transform coefficients is also greater and an average amplitude value of coefficients increases.

In the processing procedure of the variable-length coding of the quantized orthogonal transform coefficients, first, the quantized orthogonal transform coefficients $q_{11}$-$q_{88}$ being two-dimensional data are transformed into one-dimensional data, for example, by the zigzag scan shown in FIG. 22B. In this zigzag scan, the quantized orthogonal transform coefficients are scanned to yield a data string from the low frequency region to the high frequency region as the one-dimensional data after the scan. This yields the one-dimensional data shown in FIG. 22C, in which the quantized orthogonal transform coefficients are aligned from the low frequency region to the high frequency region.

This one-dimensional data of quantized orthogonal transform coefficients is further transformed into data consisting of values of Level and Run shown in FIG. 22D. Here the Level indicates a coefficient value at a quantized orthogonal transform coefficient with a nonzero coefficient value among the plurality of quantized orthogonal transform coefficients. The Run indicates a zero run length being the number of data with the coefficient value of 0 present immediately before a nonzero quantized orthogonal transform coefficient.

For example, in the case of the data example of DCT coefficients shown in FIG. 22A, the sixty four DCT coefficients $q_{11}$-$q_{88}$ are sorted out, based on locations of appearance of DCT coefficients with nonzero coefficient value, into a coefficient set $S_1$ consisting of coefficient $q_{11}$, a coefficient set $S_2$ consisting of coefficients $q_{12}$, $q_{21}$, a coefficient set $S_3$ consisting of coefficients $q_{31}$-$q_{13}$, a coefficient set $S_4$ consisting of coefficients $q_{14}$-$q_{32}$, a coefficient set $S_5$ consisting of coefficients $q_{41}$-$q_{15}$, and a coefficient set $S_6$ consisting of coefficients $q_{16}$-$q_{88}$, as shown in FIG. 22C.

For each of these coefficient sets $S_i$ (i=1-6), as shown in FIG. 22D, Level value $L_i$ and Run value $R_i$ are determined. Specifically, the coefficient set $S_1$ has $L_1=q_{11}=10$ and $R_1=0$. The coefficient set $S_2$ has $L_2=q_{21}=-2$ and $R_2=1$. The coefficient set $S_3$ has $L_3=q_{13}=2$ and $R_3=2$. The coefficient set $S_4$ has $L_4=q_{32}=-1$ and $R_4=2$. The coefficient set $S_5$ has $L_5=q_{15}=1$ and $R_5=5$. The last coefficient set $S_6$ is a coefficient group of the coefficients $q_{16}$-$q_{88}$ all having the coefficient value of 0, and thus has $L_6=0$ and $R_6$ undefined, which is treated as 0 herein for convenience sake.

Nonzero coefficient count CC and Run total RT in the coding target block are calculated from the data of Level and Run shown in FIG. 22D. For example, specifically, they are calculated as nonzero coefficient count CC=5 and Run total RT=10 from FIG. 22D.

Here, let $R_i$ be the Run value of coefficient set $S_i$, $L_i$ be the Level value thereof, $P_i$ be a frequency location of a nonzero coefficient after the scan, and $L_{i+1}$ be the Level value of $S_{i+1}$ coded right before. Furthermore, let RT be a Run total in the coding target block, CC be the nonzero coefficient count therein, $RT_i$ be a Run total residual in coefficient set $S_i$, and $CC_i$ be a nonzero coefficient residual count. $RT_i$ and $CC_i$ are calculated according to Eq (1) and Eq (2) below, and $P_i$ according to Eq (3). However, the nonzero coefficient residual count for the last coefficient set $S_j$ is set as $CC_j=CC+1$, for convenience' sake.

$$RT_i = RT_{i+1} - R_{i+1} \qquad \text{Eq (1)}$$

$$CC_i = CC_{i+1} - 1 \qquad \text{Eq (2)}$$

$$P_i = RT_i + CC_i \qquad \text{Eq (3)}$$

FIG. 34B shows an example of a variable-length coding table used on the occasion of performing the coding of these coefficient sets, and the nonzero coefficient count CC and Run total RT. In this variable-length coding table the left column represents the index values, the center column the variable-length codes corresponding to the index values, and the right column the code lengths of the respective variable-length codes.

FIG. 13 is an illustration showing the block diagram of variable-length encoder 16 according to the twelfth embodiment of the present invention. The nonzero coefficient count CC and Run total RT are first fed as input symbols H1 into variable-length code output part 30. Variable-length coding table provider 33 provides a variable-length coding table H5, for example as shown in FIG. 34B, as a variable-length coding table corresponding to the input symbols H1, for variable-length code output part 30, and the input symbols H1 are encoded using the variable-length coding table H5. Namely, one is subtracted from the value of the nonzero coefficient count CC and, using the obtained value as an index value, a variable-length code corresponding thereto is outputted as coded data D9. Similarly, using the value of Run total RT as an index value, a corresponding variable-length code is outputted as coded data D9.

Then the coefficient sets are encoded in order from the high-frequency-side coefficient set. However, a coefficient set with all the coefficient values of 0 is not encoded. First, when the Run values $R_i$ of all the coefficient sets are fed as input symbols H1 into variable-length code output part 30, they are similarly encoded through the use of a variable-length coding table, using the Run values $R_i$ as indexes, to be outputted as coded data D9.

Then the coding of Level values is carried out for all nonzero Level values in order from the high-frequency-side coefficient set. As described previously, the orthogonal transform coefficients in DCT decrease the absolute value of the Level value with increase in the frequency toward high frequencies, and this distribution can be approximately by a Laplace distribution with a peak at zero. Therefore, the absolute value of the Level value of a coding target can be analogized from the absolute value of the Level value encoded immediately before the coefficient as a coding target. Namely, since the coding is carried out in order from the high frequency side on the frequency axis, the coding target Level value is located near the Level value in a coefficient set one higher on the high frequency side on the frequency axis and thus we can infer that it is highly possible that the absolute value of the coding target Level value takes a value comparable to the absolute value of the Level value in a coefficient set one higher on the high frequency side. It follows that the coding efficiency can be increased by generating the context from the absolute value of the Level value in a coefficient set one higher on the high frequency side than the coding target Level value, and switching the map table for associating the index values with the absolute values of the Level values in the variable-length coding table, on the basis of the context.

Here, $|L_i|$ be the absolute value of the coding target Level value, sign($L_i$) be a sign indicating positive or negative, and $|L_{i+1}|$ be the absolute value of the Level value in the coefficient set $S_{i+1}$ one higher on the high frequency side. First, coded symbol memory 31 feeds $|L_{i+1}|$ as coding map table reference information H2 into coding map table provider 32, and, since $|L_i|$ is analogized to take a value close to $|L_{i+1}|$, a map table H4 is created so as to relate $|L_{i+1}|$ to an index value for the shortest variable-length code, then relate $|L_{i+1}|-1$ and $|L_{i+1}|+1$ to index values for a next shortest variable-length code, and similarly relate those closer to $|L_{i+1}|$ to index values for shorter variable-length codes in order.

More specifically, the map table is configured, as shown in FIG. 34A, so that the index values become smaller toward "0" which is the absolute value of the Level value of $S_6$, for the coefficient set $S_5$ shown in FIG. 22C. Similarly, for the coefficient set $S_4$, the map table is configured, as shown in FIG. 34A, so that the index values become smaller toward "1" which is the absolute value of the Level value of $S_5$. For the coefficient set $S_3$, a map table is configured, as shown in FIG. 34A, so that the index values become smaller toward "1" which is the absolute value of the Level value of $S_4$. For the coefficient set $S_2$, a map table is configured, as shown in FIG. 35A, so that the index values become smaller toward "2" which is the absolute value of the Level value of $S_3$. For the coefficient set $S_1$, a map table is configured, as shown in FIG. 35A, so that the index values become smaller toward "2" which is the absolute value of the Level value of $S_2$.

The map table H4 is generated in this way, the variable-length code output part 30 performs the variable-length coding through the use of the variable-length coding table H5, using the absolute values of the respectively corresponding Level values as index values, and, subsequent to the variable-length coding of each symbol, a sign indicating positive or negative is coded by one bit to designate "0" in the positive case or "1" in the negative case. Namely, when the Level value $L_i$ is fed as an input symbol into variable-length code output part 30, coded symbol memory 31 feeds $|L_{i+1}|$ as coding map table reference information H2 into coding map table provider 32 and a corresponding coding map table H4 is provided for the variable-length code output part 30. At the same time as it, variable-length coding table provider 33 provides a variable-length coding table H5 for variable-length code output part 30, and the input symbol H1 is variable-length coded to be outputted as coded data D9.

FIG. 35B shows the result of coding of the Level values in a case where the coefficient string in the specific example shown in FIG. 22C is subjected to the coding in the twelfth embodiment of the present invention and in a case of conventional coding without switching of the map table.

Since the encoding method in the twelfth embodiment of the present invention is configured to implement the variable-length coding with switching of the map table so as to assign values highly likely to appear as coding target Level values, to short variable-length codes with reference to the Level value in the neighborhood on the frequency axis relative to the coding target coefficient.

The encoding method in the twelfth embodiment of the present invention was described so as to perform the coding of the Run values before that of the Level values, but it is a matter of course that the present invention can also be applied to a configuration of coding the Run values after the Level values and to a configuration of alternately coding the Run values and Level values.

FIG. 36 is an illustration showing a block diagram of variable-length decoder 21 according to the twelfth embodiment of the present invention. When coded data D9 coded by the encoding method in the twelfth embodiment of the present invention is fed into decoded symbol output part 40 of variable-length decoder 21, decoded symbol memory 41 feeds a previously decoded symbol $|L_{i+1}|$ as decoding map table reference information H7 into decoding map table provider 42. Then decoding map table provider 42 selects a decoding map table H9 by procedure similar to the coding and feeds it into decoded symbol output part 40, and variable-length decoding table provider 43 feeds a variable-length decoding table H10 into decoded symbol output part 40. Then decoded symbol output part 40 performs the variable-length decoding to decode and output the Level value as a decoded symbol H6, and simultaneously stores it into decoded symbol memory 41.

Since the variable-length decoder is configured as described above, it is feasible to suitably decode the coded data coded by the encoding method in the twelfth embodiment of the present invention.

The twelfth embodiment of the present invention was configured to encode the Level values in order from the highest frequency component of the DCT coefficients, and in that case it is highly possible that absolute values of the Level values of high frequency components become "1;" therefore, it is feasible to implement more suitable coding and decoding by adding-numbers of consecutive "1"s from the high frequency side to the map table of Level values. An example of the map table is presented in FIG. 36.

Thirteenth Embodiment

In addition to the encoding method in the twelfth embodiment of the present invention, the encoding method according to the thirteenth embodiment of the present invention is characterized by switching the map table by use of a Run value in a coding target coefficient set on the occasion of performing the coding of a Level value. Therefore, the encoding method in the thirteenth embodiment of the present invention is configured to encode the Run value in the coding target coefficient set, prior to the coding of the Level value as a coding target. Namely, the encoding method in the thirteenth embodiment of the present invention is configured so that in the variable-length encoder 16 shown in FIG. 13, coded symbol memory 31 feeds the Run value as well as the Level value $|L_{i+1}|$ as coding map table reference information H2 into coding map table provider 32. Specifically, for example, where a Run value is large, it is considered that a coding target coefficient is located at the foot of a Laplace distribution and thus an appearing Level value must be small. Then, for example, a threshold Th0 is preliminarily set and the control is made so that where the Run value is greater than the threshold Th0, a map table used for the Level value is one configured to decrease the index values with decreasing Level value. The other operation is the same as in the encoding method according to the twelfth embodiment of the present invention.

In the configuration as described above, since it is highly possible that the Level value becomes small if the Run value is large the encoding method in the thirteenth embodiment of the present invention can encode the small Level value likely to appear where the Run value is large, by a short code length. Accordingly, the encoding method in the thirteenth embodiment can efficiently encode the Level values.

The decoding method according to the thirteenth embodiment of the present invention is implemented by switching the coding map table (decoding map table) by procedure similar to the encoding method according to the thirteenth embodiment of the present invention and performing processing similar to the decoding method in the twelfth embodiment of the present invention. The decoding method in the thirteenth embodiment of the present invention can suitably decode the coded data coded by the encoding method in the thirteenth embodiment of the present invention.

Fourteenth Embodiment

In addition to the encoding methods in the twelfth and thirteenth embodiments of the present invention, the encoding method according to the fourteenth embodiment of the present invention is further characterized in that on the occasion of encoding a Level value in a coding target coefficient set, the variable-length coding table is switched using a frequency location P in the coding target coefficient set. Therefore, the encoding method in the fourteenth embodiment of the present invention is configured to, prior to the coding of a Level value as a coding target, encode a Run value in the coding target coefficient set.

Namely, it is considered, for example, that as the frequency location P becomes larger, the coding target coefficient moves toward the foot of the Laplace distribution, and thus we can infer that the Level value to appear is probably close to a Level value in a coefficient set one higher on the high frequency side. It is also considered that as the frequency location P becomes smaller, the coding target coefficient sits closer to the top of the Laplace distribution, and, therefore, the Level value to appear must decrease accuracy of analogy from a Level value in a coefficient set one higher on the high frequency side. Thus a plurality of variable-length coding tables are prepared, for example, as shown in FIGS. 21A-21C, and the control is performed so as to adaptively switch among these tables. The plurality of variable-length coding tables presented as an example in FIGS. 21A-21C are called the exp-Golomb codes and are configured as follows. Namely, the codes are configured by adding the Binary part of k+j bits to the Unary part of j+1 bits (j=0, 1, . . . ). Specifically, j is equal to the number of "0"s in the Unary part at a code of interest, and k is equal to the code length of the zeroth code in the Binary part. FIG. 21A shows the exp-Golomb codes in the case of k=0, FIG. 21B those in the case of k=1, and FIG. 21C those in the case of k=2. As apparent from the figures, the deviation of distribution of code lengths tends to decrease with increase in the value of k.

Now, there are prepared a plurality of variable-length coding tables with different characteristics of deviation of distribution of code lengths in this way, and the variable-length coding table for the coding target Level value is switched according to the frequency location P in the coding target coefficient set. Namely, the control herein is such that where the frequency location P is large, the table used is one with large deviation of code lengths, as shown in FIG. 21A, and such that where the frequency location is small, the table used is one with small deviation of code lengths, as shown in FIG. 21C.

Specifically, for example, thresholds Th1 and Th2 are preliminarily set (where Th1>Th2), and switching is implemented as follows: the variable-length coding table of FIG. 21A is used where the frequency location $P_i$ in the coefficient set $S_i$ as a coding target is larger than the threshold Th1; the variable-length coding table of FIG. 21B is used where $P_i$ is not more than the threshold Th1 and is larger than Th2; the variable-length coding table of FIG. 21C is used where $P_i$ is smaller than the threshold Th2.

Namely, in the variable-length encoder 16 of FIG. 13, when a Level value is fed as an input symbol H1 into variable-length code output part 30, coded symbol memory 31 feeds the frequency location $P_i$ in the coding target coefficient set $S_i$ calculated therein, as variable-length coding table reference information H3 into variable-length coding table provider 33, and variable-length coding table provider 33 provides a variable-length coding table H5 selected by the aforementioned control technique on the basis of the variable-length coding table reference information H3, for the variable-length code output part 30. The other operation is much the same as in the twelfth and thirteenth embodiments of the present invention.

The encoding method in the fourteenth embodiment of the present invention is configured to perform such control that in the case where the prediction of Level value is likely to be correct, the table used is switched to one with large deviation of code lengths so as to decrease the code lengths in the correct prediction case and that in the case where the prediction of Level value is unlikely to be correct, the table used is switched to one with small deviation of code lengths to prevent the code lengths from becoming long in the incorrect prediction case, as described above; therefore, it can efficiently encode the Level values.

The encoding method was described using the three variable-length coding tables in FIGS. 21A-21C, but it is a matter of course that the number and values of variable-length coding tables are not limited to those in FIGS. 21A-21C. The switching among the tables may also be implemented in such a way that a plurality of variable-length coding tables are retained in a memory in variable-length coding table provider 32 and the provision of variable-length coding table H5 is switched among them, or in such a way that the Universal codes such as the exp-Golomb codes as exemplified are used and a parameter thereof is switched to generate the variable-length coding table H5 in variable-length coding table provider 32.

The decoding method according to the fourteenth embodiment of the present invention is implemented by switching the coding map table (decoding map table) by procedure similar to the encoding method according to the fourteenth embodiment of the present invention and performing processing similar to the decoding method in the twelfth embodiment of the present invention. The decoding method in the fourteenth embodiment of the present invention can suitably decode the coded data coded by the encoding method in the fourteenth embodiment of the present invention.

Fifteenth Embodiment

In addition to the encoding methods in the twelfth to fourteenth embodiments of the present invention, the encoding method according to the fifteenth embodiment of the present invention is further characterized in that on the occasion of encoding a Level value in a coding target coefficient set, the variable-length coding table is switched using an absolute value of a Level value in a coefficient set one higher on the high frequency side than the coding target coefficient set.

Namely, for example, where the absolute value of the Level value in the coefficient set one higher on the high frequency side is large, it becomes more difficult to predict the Level value in the coding target coefficient set. Conversely, where the absolute value of the Level value in the coefficient set one higher on the high frequency side is small, it becomes easier to make a correct prediction for the Level value in the coding target coefficient set. Just as in the encoding method according to the fourteenth embodiment of the present invention, therefore, the encoding method of the present embodiment involves preparing a plurality of variable-length coding tables, for example, as shown in FIGS. 21A-21C, and performing such control as to adaptively switch among these. Specifically, for example, thresholds Th3 and Th4 are preliminarily set (where Th3<Th4), and switching among the variable-length coding tables is implemented as follows on the occasion of encoding the Level value $L_i$ in the coefficient set $S_i$ as a coding target: where the absolute value $|L_{i+1}|$ of the Level value in the coefficient set $S_{i+1}$ one, higher on the high frequency side is smaller than Th3, the variable-length coding table of FIG. 21A is used; where $|L_{i+1}|$ is not less than Th3 and is smaller than Th4, the variable-length coding table of FIG. 21B is used; where $|L_{i+1}|$ is not less than Th4, the variable-length coding table of FIG. 21C is used.

Namely, in the variable-length encoder 16 of FIG. 13, when a Level value is fed as an input symbol H1 into variable-length code output part 30, coded symbol memory 31 feeds $|L_{i+1}|$ as variable-length coding table reference information H3 into variable-length coding table provider 33, and variable-length coding table provider 33 provides a variable-length coding table H5 selected by the above control technique on the basis of the variable-length coding table reference information H3, for the variable-length code output part 30. The other operation is much the same as in the twelfth to fourteenth embodiments of the present invention.

The encoding method in the fifteenth embodiment of the present invention is configured to perform such control that in the case where the prediction of Level value is likely to be correct, the table used is switched to one with large deviation of code lengths so as to decrease the code lengths in the correct prediction case and that in the case where the prediction of Level value is unlikely to be correct, the table used is switched to one with small deviation of code lengths to prevent the code lengths from becoming long in the incorrect prediction case, as described above; therefore, it can efficiently encode the Level values.

The encoding method in the fifteenth embodiment of the present invention was described so as to perform the coding of the Run values before that of the Level values, but it is a matter of course that the present invention can also be applied to a configuration of coding the Run values after the Level values and to a configuration of alternately coding the Run values and Level values.

The decoding method according to the fifteenth embodiment of the present invention is implemented by switching the coding map table (decoding map table) by procedure similar to the encoding method according to the fifteenth embodiment of the present invention and performing processing similar to the decoding method in the twelfth embodiment of the present invention. The decoding method in the fifteen embodiment of the present invention can suitably decode the coded data coded by the encoding method in the fifteen embodiment of the present invention.

Sixteenth Embodiment

The encoding method according to the sixteenth embodiment of the present invention is characterized in that on the occasion of encoding a Run value in a coding target coefficient set, the variable-length coding table is switched using the absolute value of the Level value in the coding target coefficient set. Therefore, the encoding method in the sixteenth embodiment of the present invention is configured to encode the Level value in the coding target coefficient set, prior to the coding of the Run value as a coding target.

Namely, if the absolute value of the Level value is large in the coding target coefficient set, it is conceivable that the coding target coefficient is located at a portion near the top of the Laplace distribution and frequency components in the neighborhood are also nonzero with a high possibility; therefore, it can be predicted that the Run value is small. Conversely, if the absolute value of the Level value is small in the coding target set, it is conceivable that the coding target coefficient is located at a portion in the foot of the Laplace distribution, and it is not always highly possible that frequency components in the neighborhood are nonzero; therefore, it becomes difficult to make a correct prediction for the Run value. Therefore, just as in the encoding method according to the fifteenth embodiment of the present invention, the encoding method in the present embodiment is configured to prepare a plurality of variable-length coding tables, for example, as shown in FIGS. 21A-21C and perform such control as to adaptively switch among these. Specifically, for example, thresholds Th5 and Th6 are preliminarily set (where Th5>Th6), and switching among the variable-length coding tables is implemented as follows on the occasion of encoding the Run value $R_i$ in the coefficient set $S_i$ as a coding target: where the absolute value $|L_i|$ of the Level value in the coefficient set $S_i$ is larger than Th5, the variable-length coding table of FIG. 21A is used; where $|L_i|$ is not more than Th5 and is larger than Th6, the variable-length coding table of FIG. 21B is used; where $|L_i|$ is not more than Th6, the variable-length coding table of FIG. 21C is used.

Namely, in the variable-length encoder 16 of FIG. 13, when a Run value is fed as an input symbol H1 into variable-length code output part 30, coded symbol memory 31 feeds $|L_i|$ as variable-length coding table reference information H3 into variable-length coding table provider 33, and variable-length coding table provider 33 provides a variable-length coding table H5 selected by the above control technique on the basis of the variable-length coding table reference information H3, for variable-length code output part 30. The other operation is much the same as in the twelfth to fifteenth embodiments of the present invention.

The encoding method in the sixteenth embodiment of the present invention is configured to perform such control that where it is easy to make a prediction that the Run value takes a small value, the table used is switched to one with large deviation of code lengths to decrease the code lengths in the correct prediction case and that where it is difficult to make a correct prediction for the Run value, the table used is switched to one with small deviation of code lengths to prevent the code lengths from becoming long in the incorrect prediction case, as described above; therefore, it can efficiently encode the Run values.

The decoding method according to the sixteenth embodiment of the present invention is implemented by switching the coding map table (decoding map table) by procedure similar to the encoding method according to the sixteenth embodiment of the present invention and performing processing similar to the decoding method in the fifteenth embodiment of the present invention. The decoding method in the sixteenth embodiment of the present invention can suitably decode the coded data coded by the encoding method in the sixteenth embodiment of the present invention.

Seventeenth Embodiment

Described next is the encoding method according to the seventeenth embodiment of the present invention. The encoding method in the twelfth embodiment of the present invention did not involve switching of the variable-length coding table on the occasion of encoding the Run total RT in the block, whereas the encoding method in the seventeenth embodiment of the present invention is characterized in that on the occasion of encoding the Run total RT in the block, the variable-length coding table is switched according to the motion vector difference DMV for the coding target block.

The Run total RT in the block can be predicted, for example, from the value of nonzero coefficient count CC; the fact that the DCT coefficients in the block can be approximated by the Laplace distribution; and so on. The Run total predicted in this way is denoted by PRT. When the motion vector difference DMV, which is a difference between a motion vector predicted value predicted from neighboring blocks and a motion vector of a coding target block, is small, it is highly possible that the DCT coefficients appearing in the coding target block can be readily approximated by the Laplace distribution. In this case, therefore, efficient coding can be implemented by using as a variable-length coding table for the Run total RT in the block, such a variable-length coding table as to have short code lengths in the vicinity of the predicted value PRT of the Run total. Conversely, where the motion vector difference DMV in the coding target block is large, it is highly possible that change in motion and texture is complex in the neighborhood of the coding target block. In this case it is highly possible that the DCT coefficients cannot be approximated by the Laplace distribution, and the Run total RT in the coding target block does not always converge in the vicinity of the predicted value PRT of the Run total. In this case, therefore, efficient coding can be implemented using such a variable-length coding table as not to make a too large difference among code lengths against any value of Run total RT.

Keeping these in mind, the seventeenth embodiment of the present invention involves preparing a plurality of variable-length coding tables with different characteristics of deviation of distribution of code lengths, for example, as shown in FIGS. 21A-21C and implementing the switching of the variable-length coding table for the Run total RT in the coding target block, in accordance with the magnitude of the motion vector difference DMV in the coding target block.

Specifically, for example, the switching of the variable-length coding table is implemented based on a comparison of the magnitude |DMV| of the motion vector difference DMV in the coding target block with preset thresholds Th7, Th8 (where Th7<Th8). The encoding method is configured to perform the variable-length coding, using as a variable-length coding table for the Run total RT in the coding target block, the table of FIG. 21A where the value of |DMV| is smaller than Th7, the table of FIG. 21B where |DMV| is not less than Th7 and is smaller than Th8, or the table of FIG. 21C where |DMV| is not less than Th8.

Namely, in the variable-length encoder 16 of FIG. 13 a Run total RT is first fed as an input symbol H1 into variable-length code output part 30. Then coded symbol memory 31 feeds |DMV| in the coding target block as variable-length coding table reference information H3 into variable-length coding table provider 33. Then variable-length coding table provider 33 compares |DMV| with the preset thresholds Th7 and Th8 as described above, determines a variable-length coding table to be used for the Run total RT in the coding target block, on the basis thereof, and provides the variable-length coding table H5 for the variable-length code output part 30. Then the Run total RT is variable-length coded to be outputted as coded data D9.

The encoding method in the seventeenth embodiment of the present invention is configured to perform such control that where the Pun total tends to converge in the vicinity of the predicted value PRT of the Run total, the variable-length coding table is switched to one with short code lengths in the vicinity of PRT to control the code lengths short in the case of the Run total near PRT and that where the Run total does not always converge in the vicinity of the predicted value PRT of the Run total, the table is switched to one with small deviation of code lengths to prevent the code lengths from becoming long whatever value the Run total RT takes; therefore, it can efficiently encode the Run total RT.

FIG. 36 is an illustration showing the block diagram of variable-length decoder 21 according to the seventeenth embodiment of the present invention. When coded data D9 coded by the encoding method in the seventeenth embodiment of the present invention is fed into decoded symbol output part 40 of variable-length decoder 21, decoded symbol memory 41 feeds |DMV| calculated from the previously decoded symbols, as variable-length decoding table reference information H8 into variable-length decoding table provider 43. Then variable-length decoding table provider 43 selects a variable-length decoding table H10 by procedure similar to the coding and feeds it into decoded symbol output part 40. Then the decoded symbol output part 40 performs the variable-length decoding to decode and output the Run total RT as a decoded symbol H6.

The above embodiments were described using the encoding apparatus and decoding apparatus, but it should be noted that these can be implemented by hardware or by software. It is also noted that they were described using the specific variable-length coding tables and image encoding systems for easier understanding of the description and that the present invention is by no means intended to be limited to these.

As described in the above embodiments, a variety of modification examples can be readily contemplated for the switching methods of the coding table and map table using the coding condition or image characteristics, and the present invention can be applied to all of them.

The above embodiments were described using an example of moving-picture coding, but the present invention does not have to be limited to this and can be applied to any moving-picture encoding system and still-image encoding system as long as they allow application of the target coding symbol and utilized context.

The image encoding methods and image decoding methods in the above embodiments can be preferably applied to the image transmission system, image storage system, and image reproduction system shown in FIGS. 29A, 29B, and 29C, whereby it becomes feasible to effectively utilize such resources as the transmission band, storage capacity, and so on.

The above embodiments were described using the three variable-length coding tables of FIGS. 21A-21C, but the number and values of variable-length coding tables are not limited to those in FIGS. 21A-21C, of course. For example, the tables may be variable-length coding tables with different code length distributions generated by changing another parameter of the exp-Golomb codes as shown in FIGS. 37A-37C.

The encoding methods and decoding methods in the above embodiments were described using the specific table values, but it is needless to mention that the present invention is not limited to these values. In the above embodiments, the methods were described using the example of the DCT coefficients of 8 pixels×8 lines, but it is needless to mention that the type of the orthogonal transform and the size of blocks are not limited to these.

In the above embodiments the Run values are handled in order from those of high frequency components, but it is a matter of course that like effect can also be achieved by processing from the low frequency components. In addition, much preferred coding/decoding can be implemented, for example, by a configuration of switching the order of processing of the Run values to the other according to the value of nonzero coefficient count CC in the processing target block. Namely, for example, with respect to a preset threshold ThC, the Run values are handled from the low frequency components where the nonzero coefficient count CC is smaller than ThC, but from the high frequency components where the nonzero coefficient count CC is equal to or larger than the above threshold ThC, which increases the possibility of assigning smaller values to the Run values, so as to enable much preferred coding and decoding.

The encoding methods and decoding methods in the above embodiments were described each as separate embodiments, but it is needless to mention that like effect can also be achieved when a plurality of methods among them are simultaneously used.

The encoding methods and decoding methods in the above embodiments were described as those to encode or decode the Run values and Level values in series by use of the one-dimensional variable-length coding tables, but it is needless to mention that like effect can also be attained by a configuration to encode or decode them in parallel (in combination of Run values and Level values) by use, of a two-dimensional variable-length coding table. In the two-dimensional variable-length table utilizing the correlation between Run and Level, however, a change of index values based on the switching of the map table will result in degrading the correlation between Run and Level and thus decreasing the coding efficiency, and, therefore, more efficient coding can be performed by use of the one-dimensional variable-length coding table described in the embodiments of the present invention.

In the embodiments the coding was described using the variable-length coding to switch among the variable-length coding tables, but like effect can also be attained by using arithmetic coding to perform such processing, of course. When the arithmetic coding is applied, the embodiments can be modified as follows with like effect: a probability table with large symbol occurrence probabilities in arithmetic coding is used for a coding target symbol assigned a short code length, and a probability table with small symbol occurrence probabilities in arithmetic coding is used for a coding target symbol assigned a long code length.

Furthermore, like effect can be achieved by using a probability table with large deviation of symbol occurrence probabilities corresponding to respective symbols in arithmetic coding, in place of the variable-length coding table with large deviation of code lengths used in the embodiments, and by using a probability table with small deviation of symbol occurrence probabilities corresponding to respective symbols in arithmetic coding, in place of the variable-length coding table with small deviation of code lengths. Specifically, similar effect can be attained by using the probability tables of FIGS. 38A-38C, for example, in place of the variable-length coding tables of FIGS. 21A-21C. The other operations are much the same as in those in the embodiments described above, and thus the details thereof are omitted herein.

A computer program can provide each of the functions of the following components in each of the above embodiments: motion detector 11, motion compensator 12, orthogonal transformer 14, quantizer 15, variable-length encoder 16, dequantizer 17, inverse orthogonal transformer 18, variable-length decoder 21, dequantizer 22, inverse orthogonal transformer 23, motion compensator 24, coding map table provider 32, variable-length coding table provider 33, variable-length code output part 30, decoded symbol output part 40, decoding map table provider 42, variable-length decoding table provider 43, learning function-added coding map table provider 52, feedback function-added variable-length code output part 51, learning function-added coding/decoding map table provider 62, and feedback function-added decoded symbol output part 61. Furthermore, this computer program can be transmitted on a carrier wave.

INDUSTRIAL APPLICABILITY the present invention is applicable as image encoding apparatus, image decoding apparatus, image encoding methods, image decoding methods, image encoding programs, and image decoding programs.

The invention claimed is:

1. An image decoding apparatus comprising a decoding part for decoding coded data obtained by dividing a coding target image into macroblocks of a predetermined size, dividing each said macroblock into blocks of a predetermined shape and size specified based on a macroblock type, performing a motion compensated prediction in each unit of said block to output a motion vector, generating a predicted image from a reference image on the basis of the motion vector, calculating a difference between the predicted image and the coding target image to output a predictive image, performing transform coding of the predictive residual image in each unit of a predetermined transform block to output transform coefficients, quantizing the transform coefficients on the basis of a quantization parameter to output quantized transform coefficients, and performing compression coding of coding-related information containing the motion vector, the quantized transform coefficients, the macroblock type, and the quantization parameter to yield coded data, wherein the decoding part comprises a decoded symbol memory for memorizing the coding-related information previously decoded; a decoding procedure provider for providing one or more types of decoding procedures; and a decoded data outputting part for selecting a decoding procedure which is one of the decoding procedures provided by the decoding procedure provider and which corresponds to a coding procedure used in the coding of the coding-related information as a decoding target, based on a predetermined decoding procedure selection criterion, using the coding-related information previously decoded and stored in the decoded symbol memory, and for decoding the coding-related information on the basis of the selected decoding procedure to output decoded data, and the decoding part has a function of, for each of the transform blocks in a said macroblock, decoding coded block pattern information containing a nonzero coefficient existence flag indicating whether there exists a nonzero, said quantized transform coefficient, wherein, on the occasion of decoding the coded block pattern information in the coding target macroblock, the decoding procedure provider provides a decoding procedure corresponding to a coding procedure provided so as to decrease a code length based on a predetermined decoding procedure selection criteria, and in the case a size of the quantization parameter in the coding target macroblock is larger than a preset threshold, the decoding procedure provider provides a decoding procedure so as to set a shorter code length for the coded block pattern information indicating a smaller number of blocks including a nonzero quantized transform coefficient.

2. The image decoding apparatus according to claim 1, wherein, where a macroblock type in a neighboring macroblock to the coding target macroblock is one indicating division of the coding target macroblock into a maximum number of blocks, the decoding procedure provider assumes that all the coding blocks in the coding target macroblock have the coded block pattern information indicating inclusion of a nonzero quantized transform coefficient, and, on the occasion of decoding the coded block pattern information in the coding target macroblock, the decoding procedure provider provides a decoding procedure corresponding to a coding procedure provided so as to decrease a code length as a spatial correlation of the coded block pattern information becomes higher between the coding target macroblock and the neighboring macroblock thereto.

3. An image decoding apparatus comprising a decoding part for decoding coded data obtained by dividing a coding target image into macroblocks of a predetermined size, dividing each said macroblock into blocks of a predetermined shape and size specified based on a macroblock type, performing a motion compensated prediction in each unit of said block to output a motion vector, generating a predicted image from a reference image on the basis of the motion vector, calculating a difference between the predicted image and the coding target image to output a predictive image, performing transform coding of the predictive residual image in each unit of a predetermined transform block to output transform coefficients, quantizing the transform coefficients on the basis of a quantization parameter to output quantized transform coefficients, and performing compression coding of coding-related information containing the motion vector, the quantized transform coefficients, the macroblock type, and the quantization parameter to yield coded data, wherein the decoding part comprises a decoded symbol memory for memorizing the coding-related information previously decoded; a decoding procedure provider for providing one or more types of decoding procedures; and a decoded data outputting part for selecting a decoding procedure which is one of the decoding procedures provided by the decoding procedure provider and which corresponds to a coding procedure used in the coding of the coding-related information as a decoding target, based on a predetermined decoding procedure selection criterion, using the coding-related information previously decoded and stored in the decoded symbol memory, and for decoding the coding-related information on the basis of the selected decoding procedure to output decoded data, wherein, the decoding part has a function of decoding a number of said nonzero quantized transform coefficients in the block, and wherein, on the occasion of decoding the number of said nonzero quantized transform coefficients in the coding target macroblock, where the number of said nonzero quantized transform coefficients in a neighboring block to the coding target block is smaller than a preset threshold, the decoding procedure provider provides a decoding procedure corresponding to a coding procedure provided so as to decrease a code length with decrease in the number of said nonzero quantized transform coefficients.

4. The image decoding apparatus according to claim 1, wherein the decoded symbol memory has a function of holding a difference motion vector value being a difference between a predicted motion vector predicted from a neighboring block, and an actual motion vector, wherein, on the occasion of decoding the coded block pattern information in the coding target macroblock, where a magnitude of the difference motion vector value in a neighboring macroblock to the coding target macroblock is larger than a preset threshold, the decoding procedure provider provides a decoding procedure corresponding to a coding procedure provided so as to set a shorter code length for coded block pattern information indicating a larger number of blocks containing a nonzero quantized transform coefficient.

5. An image decoding apparatus comprising a decoding part for decoding coded data obtained by dividing a coding target image into macroblocks of a predetermined size, dividing each said macroblock into blocks of a predetermined shape and size specified based on a macroblock type, performing a motion compensated prediction in each unit of said block to output a motion vector, generating a predicted image from a reference image on the basis of the motion vector, calculating a difference between the predicted image and the coding target image to output a predictive image, performing transform coding of the predictive residual image in each unit of a predetermined transform block to output transform coefficients, quantizing the transform coefficients on the basis of a quantization parameter to output quantized transform coefficients, and performing compression coding of coding-related information containing the motion vector, the quantized transform coefficients, the macroblock type, and the quantization parameter to yield coded data, wherein the decoding part comprises a decoded symbol memory for memorizing the coding-related information previously decoded; a decoding procedure provider for providing one or more types of decoding procedures; and a decoded data outputting part for selecting a decoding procedure which is one of the decoding procedures provided by the decoding procedure provider and which corresponds to a coding procedure used in the coding of the coding-related information as a decoding target, based on a predetermined decoding procedure selection criterion, using the coding-related information previously decoded and stored in the decoded symbol memory, and for decoding the coding-related information on the basis of the selected decoding procedure to output decoded data, wherein the decoded symbol memory has a function of holding a difference motion vector value being a difference between a predicted motion vector predicted from a neighboring block, and an actual motion vector, and wherein, on the occasion of decoding the difference motion vector value in the coding target macroblock, where a magnitude of the difference motion vector value in a neighboring block to the coding target block is smaller than a preset threshold, the decoding procedure provider provides a decoding procedure corresponding to a coding procedure provided so as to set a shorter code length smaller difference motion vector value.

6. An image decoding apparatus comprising:

a decoding part for decoding coded data obtained by dividing a coding target image or a predictive residual image generated based on the coding target image, into predetermined transform blocks, performing transform coding of the coding target image or the predictive residual image in each unit of said transform block to output transform coefficients, quantizing the output transform coefficients on the basis of a quantization parameter to output quantized transform coefficients, and performing compression coding of coding-related information containing the quantized transform coefficients and the quantization parameter to yield coded data, wherein the decoding part has a function of converting the quantized transform coefficients in the coding target block to a one-dimensional string according to frequencies and decoding a zero run value being a number of consecutive coefficients providing 0 as an absolute value of the quantized transform coefficients in the one-dimensional string, a level value being an absolute value of a said quantized transform coefficient, and a positive/negative sign indicating whether the quantized transform coefficient is positive or negative, and comprises a decoded symbol memory for memorizing the coding-related information previously decoded; a decoding procedure provider for providing one or more types of decoding procedures; and a decoded data outputting part for selecting a decoding procedure which is one of the decoding procedures provided by the decoding procedure provider and which corresponds to a coding procedure used in the coding of the coding-related information as a decoding target, based on a predetermined coding procedure selection criterion, using the coding-related information previously decoded and stored in the decoded symbol memory, and for decoding the coding-related information on the basis of the selected decoding procedure to output decoded data, and, on the occasion of decoding the level value, where a zero run value at a frequency near the coding target level value is larger than a preset threshold, the decoding procedure provider provides a decoding procedure corresponding to a coding procedure provided so as to decrease a code length as the level value becomes smaller.

7. An image decoding apparatus comprising:

a decoding part for decoding coded data obtained by dividing a coding target image or a predictive residual image generated based on the coding target image, into predetermined transform blocks, performing transform coding of the coding target image or the predictive residual image in each unit of said transform block to output transform coefficients, quantizing the output transform coefficients on the basis of a quantization parameter to output quantized transform coefficients, and performing compression coding of coding-related information containing the quantized transform coefficients and the quantization parameter to yield coded data, wherein the decoding part has a function of converting the quantized transform coefficients in the coding target block to a one-dimensional string according to frequencies and decoding a zero run value being a number of consecutive coefficients providing 0 as an absolute value of the quantized transform coefficients in the one-dimensional string, a level value being an absolute value of a said quantized transform coefficient, and a positive/negative sign indicating whether the quantized transform coefficient is positive or negative, and comprises a decoded symbol memory for memorizing the coding-related information previously decoded; a decoding procedure provider for providing one or more types of decoding procedures; and a decoded data outputting part for selecting a decoding procedure which is one of the decoding procedures provided by the decoding procedure provider and which corresponds to a coding procedure used in the coding of the coding-related information as a decoding target, based on a predetermined coding procedure selection criterion, using the coding-related information previously decoded and stored in the decoded symbol memory, and for decoding the coding-related information on the basis of the selected decoding procedure to output decoded data, and wherein the decoding part has a function of decoding a number of nonzero quantized transform coefficients in the coding target block, wherein, where the number of nonzero quantized coefficients in the coding target block is smaller than a preset threshold, the decoding part decodes the level values and the zero run values thereof in order from a lowest frequency component, and wherein, where the number of nonzero quantized coefficients in the coding target block is larger than the preset threshold, the decoding part decodes the level values and the zero run values thereof in order from a highest frequency component.

8. An image decoding method comprising a decoding step of decoding coded data obtained by dividing a coding target image into macroblocks of a predetermined size, dividing each said macroblock into blocks of a predetermined shape and size specified based on a macroblock type, performing a motion compensated prediction in each unit of said block to output a motion vector, generating a predicted image from a reference image on the basis of the motion vector, calculating a difference between the predicted image and the coding target image to output a predictive image, performing transform coding of the predictive residual image in each unit of a predetermined transform block to output transform coefficients, quantizing the transform coefficients on the basis of a quantization parameter to output quantized transform coefficients, and performing compression coding of coding-related information containing the motion vector, the quantized transform coefficients, the macroblock type, and the quantization parameter to yield coded data, wherein the decoding step is to prepare one or more types of decoding procedures, select a decoding procedure which is one of said one or more types of decoding procedures and which corresponds to a coding procedure used in the coding of the coding-related information as a decoding target, based on a predetermined decoding procedure selection criterion, using the coding-related information previously decoded and stored in a decoded symbol memory, and decode the coding-related information on the basis of the selected decoding procedure that decreases code length to output decoded data, and in the case a size of the quantization parameter in the coding target macroblock is larger than a preset threshold, the decoding step provides a decoding procedure so as to set a shorter code length for the coded block pattern information indicating a smaller number of blocks including a nonzero quantized transform coefficient.

9. An image decoding method comprising:

a decoding step of decoding coded data obtained by dividing a coding target image or a predictive residual image generated based on the coding target image, into predetermined transform blocks, performing transform coding of the coding target image or the predictive residual image in each unit of said transform block to output transform coefficients, quantizing the output transform coefficients on the basis of a quantization parameter to output quantized transform coefficients, and performing compression coding of coding-related information containing the quantized transform coefficients and the quantization parameter to yield coded data, wherein the decoding step is a step of converting the quantized transform coefficients in the coding target block to a one-dimensional string according to frequencies and decoding a zero run value being a number of consecutive coefficients providing 0 as an absolute value of the quantized transform coefficients in the one-dimensional string, a level value being an absolute value of the quantized transform coefficients, and a positive/negative code indicating whether the quantized transform coefficient is positive or negative, and is to prepare one or more types of decoding procedures, select a decoding procedure which is one of the one or more types of decoding procedures and which corresponds to a coding procedure used in the coding of the coding-related information as a decoding target, based on a predetermined coding procedure selection criterion, using the coding-related information previously decoded and stored in a decoded symbol memory, and decode the coding-related information on the basis of the selected decoding procedure that decreases a code length to output decoded data.

10. A computer readable medium storing an image decoding program for controlling a computer to function as:

decoding means for decoding coded data obtained by dividing a coding target image into macroblocks of a predetermined size, dividing each said macroblock into blocks of a predetermined shape and size specified based on a macroblock type, performing a motion compensated prediction in each unit of said block to output a motion vector, generating a predicted image from a reference image on the basis of the motion vector, calculating a difference between the predicted image and the coding target image to output a predictive image, performing transform coding of the predictive residual image in each unit of a predetermined transform block to output transform coefficients, quantizing the transform coefficients on the basis of a quantization parameter to output quantized transform coefficients, and performing compression coding of coding-related information containing the motion vector, the quantized transform coefficients, the macroblock type, and the quantization parameter to yield coded data, wherein the decoding means comprises a decoding procedure providing means for providing one or more types of decoding procedures; and decoded data outputting means for selecting a decoding procedure which is one of the decoding procedures provided by the decoding procedure providing means and which corresponds to a coding procedure used in the coding of the coding-related information as a decoding target, based on a predetermined decoding procedure selection criterion, using the coding-related information previously decoded and stored in a decoded symbol memory, and for decoding the coding-related information on the basis of the selected decoding procedure that decreases a code length to output decoded data, and in the case a size of the quantization parameter in the coding target macroblock is larger than a preset threshold, the decoding procedure providing means provides a decoding procedure so as to set a shorter code length for the coded block pattern information indicating a smaller number of blocks including a nonzero quantized transform coefficient.

11. A computer readable medium storing an image decoding program for controlling a computer to function as:

decoding means for decoding coded data obtained by dividing a coding target image or a predictive residual image generated based on the coding target image, into predetermined transform blocks, performing transform coding of the coding target image or the predictive residual image in each unit of said transform block to output transform coefficients, quantizing the output transform coefficients on the basis of a quantization parameter to output quantized transform coefficients, and performing compression coding of coding-related information containing the quantized transform coefficients and the quantization parameter to yield coded data, wherein the decoding means comprises means for converting the quantized transform coefficients in the coding target block to a one-dimensional string according to frequencies and decoding a zero run value being a number of consecutive coefficients providing 0 as an absolute value of the quantized transform coefficients in the one-dimensional string, a level value being an absolute value of a said quantized transform coefficient, and a positive/negative sign indicating whether the quantized transform coefficient is positive or negative, and further comprises decoding procedure providing means for providing one or more types of decoding procedures; and decoded data outputting means for selecting a decoding procedure which is one of the decoding procedures provided by the decoding procedure providing means and which corresponds to a coding procedure used in the coding of the coding-related information as a decoding target, based on a predetermined coding procedure selection criterion, using the coding-related information previously decoded and stored in a decoded symbol memory, and for decoding the coding-related information on the basis of the selected decoding procedure that decreases a code length to output decoded data.

* * * * *